(12) United States Patent
Uehara et al.

(10) Patent No.: US 9,986,230 B2
(45) Date of Patent: May 29, 2018

(54) DISPLAY DEVICE AND TERMINAL DEVICE

(71) Applicant: NLT Technologies, Ltd., Kanagawa (JP)

(72) Inventors: Shinichi Uehara, Kanagawa (JP); Tetsushi Satou, Kanagawa (JP)

(73) Assignee: NLT TECHNOLOGIES, LTD., Kanagawa (JP)

(*) Notice: Subject to any disclaimer, the term of this patent is extended or adjusted under 35 U.S.C. 154(b) by 0 days. days.

(21) Appl. No.: 15/230,711

(22) Filed: Aug. 8, 2016

(65) Prior Publication Data
US 2016/0345004 A1 Nov. 24, 2016

Related U.S. Application Data

(62) Division of application No. 14/817,560, filed on Aug. 4, 2015, now Pat. No. 9,449,566, which is a division
(Continued)

(30) Foreign Application Priority Data

Oct. 15, 2007 (JP) .................................. 2007-268422
Sep. 12, 2008 (JP) .................................. 2008-234095

(51) Int. Cl.
*H04N 13/00* (2018.01)
*H04N 13/04* (2006.01)
(Continued)

(52) U.S. Cl.
CPC ..... *H04N 13/0486* (2013.01); *G02B 27/2214* (2013.01); *G09G 3/003* (2013.01);
(Continued)

(58) Field of Classification Search
CPC .... G09G 3/3611; G09G 3/003; G09G 3/3648; G09G 2300/0426; G09G 2310/0297;
(Continued)

(56) References Cited

U.S. PATENT DOCUMENTS 5,602,658 A 2/1997 Ezra et al.
5,850,269 A 12/1998 Kim
(Continued)

FOREIGN PATENT DOCUMENTS

CN 1547731 11/2004
CN 1721961 1/2006
(Continued)

OTHER PUBLICATIONS

Japanese Patent Office issued a Japanese office Action dated Nov. 24, 2009, Application No. 2008-234095.
(Continued)

*Primary Examiner* — Dmitriy Bolotin
(74) *Attorney, Agent, or Firm* — Young & Thompson

(57) ABSTRACT

To provide a plural-viewpoint display device having an image separating optical element such as a lenticular lens or a parallax barrier, which is capable of achieving a high image quality by suppressing deterioration in the display image quality caused when a block division driving method is employed, and to provide a terminal device, a display panel, and a driving method thereof, which can be preferably used for those devices. A pixel group configured with pixels for displaying a right-eye image includes a pixel connected to a data line phase-deployed in the first phase of a block division driving method, and a pixel connected to a data line phase-deployed in the third phase, and a pixel connected to a data line phase-deployed in the second phase. In this manner, it is designed to have no deviation in the phase deployment orders in the pixel groups for each viewpoint.

7 Claims, 41 Drawing Sheets

Related U.S. Application Data of application No. 14/247,629, filed on Apr. 8, 2014, now Pat. No. 9,135,872, which is a division of application No. 13/764,104, filed on Feb. 11, 2013, now Pat. No. 8,736,536, which is a division of application No. 12/251,881, filed on Oct. 15, 2008, now Pat. No. 8,446,355.

(51) Int. Cl.
*G09G 3/36* (2006.01)
*G02B 27/22* (2018.01)
*G09G 3/00* (2006.01)

(52) U.S. Cl.
CPC ......... *G09G 3/3611* (2013.01); *G09G 3/3648* (2013.01); *G09G 3/3688* (2013.01); *H04N 13/0404* (2013.01); *H04N 13/0409* (2013.01); *H04N 13/0447* (2013.01); *H04N 13/0497* (2013.01); *G09G 2300/0426* (2013.01); *G09G 2310/0297* (2013.01); *G09G 2320/028* (2013.01); *G09G 2320/0233* (2013.01); *G09G 2320/04* (2013.01); *H04N 2213/001* (2013.01)

(58) Field of Classification Search
CPC ......... G09G 2320/0233; G09G 3/3688; G09G 2320/04; G09G 2320/028; G02B 27/2214; H04N 13/0404; H04N 13/0486; H04N 13/0409; H04N 13/0447; H04N 13/0497; H04N 2213/001
See application file for complete search history.

(56) References Cited

U.S. PATENT DOCUMENTS

| | | | |
|---|---|---|---|
| 6,064,424 A | 5/2000 | Van Berkel | |
| 7,106,284 B2 | 9/2006 | Ohta et al. | |
| 7,400,306 B2 | 7/2008 | Hu | |
| 7,474,305 B2 | 1/2009 | Nagata et al. | |
| 8,199,173 B2 | 6/2012 | Iriguchi et al. | |
| 9,449,566 B2* | 9/2016 | Uehara | G02B 27/2214 |
| 2003/0214459 A1 | 11/2003 | Nishihara et al. | |
| 2004/0169831 A1 | 9/2004 | Uehara et al. | |
| 2005/0001787 A1 | 1/2005 | Montgomery et al. | |
| 2005/0024316 A1 | 2/2005 | Ohta et al. | |
| 2005/0195150 A1 | 9/2005 | Etoh et al. | |
| 2006/0012593 A1 | 1/2006 | Iriguchi et al. | |
| 2006/0132420 A1 | 6/2006 | Yoshida et al. | |
| 2007/0103547 A1 | 5/2007 | Kim | |
| 2007/0188517 A1 | 8/2007 | Takaki | |
| 2008/0080049 A1 | 4/2008 | Hamagishi et al. | |
| 2008/0191966 A1 | 8/2008 | Va Berkel | |
| 2008/0218433 A1 | 9/2008 | Hong | |
| 2008/0309599 A1 | 12/2008 | Tsuda et al. | |
| 2009/0051685 A1 | 2/2009 | Takagi | |
| 2009/0058845 A1 | 3/2009 | Fukuda et al. | |
| 2009/0073556 A1 | 3/2009 | Bent Gourley | |
| 2009/0096943 A1 | 4/2009 | Uehara | |
| 2009/0116108 A1 | 5/2009 | Levecq | |
| 2013/0229449 A1 | 9/2013 | Yun | |

FOREIGN PATENT DOCUMENTS

| | | |
|---|---|---|
| JP | 6-80477 | 10/1994 |
| JP | 6-332354 | 12/1994 |
| JP | 2006-030512 | 2/2006 |
| JP | 2006-154808 | 6/2006 |
| JP | 2008-107763 | 5/2008 |

OTHER PUBLICATIONS

N. Dodgson, Variation and Extrema of Human Interpupillary Distance, pp. 36-46 in Proc, SPIE vol. 5291, Stereoscopic Displays and Virtual Reality Systems XI, A.J. Woods et al.

Chinese Office Action, dated Sep. 22, 2014, in corresponding Chinese Patent Application No. 201310179075.6.

\* cited by examiner

DISPLAY DEVICE AND TERMINAL DEVICE

BACKGROUND OF THE INVENTION

1. Field of the Invention

The present invention relates to a display device, a terminal device, a display panel, and a display device driving method, which are capable of displaying images to each of a plurality of viewpoints. More specifically, the present invention relates to a display device, a terminal device, a display panel, and a display device driving method, which are capable of suppressing deterioration in the image quality caused when writing video signal on a single row of pixels in a time division manner.

2. Description of the Related Art

Owing to the recent technical developments, display panels are used in various places by being loaded not only to large-scale terminal devices such as monitors and television receiver sets but also to medium-scale terminal devices such as notebook-type personal computers, cash dispensers, and vending machines, and to small-scale terminal devices such as personal TVs, PDAs (Personal Digital Assistances), portable telephones, and portable game machines. Particularly, liquid crystal display devices using liquid crystal have many advantages such as being thin in thickness, light in weight, small in size, and low in terms of power consumption, so that those are loaded to various terminal devices. With a current display device, same display contents as those when viewed from a front direction can be observed from places other than the front direction. However, a display device with which different images can be observed depending on the viewpoints, i.e., depending on the positions from which observers views the display, has also been deployed. Such device is expected to grow as a display device of next generation.

As an example of the device capable of displaying different images to each of a plurality of viewpoints, there is a stereoscopic image display device. Particularly, a lenticular lens type and parallax barrier type have been proposed as a stereoscopic image display system that requires no special eye glasses.

Further, as another example of the device capable of displaying different images for each of a plurality of viewpoints, there has been deployed a plural-image simultaneous displaying device that is capable of displaying a plurality of different images for a plurality of viewpoints simultaneously (see Japanese Unexamined Patent Publication 06-332354 (Patent Document 1), for example). This is a display that displays different images for each observing direction simultaneously under a same condition by utilizing an image allotting function of a lenticular lens. This makes it possible with a single display device to provide different images simultaneously to a plurality of observers that are located different positions from each other with respect to the display device.

In the meantime, conventionally, a block division driving method has been proposed (see Japanese Examined Patent Publication 06-80477 (FIG. 4) (Patent Documents 2) and Japanese Unexamined Patent Publication 2006-154808 (Patent Documents 3), for example) as one of liquid crystal display device driving methods. FIG. 41 is a circuit diagram showing the block division driving method. As shown in FIG. 41, output lines D1-Dm from a source line driver part 500D as a video output circuit are put together into one block by every m-number of output lines by a matrix circuit 502. Provided that the number of blocks is k, there are "m×k"-number of video signal lines obtained from an "m×k" matrix. The m-number of video signal lines S1-Sm on each block are connected to the matrix circuit 502 via a block division TFT array 501 that is controlled by output lines B1-Bk from a TFT array driver part 500B. A single pixel 500U is disposed at each intersection point of the matrix configured by the "m×k"-number of video signal lines and output lines G1-Gm from a gate line driver part 500G.

Operations of the liquid crystal display device depicted in Patent Document 2 will be described. The output line G1 is selected by an output from the gate line driver part 500G. Within this one horizontal period, an output line B1 is selected by an output from the TFT array driver part 500B. Then, a signal outputted from the source line driver part 500D is transmitted to the video signal lines S1-Sm of the first block that is selected by the output line B1. Then, when an output line B2 is selected, a video signal is transmitted to the video signal lines S1-Sm of the second block. This operation is repeated. When an output line Bk is selected, a video signal is transmitted to the video signal lines of the k-th block. Thereby, one horizontal period ends. One screen can have an image displayed thereon by repeating a series of operations in one horizontal period. By writing the video signals in divided blocks, it is possible with the block division driving method to reduce the number of connections greatly. In addition, it is also possible to reduce the scale of the source line driver circuit. This makes it possible to improve the reliability and to cut the cost.

However, there has been found that block division causes deterioration in the display quality of the display device with the above-described block division driving method. In this deterioration of the picture quality, luminance differences are generated between edges of the blocks and other parts in particular even when same video information is written thereto, which generates block-like unevenness. As described, the driving method which supplies the video signals in a time-division manner generates deterioration in the display image quality caused due to the division.

The inventors of the present invention have zealously conducted studies and found that there is also other type of deterioration generated in the display image quality than the conventional block-like unevenness, when the division driving method such as the block division driving method is employed for the above-described plural-viewpoint display device that is capable of displaying different images towards a plurality of viewpoints.

SUMMARY OF THE INVENTION

The present invention has been designed in view of such issues. An exemplary object of the present invention is to provide a display device which can achieve high image quality by suppressing deterioration of the display image quality which is generated when the division driving method is employed for a plural-viewpoint display device to which an image separating optical element such as a lenticular lens or a parallax barrier is provided, and to provide a terminal device, a display panel preferably used for such devices, as well as to a driving method of the display device.

A display device according to an exemplary aspect of the invention includes: a pixel matrix configured with a plurality of pixel units, disposed in matrix, each including N-number of neighboring pixels for respectively displaying images for N-viewpoints (N is 2 or larger), in which the pixels are disposed in the vicinity of each proximal point between a plurality of scanning lines and a plurality of data lines; a plurality of video signal lines for outputting display data; a wiring switching element which successively switches and connects M-number (M is an integer of 1 or larger) of data lines to each of the video signal lines so as to supply the display data to the pixels via the data lines; and an optical element for distributing light emitted from each of the pixels configuring the pixel units into different directions from each other for the N-number of viewpoints. The display device further includes a switching order dispersing device for dispersing the switching orders by the wiring switching element corresponding to each pixel within the pixel groups configured with the pixels for displaying images for the same viewpoint.

A terminal device according to another exemplary aspect of the invention includes the display device of the present invention.

A display panel according to still another exemplary aspect of the invention includes: a pixel matrix configured with a plurality of pixel units, disposed in matrix, each including a plurality of neighboring pixels, in which the pixels are disposed in the vicinity of each proximal point between a plurality of scanning lines and a plurality of data lines; a plurality of video signal lines for outputting display data; and a wiring switching element which successively switches and connects M-number (M is an integer of 1 or larger) of data lines to each of the video signal lines so as to supply the display data to the pixels via the data lines. The display panel includes a plurality of pixel switches for transmitting the display data to each of the pixels from each of the data lines, wherein: the scanning lines have a function of controlling the pixel switches; and each of the pixels on a column sandwiched between two given neighboring data lines out of the plurality of data lines is allotted to the pixel that is connected to one of the data lines via the pixel switch and allotted to the pixel that is connected to the other data line via the pixel switch.

A display device driving method according to still another exemplary aspect of the invention is a method for driving a display device which includes: a pixel matrix configured with a plurality of pixel units, disposed in matrix, each including N-number of neighboring pixels for respectively displaying images for N-viewpoints (N is 2 or larger), in which the pixels are disposed in the vicinity of each proximal point between a plurality of scanning lines and a plurality of data lines; a plurality of video signal lines for outputting display data; a wiring switching element which successively switches and connects M-number (M is an integer of 2 or larger) of data lines to each of the video signal lines so as to supply the display data to the pixels via the data lines; and an optical element for distributing light emitted from each of the pixels configuring the pixel units into different directions from each other for the N-number of viewpoints. With this method, the wiring switching element switches the M-number of data lines in a give order and, thereafter, switches the M-number of data lines in an order that is different from the given order.

DETAILED DESCRIPTION OF THE EXEMPLARY EMBODIMENTS

Figure 1:
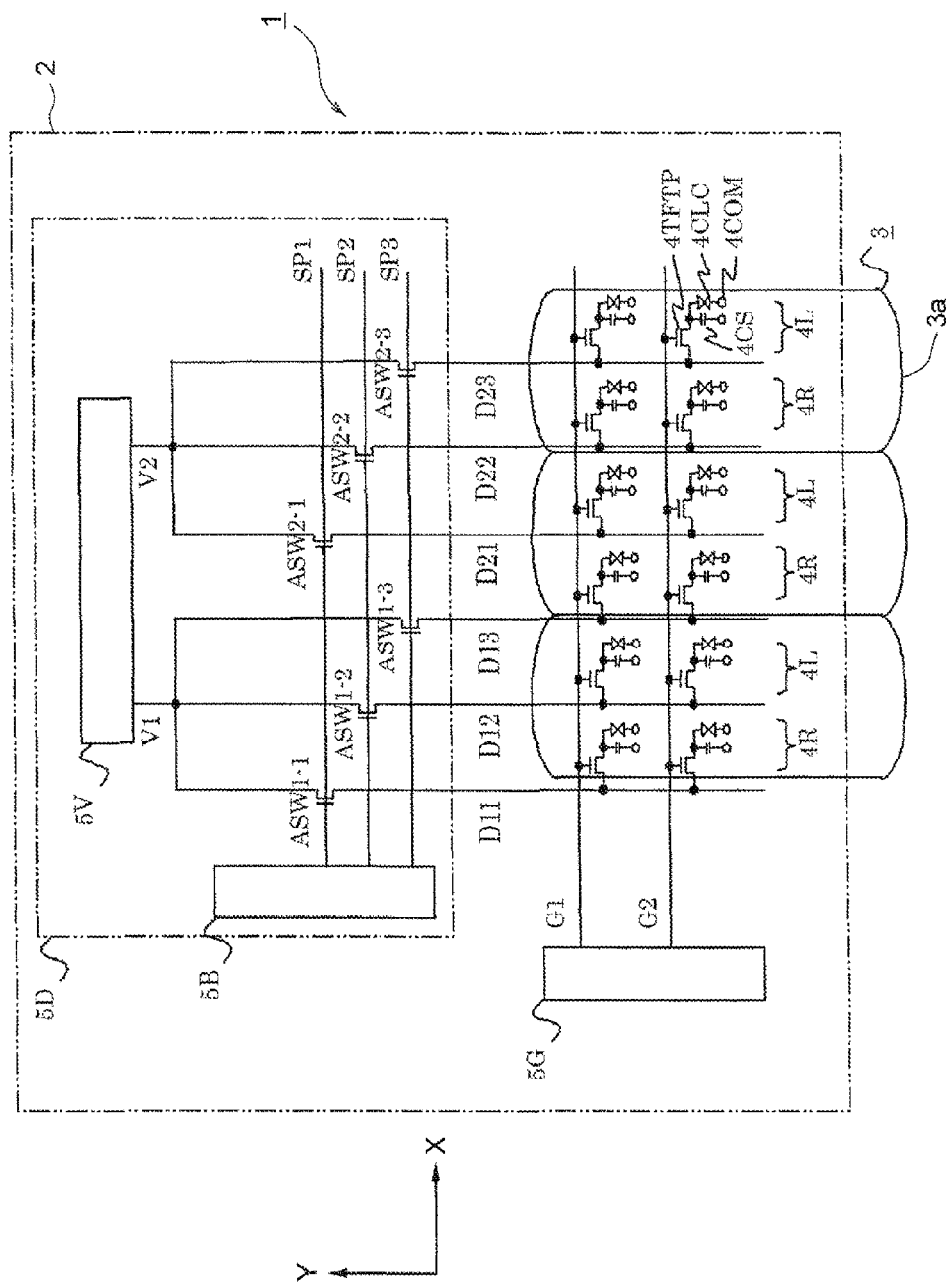
FIG. 1 is a top plan view showing a display device according to a first exemplary embodiment of the invention.
Figure 2:
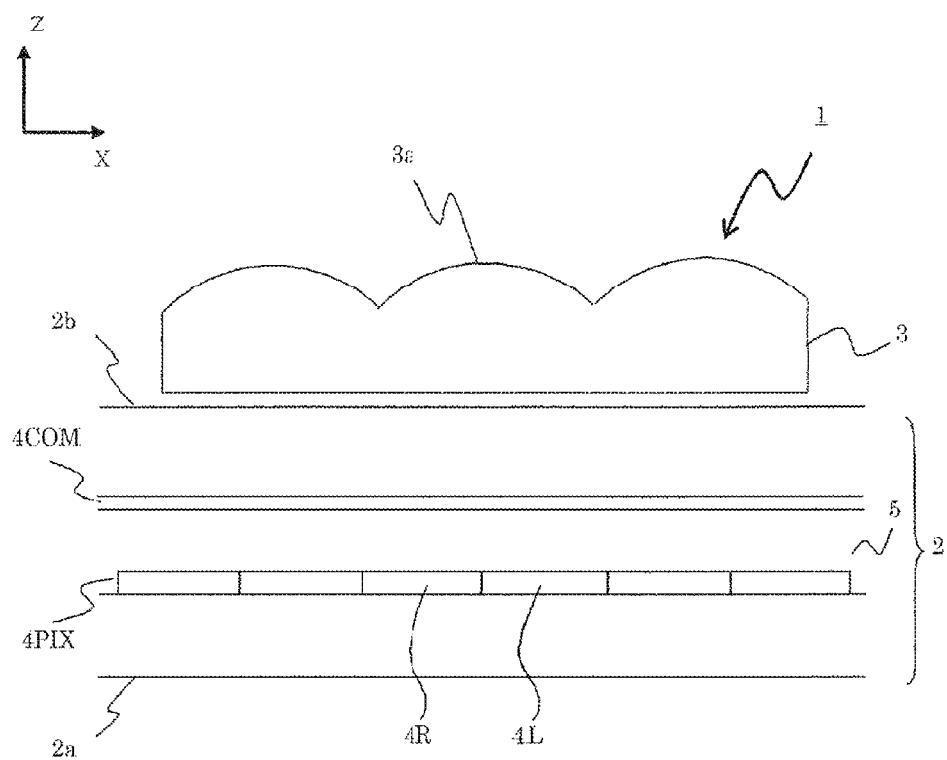
FIG. 2 is a sectional view showing the display device according to this exemplary embodiment.
Figure 3:
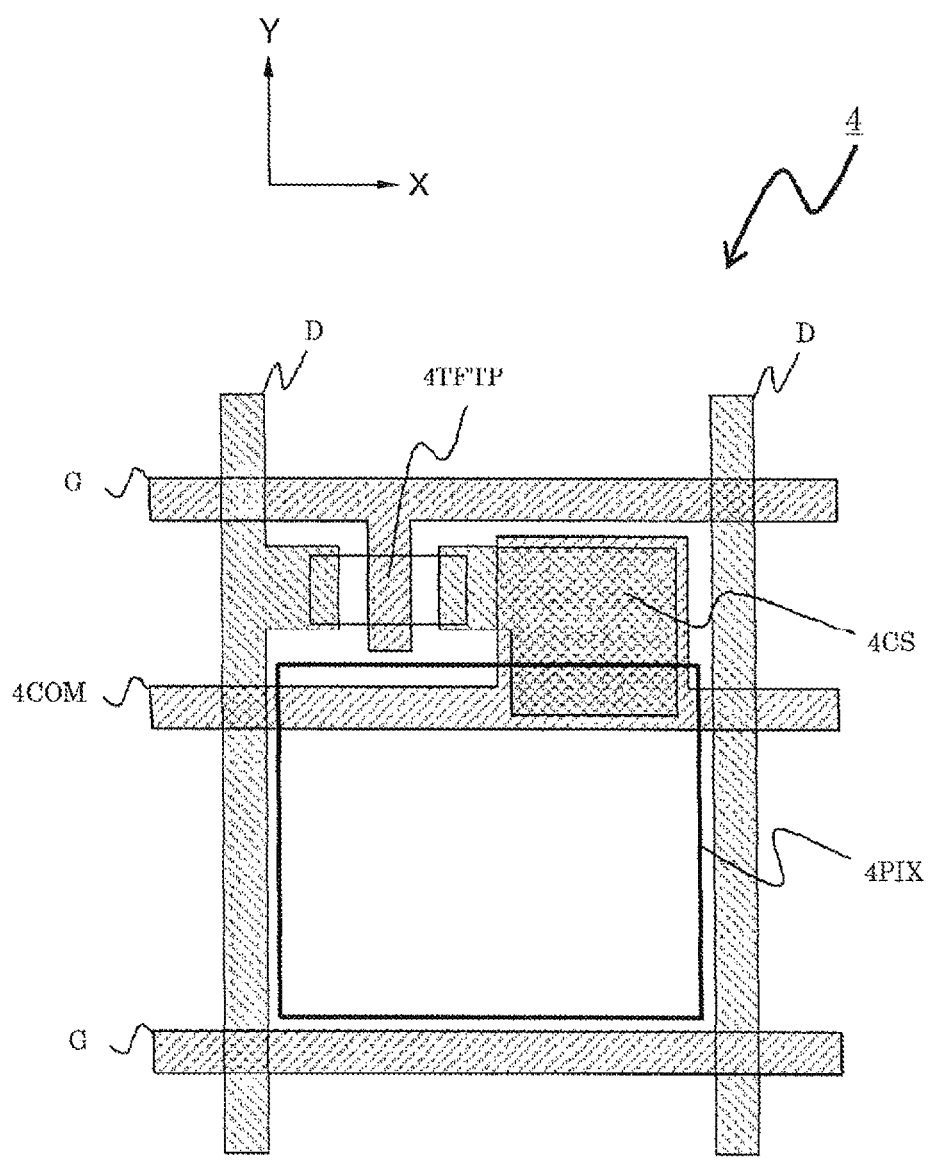
FIG. 3 is a top plan view showing pixels of the display device according to this exemplary embodiment.
Figure 4:
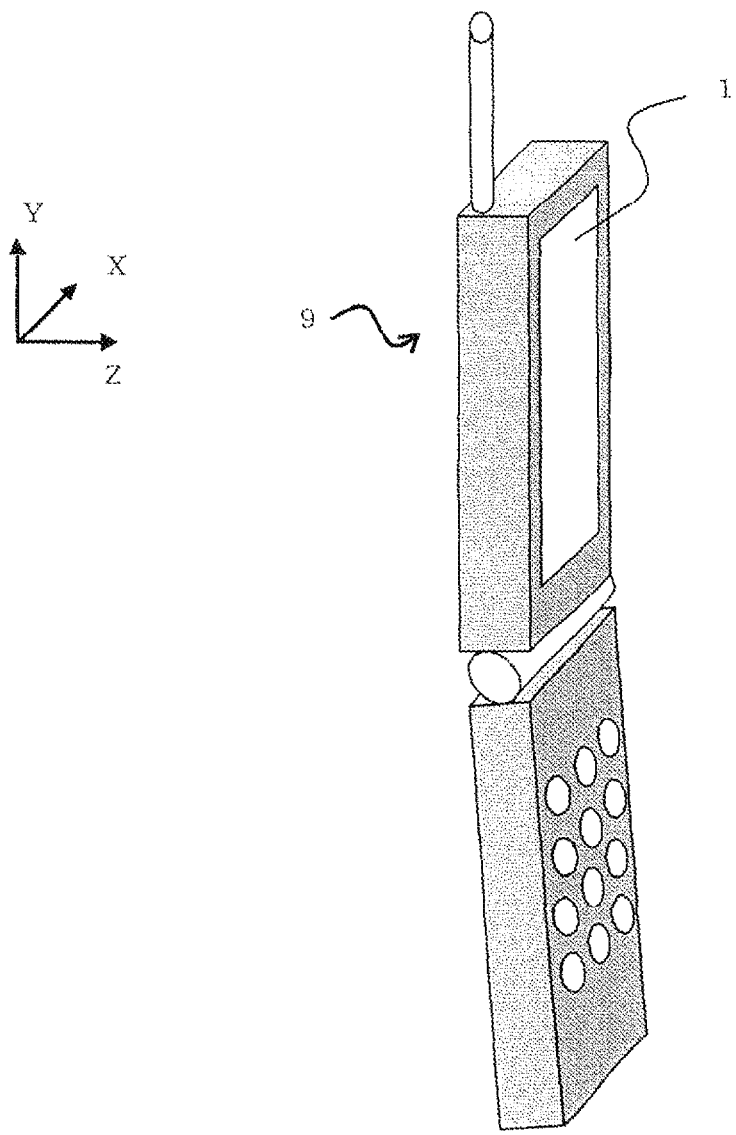
FIG. 4 is a perspective view showing a terminal device according to this exemplary embodiment.

Hereinafter, a display device, its driving method, a terminal device, and a display panel according to exemplary embodiments of the invention will be described in a concrete manner by referring to the accompanying drawings. First, the display device, its driving method, the terminal device, and the display panel according to a first exemplary embodiment of the invention will be described. FIG. 1 is a top plan view showing the display device according to the first exemplary embodiment of the invention, which, in particular, shows a relation between electrical circuit blocks and a lenticular lens as an image separating device. FIG. 2 is a sectional view showing the display device according to this exemplary embodiment. FIG. 3 is a top plan view showing pixels of the display device according to this exemplary embodiment, and FIG. 4 is a perspective view showing a terminal device according to this exemplary embodiment.

The present invention can be characterized as follows. That is, the present invention includes: a plurality of pixel units each having at least a pixel for displaying a first-viewpoint image and a pixel for displaying a second-viewpoint image; wirings for supplying display data to each of the pixels; switching devices disposed for each of M-number (M is an integer of 1 or larger) of wirings for supplying display data to the M-number of wirings by switching the wirings successively; and an optical element for distributing light emitted from each of the pixels configuring the display unit towards different directions from each other, wherein there is no deviation in the switching orders of the display data supplied by the switching device at each pixel group that is configured with the pixels for displaying the same-viewpoint image.

The switching device which is arranged for each of the M-number of wirings and supplies display data to the M-number of wirings by switching those wirings successively corresponds to the block division TFT array in the case of the conventional technique described above. In other words, the present invention is a display device that is provided with an image separating optical element such as a lenticular lens to be capable of displaying different images to a plurality of viewpoints, wherein there is no deviation in the pixel groups displaying images for each viewpoint, regarding the switching orders of the display data supplied from the block division switching device.

Further, provided that the wiring to which the display data is supplied first in each block is expressed as a first-phase wiring, for example, and the pixel to which the display data is supplied from the first-phase wiring is expressed as the a first-phase pixel, the pixel groups for each viewpoint can be configured without being deviated to pixels of a specific phase. Furthermore, provided that a data supplying operation for wirings of each phase is called "phase deployment operation", it can be also expressed that there is no deviation in the phase deployment operations for each viewpoint.

As mentioned above, with the phase deployment operation, it is known to have luminance differences and block-like unevenness generated thereby because of the phase deployment order, even when same video information is written in each phase. Meanwhile, the inventors of the present invention have zealously conducted studies and found that there is also different types of deterioration generated in the display image quality other than the conventional block-like unevenness, when the block division driving method is employed for the display device having the image separating optical element such as a lenticular lens.

With the block division driving method, there is a difference generated in the display depending on the data lines in each block. This is generated because of differences in position of each data line in each block and the switching order, etc. Thus, if there is deviation in the phase deployment order of the pixel groups for each viewpoint, there generates a change in the display image quality depending on the viewpoints. This makes it difficult to achieve the same image quality for each viewpoint. As a result, an observer perceives it as having deterioration in the quality of the display image.

As a way of example, a 2-viewpoint display device having pixels for displaying images for the left eye and pixels for displaying for the right eye will be discussed. The pixel group configured for each viewpoint described above corresponds to the pixel group configured with the pixels for displaying images for the left eye, for example. It is assumed in this display device that the left-eye pixel group is phase-deployed in the first phase, and the right-eye pixel group is phase-deployed in the second phase. This is a case where there is deviation in the phase deployment order in the pixel groups configured for each viewpoint. With such structure, the observer comes to observe images of different image quality for the left eye and the right eye, thereby perceiving it as having deterioration in the quality of the display image.

In order to overcome such issues, the present invention is configured to have no deviation in the phase deployment order in the pixel groups for each viewpoint.

Figure 6:
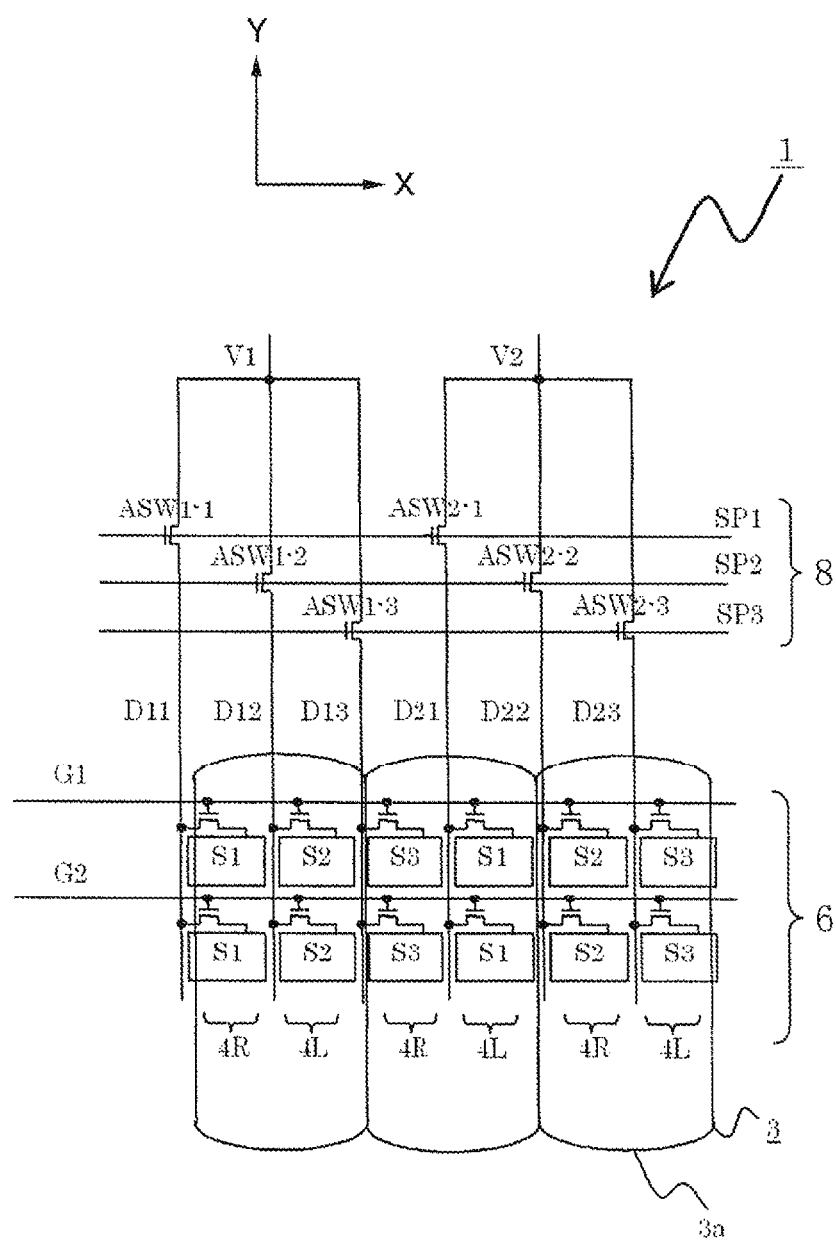
FIG. 6 is a top plan view showing a phase deployment order of left-eye pixels and right-eye pixels of the display device according to this exemplary embodiment.

As shown in FIG. 6, a display device 1 according to the exemplary embodiment includes: a pixel matrix 6 configured with pixel units S1 and S2, S3 and S1, S2 and S3, disposed in matrix, each including two neighboring pixels for respectively displaying images for two (as N) viewpoints, in which the pixels S1, - - - are disposed in the vicinity of each proximal point between gate lines G1, G2 as a plurality of scanning lines and a plurality of data lines D11-D23; a plurality of video signal lines V1, V2 for outputting display data; a wiring switching element 8 which successively switches and connects three (as M) data lines D11-D13, D21-D23 to each of the video signal lines V1, V2 so as to supply the display data to the pixels S1, - - - via the data lines D11, - - - ; and a lenticular lens 3 as an optical element for distributing the light emitted from each of the pixels s1, - - - configuring the pixel units S1-S3 into different directions from each other for the two viewpoints. Further, the display device 1 includes a structure having a relation of N and M (described later) as a switching order dispersing device for dispersing the switching orders by the wiring switching element 8 (corresponding to each of the pixels S1, - - - ,) within the right-eye pixel 4R and the left-eye pixel 4L as the pixel groups configured with the pixels S1, - - - for displaying images for the same viewpoint.

Conventionally, the switching order of the wiring switching element 8 for all the pixels S1, - - - within the right-eye pixels 4R is the first, for example, and the switching order for all the pixels S1, - - - within the left-eye pixels 4L is the second. Thus, there generates a difference on the display between the right-eye pixels 4R and the left-eye pixels 4L caused due to the switching order. Therefore, this embodiment improves the image quality by equalizing the switching orders as a whole for the right-eye pixels 4R and the left-eye pixels 4L through setting proper values for N and M.

The scanning line may be called a gate line when the pixel switch is a TFT. It is also called a scanning electrode in some cases. The data line may be called a signal line, a signal electrode, or a data electrode in some cases. As the pixel switch, not only the TFT but also a TFD (Thin Film Diode), MIM (Metal Insulator Metal), etc., may also be used. The pixel matrix may be formed as a simple matrix without using the pixel switches. As the pixels, EL (Electroluminescence), LED (Light Emitting Diode), etc., may also be used instead of the liquid crystal. Detailed explanations will be provided hereinafter.

As shown in FIG. 1 and FIG. 2, the display device according to the first exemplary embodiment is a display device 1 used for stereoscopic image display, which has the lenticular lens 3 provided to a display panel 2 that utilizes liquid crystal molecules as electro-optical elements. The lenticular lens 3 is disposed on the display surface side of the display panel 2, i.e., on the user side.

The display panel 2 is a two-viewpoint display panel for stereoscopic display, in which pixel pairs (as a display unit) each configured with one each of a left-eye pixel 4L and a right-eye pixel 4R are arranged in matrix. In this exemplary embodiment, the left-eye pixel 4L and the right-eye pixel 4R are also referred to as pixels 4 as a general term. The lenticular lens 3 is a lens array where a great number of cylindrical lenses 3a are arranged one-dimensionally. The cylindrical lens 3a is a one-dimensional lens having a semicylindrical convex part. The extending direction, i.e., the longitudinal direction, is a direction that is orthogonal to the arranging direction on the display surface. The cylindrical lens 3a exhibits no lens effect in the extending direction, and exhibits the lens effect only in the arranging direction that is orthogonal to the extending direction. Thus, the lenticular lens 3 is a one-dimensional lens array that exhibits the lens effect only in the arranging direction of the cylindrical lenses 3a. The arranging direction of the cylindrical lenses 3a is set as a direction towards which the left-eye pixel 4L and the right-eye pixel 4R are arranged in a repeated manner. The cylindrical lens 3a is arranged by corresponding to the display unit mentioned above.

The cylindrical lens 3a exhibits the lens effect only in the direction that is orthogonal to its extending direction, as described above. In this exemplary embodiment, the direction exhibiting the lens effect is consistent with the direction towards which the left-eye pixel 4L and the right-eye pixel 4R are arranged in a repeated manner. As a result, the cylindrical lens 3a works as a light separating device that is capable of separating light of the left-eye pixel 4L and light of the right-eye pixel 4R towards different directions. With this, the lenticular lens 3 can separate an image displayed at the left-eye pixel 4L and an image displayed at the right-eye pixel 4R of each display unit towards different directions. That is, the lenticular lens 3 is an optical member that works as an image separating device and an image distributing device. The focal distance of the cylindrical lens 3a is set as a distance between principal point of the cylindrical lanes 3a (the vertex of the lens) and the pixel surface (the surface on which the left-eye pixel 4L or the right-eye pixel 4R is arranged).

In the current Specification, XYZ Cartesian coordinate system is set as follows for conveniences' sake. Regarding the direction towards which the left-eye pixel 4L and the right-eye pixel 4R are arranged in a repeated manner, the direction from the right-eye pixel 4R towards the left-eye pixel 4L is defined as "+X direction", and the opposite direction is defined as "−X direction". The +X direction and the −X direction are referred to as X-axis direction as a general term. Further, the longitudinal direction of the cylindrical lens 3a is defined as Y-axis direction. Furthermore, the direction that is orthogonal to both the X-axis direction and the Y-axis direction is defined as Z-axis direction. Regarding the Z-axis direction, the direction from the surface on which the left-eye pixel 4L or the right-eye pixel 4R is deposited towards the lenticular lens 3 is defined as "+Z direction" and the opposite direction is defined as "−Z direction". That is, the +Z direction is a direction towards the front, i.e., towards a user, and the user visually recognizes the +Z side of the display panel 2. +Y direction is defined as a direction where a right-hand coordinate system applies. That is, the middle finger of the right hand of a person comes to point towards the +Z direction, when the thumb thereof points towards the +X direction, and the index finger points towards the +Y direction.

By setting the XYZ Cartesian coordinate system in the manner described above, the arranging direction of the cylindrical lenses 3a is the X-axis direction, and the image for the left eye and the image for the right eye are separated along the X-axis direction. Further, the pixel units each configured with the left-eye pixel 4L and the right-eye pixel 4R are arranged in line towards the Y-axis direction. The arranging cycle of the pixel pairs in the X-axis direction is substantially equal to the arranging cycle of the cylindrical lenses. The pixel units arranged in line in the Y-axis direction are arranged by corresponding to a single cylindrical lens 3a.

On the display panel 2, a TFT substrate 2a and a counter substrate 2b are disposed by having a minute space therebetween, and a liquid crystal layer 5LC is placed in the space. The TFT substrate 2a is placed on the −Z direction side of the display panel 2, and the counter substrate 2b is placed on the +Z direction side. That is, the lenticular lens 3 is arranged further on the +Z direction side of the counter substrate 2b.

The display panel 2 is an active-matrix type display panel having thin film transistors (TFT). The thin film transistors work as pixel switches for transmitting display signals to each pixel, and the switches are operated with gate signals that flow on gate lines connected to gates of respective switches. In this exemplary embodiment, gate lines G1 and G2 as the scanning lines extending in the row direction, i.e., in the X-axis direction, are provided on the surface on the inner side of the TFT substrate 2a, i.e., on the surface of the +Z direction. The gate lines G1 and G2 are also referred to as gate lines G as a general term. Further, on the same surface of the TFT substrate 2a, data lines D11-D23 extending in the column direction, i.e., in the Y-axis direction, are provided. The data lines D11-D23 are also referred to as data lines D as a general term. The data lines work to supply display data signals to the thin film transistors. Further, the pixel (left-eye pixel 4L or the right-eye pixel 4R) is disposed in the vicinity of each intersection point between the gate lines and the data lines, so that a plurality of the pixels are arranged in matrix. A thin film transistor is disposed for each pixel. Each of the pixels is in a state of being translated. That is, each pixel is arranged in a translated manner. "Translation" is to simply change the center position without making a point-symmetrical move or a line-symmetrical move.

A gate driver circuit 5G for driving the gate line G and a data driver circuit 5D for driving the data line D are disposed on the outside the area of the TFT substrate 2a where the pixels are formed. The gate driver circuit 5G is a circuit for successively scanning the gate lines G1 and G2. The data driver circuit 5D is configured with a video signal line driving circuit 5V, a block-division drive control circuit 5B, and switches ASW1-1 to ASW2-3. The switches ASW1-1 to ASW2-3 are also referred to as the switches ASW as a general term. The switch ASW is a MOS-type thin film transistor, having a source electrode, a drain electrode, and a gate electrode formed therein.

Output terminals of the video signal line driving circuit 5V are connected to video signal lines V1 and V2 (also referred to as video signal lines V as a general term hereinafter). That is, the video signal line driving circuit 5V is a circuit for supplying video signals to the video signal lines V. Further, the video signal line V1 is connected to input terminals (source electrodes, for example) of the switches ASW1-1, ASW1-2, and ASW1-3 as the wiring switches. The output terminal of the switch ASW1-1 (drain electrode, for example) is connected to the data line D11. Similarly, the output terminal of the switch ASW1-2 is connected to the data line D12, and the output terminal of the switch ASW1-3 is connected to the data line D13.

In the same manner, the video signal line V2 is connected to the input terminals of the switches ASW2-1 to ASW2-3, the output terminal of the switch ASW2-1 is connected to the data line D21, the output terminal of the switch ASW2-2 is connected to the data line D22, and the output terminal of the switch ASW2-3 is connected to the data line D23.

Output terminals of the block-division drive control circuit 5B are connected to control lines SP1 to SP3. Further, the control line SP1 is connected to each gate electrode of the switches ASW1-1 and ASW2-1. Similarly, the control line SP2 is connected to each gate electrode of the switches ASW1-2 and ASW2-2, and the control line SP3 is connected to each gate electrode of the switches ASW1-3 and ASW2-3.

As described above, the video signal line V1 is connected to the data lines D11 to D13 via the switches ASW1-1 to ASW1-3. This set of data lines connected to the same video signal line is referred to as a block. Further, the number of switches provided to each block or the number of control lines for controlling those switches is referred to as a phase deployment number. The phase deployment number of this exemplary embodiment is "3", and there is described a case of 3-phase deployment.

As described earlier, this exemplary embodiment has two viewpoints on the left and right sides. Thus, the exemplary embodiment is considered as the case of "2-viewpoint and 3-phase deployment". Provided that the number of viewpoints in the switching-order dispersion device is N and the phase deployment number is M, this exemplary embodiment can be expressed as "N=2, M=3, and N<M". Further, provided that a remainder of dividing the viewpoint number N of the switching-order dispersing device by the phase deployment number M is "NmodM", it can be expressed as "NmodM=2", and "NmodM≠0" applies in this exemplary embodiment. In short, in this exemplary embodiment, there is a relation of "N<M and NmodM≠0" between the viewpoint number N of the switching-order dispersing device and the phase deployment number M.

As shown in FIG. 1 and FIG. 3, a pixel electrode 4PIX, a pixel thin film transistor 4TFTP, a storage capacitance 4CS are provided to a pixel 4. The pixel thin film transistor 4TFTP is also a MOS-type thin film transistor, and its source electrode or drain electrode is connected to the data line D, and the other one is connected either to the pixel electrode 4PIX or to an electrode of the storage capacitance 4CS. In the present invention, it is so defined that the electrode to which the pixel electrode is connected is a source electrode, and the electrode connected to the signal line is a drain electrode. The gate electrode of the pixel thin film transistor 4TFTP is connected to the gate line G. A common electrode 4COM is connected to the other electrode of the storage capacitance 4CS. Further, the common electrode 4COM is also formed on the inner side of the counter substrate, and a pixel capacitance 4CLC is formed between the common electrode 4COM and the pixel electrode 4PIX. In FIG. 3, each structural element is illustrated in appropriate size and reduced scale for securing the visibility of the drawing. Further, the structure of the pixel 4 is common to the left-eye pixel 4L and the right-eye pixel 4R.

The thin film transistor for configuring the ASW and a pixel thin film transistor 4TFTP according to the exemplary embodiment are NMOS-type thin film transistors in which the source electrode and the drain electrode become electrically conductive when a potential level of the gate electrode becomes higher than that of the source electrode or the drain electrode. When the potential level of the gate electrode becomes lower than that of the source electrode or the drain electrode, the source electrode and the drain electrode become electrically nonconductive.

As shown in FIG. 4, the terminal device according to this exemplary embodiment is a portable telephone 9. The display device 1 described above is loaded on the portable telephone 9. The X-axis direction of the display device 1 is a lateral direction of a screen of the portable telephone 9, and the Y-axis direction of the display device 1 is a vertical direction of the screen of the portable telephone 9.

Figure 5:
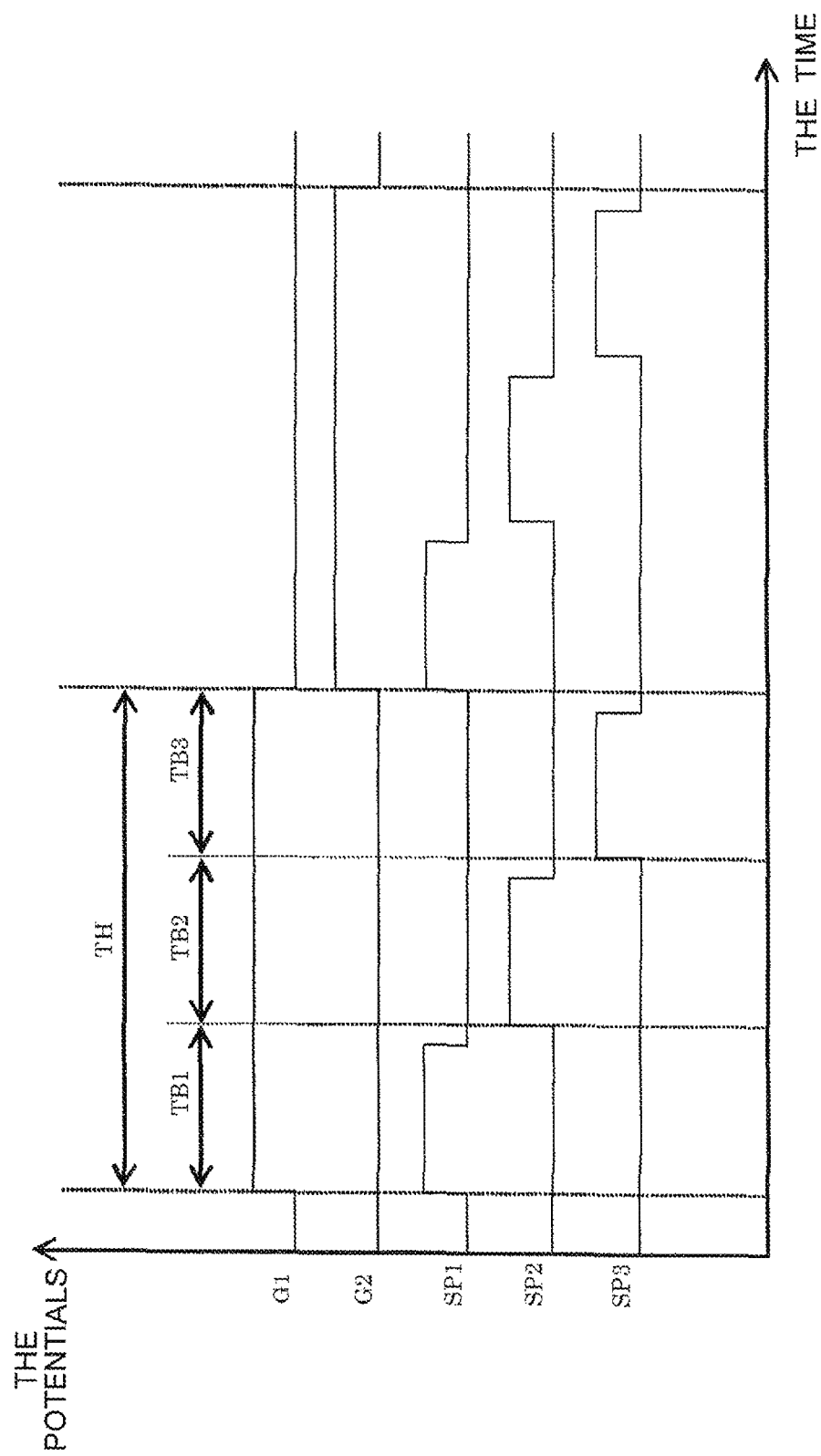
FIG. 5 is a timing chart showing operation of the display device according to this exemplary embodiment, in which the lateral axis is the time and the vertical axis is the potentials of each wiring.

Next, operations of the display device according to the exemplary embodiment structured as described above will be described. FIG. 5 is a timing chart showing the operations of the display device according to the exemplary embodiment, in which the lateral axis is the time and the vertical axis is the potentials of each wiring.

A driving method of the display device according to the exemplary embodiment will first be described by referring to FIG. 5. First, the gate driver circuit 5G outputs a high-level potential to the gate line G1. At this time, the gate line G2 is in low level. As shown in FIG. 5, the period where the each gate line becomes high level is one horizontal period TH. One horizontal period TH is the period where the video signal is written to a single pixel row which is connected to each gate line. After the gate line G1 becomes high level, the block-division control circuit 5B turns only the control line SP1 to high level, and keeps the control lines SP2 and SP3 as low level. The period where the control line SP1 becomes high level is TB1. When the control line SP1 becomes high level, the switches ASW1-1 and ASW2-1 become electrically conductive. Thereby, the video signal line V1 becomes electrically conductive with the data line D11, and the video signal line V2 becomes electrically conductive with the data line D21. Then, the video signal line driving circuit 5V outputs, to the video signal line V1, the signal to be written to the pixel that is connected to the gate line G1 and the data line D11. This signal is written to the storage capacitance 4CS and the pixel capacitance 4CLC of the pixel that is connected to the gate line G1 and the data line D11, after passing through the video signal line V1, the switch ASW1-1, the data line D11, and the pixel transistor that is in a conductive state. Similarly, the video signal line driving circuit 5V outputs, to the video signal line V2, the signal to be written to the pixel that is connected to the gate line G1 and the data line D21. The video signal is written to the corresponding pixel via the video signal line V2, the switch ASW2-1, and the data line D21.

When the period TB1 ends, the control line SP1 turns to low level, and the control line SP2 turns to high level. With this, the switches ASW1-1 and ASW2-1 become electrically nonconductive, and the switches ASW1-2 and ASW2-2 become electrically conductive. Then, the signal from the video signal line driving circuit 5V is written to the pixel that is connected to the gate line G1 and the data line D12 via the video signal line V1, the switch ASW1-2, and the data line D12. This is the same for the pixel that is connected to the gate line G1 and the data line D22.

When the period TB2 ends, the control line SP2 turns to low level, and the control line SP3 turns to high level. The control signal SP1 remains low level. With this, the switches ASW1-3 and ASW2-3 become electrically conductive. Then, the signal from the video signal line driving circuit 5V is written to the pixel that is connected to the gate line G1 and the data line D13 via the video signal line V1, the switch ASW1-3, and the data line D13. This is the same for the pixel that is connected to the gate line G1 and the data line D23.

The signal outputted from the video signal line driving circuit 5V is written to the pixel connected to the gate line G1 and the data line D11 in the period TB1 where the switch ASW1-1 becomes electrically conductive. However, the gate line G1 remains high level also after the period TB1 ends. Thus, the potential held in the data line D11 is continuously supplied to the pixel. This state continues until the gate line G1 becomes low level, i.e., during the periods TB2 and TB3. This is a first-phase writing operation in the 3-phase deployment display device.

In the meantime, with a third-phase wiring operation, for example, the gate line G1 becomes low level immediately after the period TB3 ends, considering the case of the pixel that is connected to the gate line G1 and the data line D13. Therefore, supply of the potential ends only in the period TB3. As described, there are differences that cannot become completely equivalent regarding the first-phase, second-phase, and third-phase writing operations.

Then, when the gate line G1 turns to low level, one horizontal period TH ends. Thereby, the next gate line G2 turns to high level, and the next horizontal period TH is started. The operation of this period, i.e., the horizontal period where the gate line G2 turns to high level, is the same operation as that of the horizontal period where the gate line G1 turns to high level.

In this exemplary embodiment, as described above, the gate driver circuit 5G scans the gate lines G successively, the block-division control circuit 5B controls each switch ASW, and the video signal line driving circuit 5V outputs the signal to be written to the corresponding pixel. With this, an image of a whole screen can be displayed. This operation is repeatedly executed.

As described above, when the driving method of the display device is determined, the phase deployment order of each pixel is determined as well. In the meantime, each pixel is allotted to the left-eye pixel 4L or the right-eye pixel 4R according to the relative positional relation with respect to the cylindrical lenses 3a that configure the lenticular lens 3. The relation regarding the phase deployment order of each pixel and the allotment of the pixels for each viewpoint is important with the present invention, so that the relation thereof will be described by referring to FIG. 6.

FIG. 6 is a top plan view showing the phase deployment order of the left-eye pixels and the right-eye pixels of the display device according to this exemplary embodiment. As shown in FIG. 6, the writing operations for the pixels connected to the data line D11 and the data line D21 are executed in the first phase, so that those pixels are marked as "S1". Similarly, the writing operations for the pixels connected to the data line D12 and the data line D22 are executed in the second phase, so that those pixels are marked as "S2". The writing operations for the pixels connected to the data line D13 and the data line D23 are executed in the third phase, so that those pixels are marked as "S3".

In the meantime, due to the positional relation with respect to the cylindrical lenses 3a, the pixels connected to the data lines D11, D13, and D22 are allotted for the right-eye pixels 4R, while the pixels connected to the data lines D12, D21, and D23 are allotted for the right-eye pixels 4L. Under a normal stereoscopic condition, the right eye of the observer is to visually recognize the right-eye pixels and the left eye is to visually recognize the left-eye pixels. Therefore, the right eye of the observer is to visually recognize the state where the pixel columns are arranged in the X-axis direction in order of the pixel column that is phase-deployed in the first phase, the pixel column that is phase-deployed in the third phase, and the pixel column that is phase-deployed in the second phase. Further, the left eye of the observer is to visually recognize the state where the pixel columns are arranged in the X-axis direction in order of the pixel column that is phase-deployed in the second phase, the pixel column that is phase-deployed in the first phase, and the pixel column that is phase-deployed in the third phase.

In FIG. 6, the wiring switching element 8 distributes the right-viewpoint (right-eye) image signal supplied to the data line D11 to the pixel (S1) out of the display unit S1-S2, and distributes the left-viewpoint (left-eye) image signal supplied to the data line D21 to the pixel (S1) out of the display unit S3-S1. Further, the wiring switching element 8 distributes the left-viewpoint (left-eye) image signal supplied to the data line D12 to the pixel (S2) out of the display unit S1-S2, and distributes the right-viewpoint (right-eye) image signal supplied to the data line D22 to the pixel (S2) out of the display unit S2-S3. Furthermore, the wiring switching element 8 distributes the right-viewpoint (right-eye) image signal supplied to the data line D13 to the pixel (S3) out of the display unit S3-S1, and distributes the left-viewpoint (left-eye) image signal supplied to the data line D23 to the pixel (S3) out of the display unit S2-S3.

In this manner, the display device according to this exemplary embodiment is driven with 3-phase deployment, and all the left eye pixels are allotted to each of the whole phases, i.e., the first phase, the second phase, and the third phase. This is the same for the right-eye pixels. That is, the pixel groups for each viewpoint are not deviated to a specific phase deployment order (switching order). In addition, each of the phases is allotted equally to the pixel groups of each viewpoint. Moreover, there is no difference generated between each of the viewpoints.

Next, effects of the exemplary embodiment will be described. With this exemplary embodiment, it is possible to suppress deterioration of the display image quality caused due to a combination of the phase deployment operation executed by the block driving method and the image separating device such as the lenticular lens. The reasons will be described below. As mentioned above, there are differences in the writing operations of each phase in the phase deployment operations. Supposing that there is deviation in the phase deployment order for the pixel groups of each viewpoint (e.g., there is deviation in the left-eye pixel group), it becomes difficult to achieve the equivalent display qualities for each viewpoint if the left-eye pixel group is configured only with the pixels to which the signal is written in the first phase, and the right-eye pixel group is configured only with the pixels to which the signal is written in the second phase. As a result, the observer perceives it as having deterioration in the display image quality.

In the exemplary embodiment, the pixel groups for each viewpoint are configured without being deviated to a specific phase deployment order. Thereby, the displays for each viewpoint can be made uniform, so that the deterioration in the display image quality can be suppressed. Further, it is important to have each of the phases distributed equally in order to achieve uniform displays for each viewpoint. For example, when the left-eye pixel group is configured with the pixels to which the signals are written in the first phase and the second phase, and the right-eye pixel group is configured with the pixels to which the signals are written in the second phase and the third phase, it is difficult to suppress the deterioration in the display image quality completely even though the display image quality can be improved than the case where the phases of the pixels are different for each viewpoint. It is desirable to have each of the phases distributed equally for each viewpoint.

Further, the pixels of each phase are almost equally distributed in the pixel groups for each viewpoint in this exemplary embodiment, and there is no difference between each of the viewpoint. This makes it possible to provide completely uniform image qualities for each viewpoint, so that deterioration in the display image quality can be prevented.

More specifically, it can be expressed as follows. That is, the display device according to this exemplary embodiment includes: a display panel having a plurality of pixel units each including at least pixels for displaying images for N-number of viewpoints (N is an integer of 2 or more) arranged in matrix, in which each of the pixels is provided at each proximal point between the data lines and the gate lines; an image distributing device which distributes the light emitted from each pixel towards different direction from each other along a first direction towards which the pixels for displaying the images for the first to N-th viewpoints are arranged within the display unit; and a M-phase phase deployment circuit which puts the data lines into sets of M-numbers (M is an integer) of lines, and switches the supply of voltages to the first to the M-th data lines successively. There is a relation of "N<M and NmodM≠0" between the viewpoint number N of the switching-order dispersing device and the phase deployment number M. This exemplary embodiment can be considered particularly as a case where "N=2 and M=3". With this, deterioration in the display image quality can be prevented completely.

More specifically, it can be expressed as follows. That is, the display device according to the exemplary embodiment is a display device which displays images towards two or more different directions by supplying image signals to two or more pixels connected to two or more scanning lines and two or more data lines, respectively. The display device may be structured, including: two or more pixel units S1-S2, S2-S3, S3-S1, - - - including neighboring pixels for displaying images for two or more viewpoints, respectively; an optical element 3 for distributing the light emitted from each of the pixels configuring the pixel units towards two or more different directions; two or more video signal lines V1, V2, - - - for outputting the image signals for achieving displays towards the two or more different directions to the two or more data lines that are connected, respectively, to the two or more pixels configuring the display unit; and the wiring switching element 8 including one or more control lines SP1, SP2, - - - for controlling connections between the two or more data lines and the video signal lines, and the wiring switches ASW1-1, ASW2-1, - - - for distributing the image signals for achieving display in the two or more directions to the pixels of the two or more pixel units based on the control signals inputted to the control lines.

In this case, the display device may be structured as follows: a plurality of pixel units each including N-number of neighboring pixels for displaying images for the N-number (N is 2 or larger) of viewpoints are disposed, while the pixel is disposed in the vicinity of each proximal point between a plurality of scanning lines and a plurality of data lines; the optical element distributes the light emitted from each of the pixels configuring the pixel units towards different directions from each other for the N-number of viewpoints; the wiring switches supply the display data to the pixels via the data lines by switching and connecting the M-number (M is an integer of 1 or larger) of data lines for each of the video signal line; and the wiring switching element allocates the switching order of the wiring switches for each pixel within the pixel group configured with the pixels for displaying the images for the same viewpoint.

It is desirable for the plural-viewpoint display device such as a stereoscopic image displaying device to have the pixels as many as possible to display for a plurality of viewpoints. When the block-division driving method is applied to such display device, the scale of the driving circuit can be reduced. This is extremely advantageous for reducing the cost.

Figure 7:
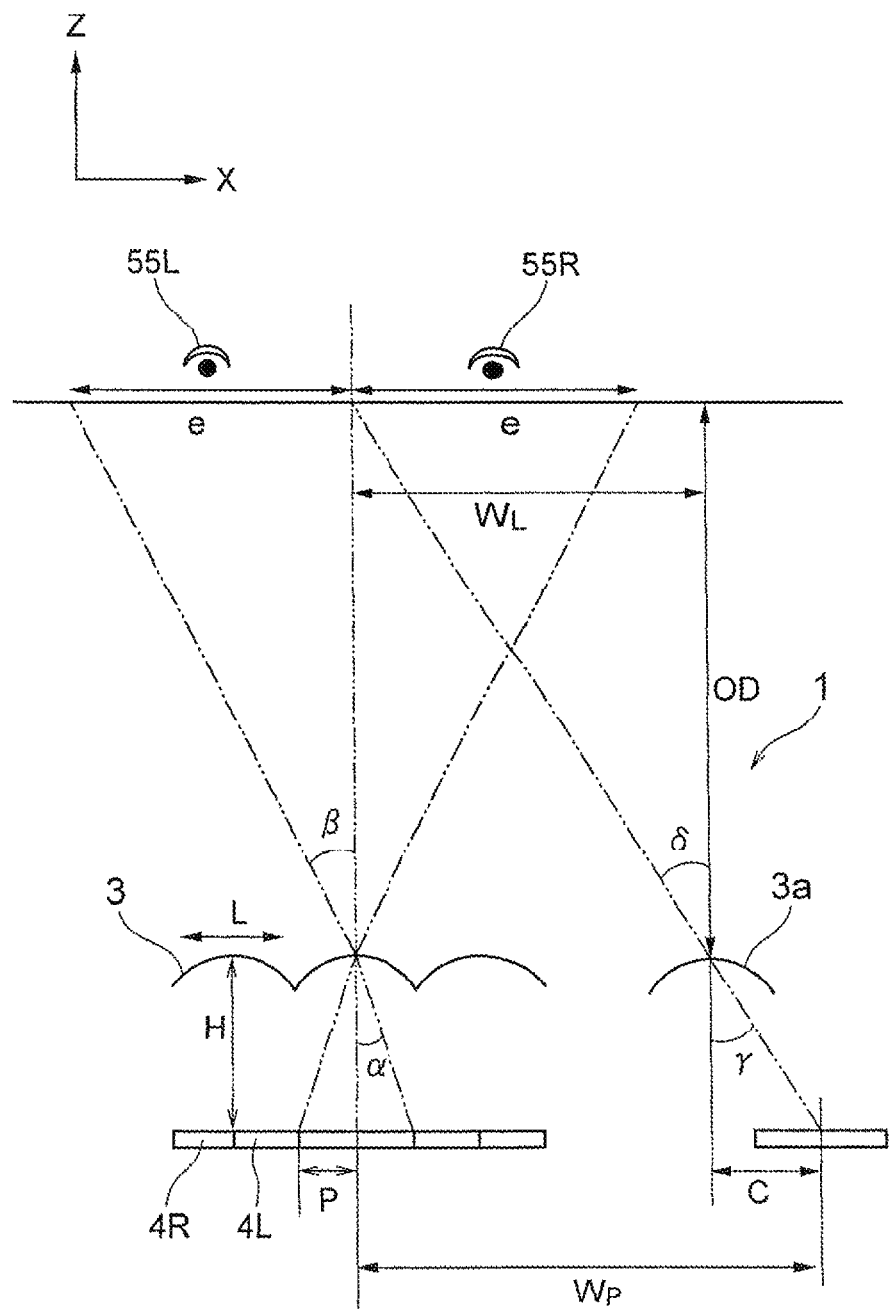
FIG. 7 is a sectional view showing an optical model of a case using a lenticular lens.

Here, an example of the structure of the stereoscopic image display device according to the exemplary embodiment and conditions for the lenticular lens to work as the image distributing device will be described in detail. In this exemplary embodiment, the image distributing device needs to distribute the light emitted from each pixel towards different directions from each other along a first direction in which the left-eye pixel and the right-eye pixel are arranged, i.e., in the X-axis direction. First, a case of exhibiting the image distributing effect to the maximum will be described by referring to FIG. 7.

It is assumed that the distance between the principle point (i.e., vertex) of the lenticular lens 3 and the pixel is H, the refractive index of the lenticular lens 3 is n, and the lens pitch is L. In this case, the arranging pitch of each of the left-eye pixel 4L and the right-eye pixel 4R is P. In this case, the arranging pitch of the display unit configured one each of the left-eye pixel 4L and the right-eye pixel 4R is 2P.

Further, the distance between the lenticular lens 3 and an observer is defined as an optimum observing distance OD, a cycle of enlarged projection image of the pixel at the distance OD, i.e., a cycle of the width of the projection images of the left-eye pixel 4L and the right-eye pixel 4R on a virtual plane that is in parallel to the lens and is away from the lens by the distance OD, is defined as "e" for each. Further, the distance from the center of the cylindrical lens 3a located at the center of the lenticular lens 3 to the center of the cylindrical lens 3a located at the end of the lenticular lens 3 in the X-axis direction is defined as WL, and the distance between the center of the display unit configured with the left-eye pixel 4L and the right-eye pixel 4R located in the center of the reflection-type liquid crystal display panel 2 and the center of the display unit located at the end of the display panel 2 in the X-axis direction is defined as WP. Furthermore, the light incident angle and the light exit angle of the cylindrical lens 3a located in the center of the lenticular lens 3 are defined as α and β, respectively, and the light incident angle and the light exit angle of the cylindrical lens 3a located at the end of the lenticular lens 3 in the X-axis direction are defined as γ and δ, respectively. Further, the difference between the distance WL and the distance WP is defined as C, and the number of pixels contained in the area of distance WP is defined as 2 m.

There is a mutual relationship between the arranging pitch L of the cylindrical lenses 3a and the arranging pitch P of the pixels. Thus, one of the pitches is determined depending on the other. Normally, the arranging pitch P of the pixels is taken as the constant, since the lenticular lens is designed in accordance with the display panel in many cases. Further, the refractive index n is determined depending on the selection of the material for the lenticular lens 3. In the meantime, desired values are set for the observing distance OD between the lens and the observer, and the cycles "e" of the pixel enlarged projection images at the observing distance OD. The distance H between the lens vertex and the pixel as well as the lens pitch L is determined by using those values. Following Expressions 1-6 apply, according to Snell's law and geometrical relations. Further, following Expressions 7-9 apply.

$$n \times \sin \alpha = \sin \beta \qquad 1$$

$$OD \times \tan \beta = e \qquad 2$$

$$H \times \tan \alpha = P \qquad 3$$

$$n \times \sin \gamma = \sin \delta \qquad 4$$

$$H \times \tan \gamma = C \qquad 5$$

$$OD \times \tan \delta = WL \qquad 6$$

$$WP - WL = C \qquad 7$$

$$WP = 2 \times m \times p \qquad 8$$

$$WL = m \times L \qquad 9$$

As mentioned above, the case of exhibiting the image distributing effect to the maximum will be discussed. This is a case where the distance H between the vertex of the lenticular lens and the pixel is set to be equal to the focal distance f of the lenticular lens. With this, Expression 10 in the following applies. Further, assuming that the curvature radius of the lens is r, the curvature radius r is obtained from Expression 11 in the followings.

$$f = H \qquad 10$$

$$r = H \times (n-1)/n \qquad 11$$

The parameters above can be summarized as follows. That is, the arranging pitch P of the pixels is a value determined depending on the display panel, and the observing distance OD and the cycles e of the pixel enlarged projection images are values determined according to the setting of the display device. The refractive index n is determined depending on the material and quality of the lens and the like. The arranging pitch L of the lenses and the distance H between the lens and the pixels calculated from those values can be the parameters for determining the positions where the light from each pixel is projected on the observing plane.

The parameter that changes the image distributing effect is the curvature radius r of the lens. That is, if the curvature radius of the lens is changed from an ideal state in a case where the distance H between the lens and the pixel is fixed, the images at the pixels on the left and right become blurred. Thus, the images cannot be separated clearly. That is, it is necessary to find a range of the curvature radius with which the effective separation can be performed.

Figure 8:
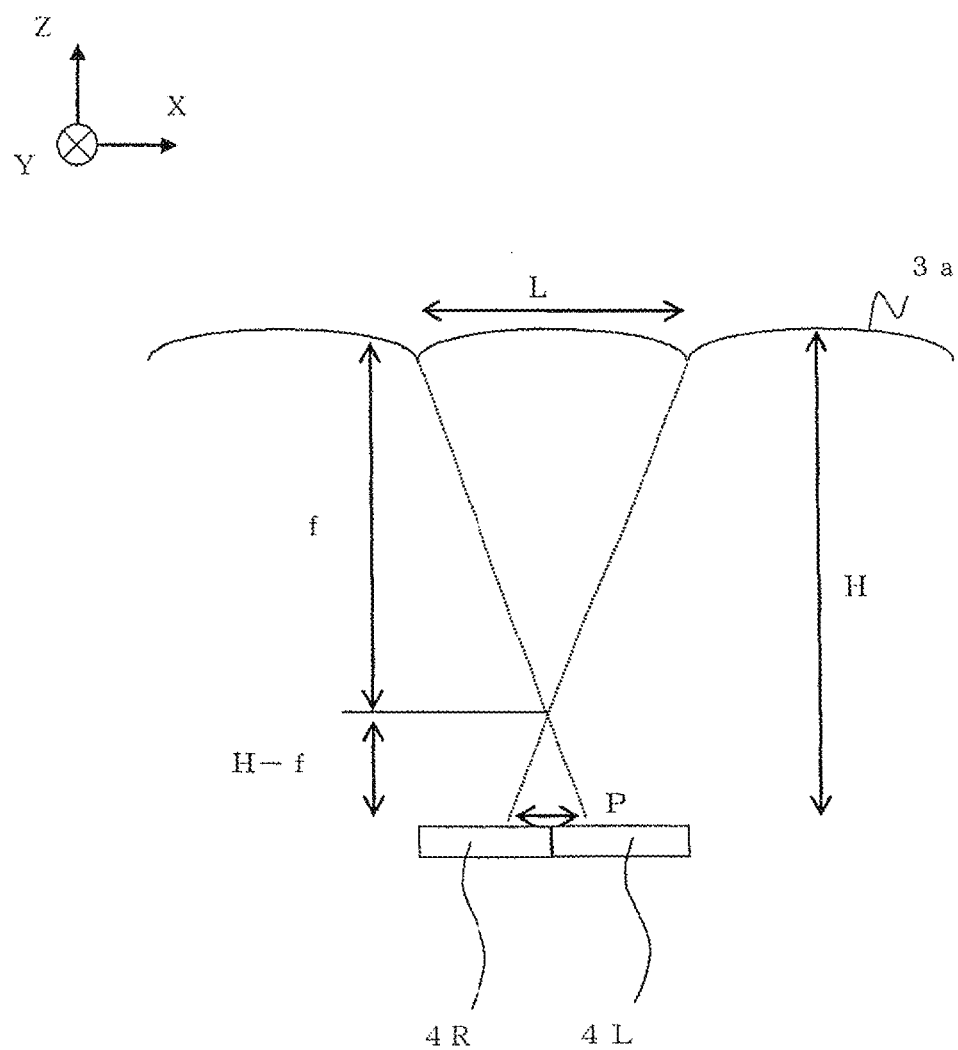
FIG. 8 is an illustration of the optical model at the time of minimum curvature radius for calculating an image separating condition of the lenticular lens.

First, the minimum value in the range of the curvature radius for producing the separating effect of the lens is calculated. As shown in FIG. 8, in order to have the separating effect, it is necessary to have a relation of similarity between a triangle having the lens pitch L as the base and the focal distance f as the height and a triangle having the pixel pitch P as the base and H-f as the height.

With that, Expression 12 in the followings applies, and the minimum value of the focal distance, "fmin", can be obtained.

$$f\min = H \times L/(L+P) \qquad 12$$

Then, the curvature radius is calculated from the focal distance. The minimum value of the radius curvature, "rmin", can be calculated as in Expression 13 by using Expression 11.

$$rmin = H \times L \times (n-1)/(L+P)/n \quad 13$$

Figure 9:
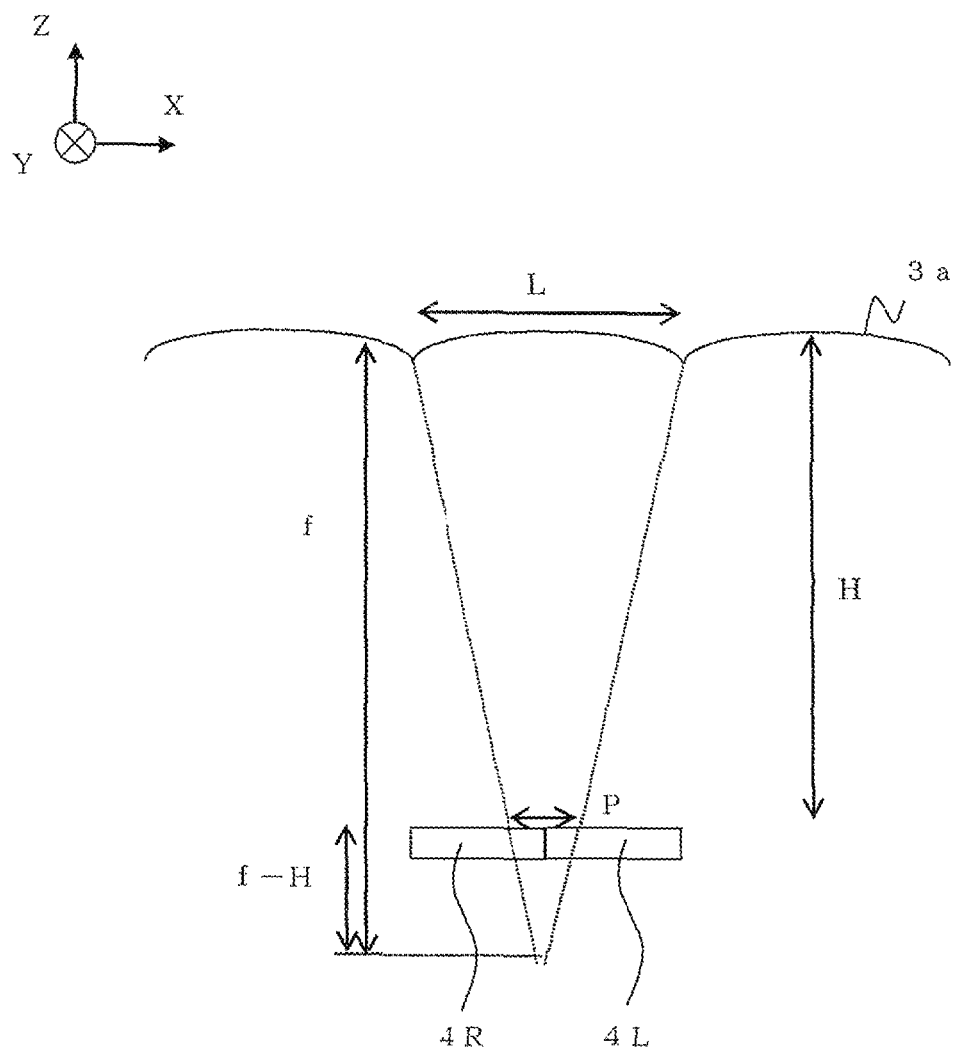
FIG. 9 is an illustration of the optical model at the time of maximum curvature radius for calculating an image separating condition of the lenticular lens.

Then, the maximum value is calculated. As shown in FIG. 9, in order to have the separating effect, it is necessary to have a relation of similarity between a triangle having the lens pitch L as the base and the focal distance f as the height and a triangle having the pixel pitch P as the base and f-H as the height.

With that, Expression 14 in the followings applies, and the maximum value of the focal distance, "fmax", can be obtained.

$$fmax = H \times L/(L-P) \quad 14$$

Next, the curvature radius is calculated from the focal distance. The maximum value of the curvature radius, "rmax", can be obtained as in Expression 15 by utilizing Expression 11.

$$rmax = H \times L \times (n-1)/(L-P)/n \quad 15$$

In short, it is necessary for the curvature radius of the lens to fall within the range of Expression 16 obtained from Expression 13 and Expression 15, in order for the lens to achieve the image distributing effect.

$$H \times L \times (n-1)/(L+P)/n \leq r \leq H \times L \times (n-1)/(L-P)/n \quad 16$$

In the above, the stereoscopic image display device of two viewpoints having left-eye pixels and right-eye pixels has been described. However, the present invention is not limited only to that. For example, the exemplary embodiment of the invention can be applied to an N-viewpoint type display device in the same manner. In this case, the number of pixels contained in the area of the distance WP may be changed from "2 m" to "N×m" in the definition of the distance WP described above.

Figure 10:
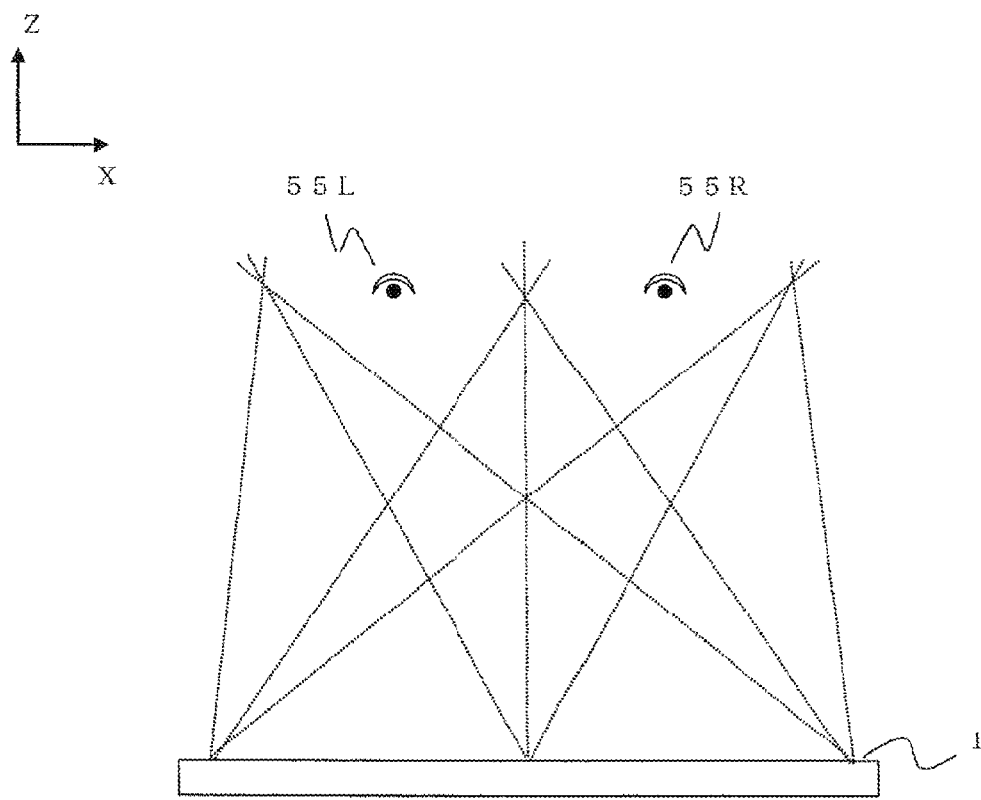
FIG. 10 is a conceptual diagram showing a light condensing system.

The explanations above are of the type which sets a plurality of viewpoints on the observing plane, and emits the light of the pixels for each viewpoint from all the pixel units on the display surface towards each of the set viewpoints. This type is also referred to as a light converging type, since it collects the light of corresponding viewpoints towards a certain viewpoint. The two-viewpoint stereoscopic image display device described above and multiple-viewpoint-type stereoscopic image display device with the number of viewpoints increased are classified as the light converging type. FIG. 10 shows a conceptual diagram of the light converging type. It is a feature of the light converging type that it displays images by regenerating the light rays that make incident on the observer's eyes. The exemplary embodiment of the invention can be effectively applied to such light converging type.

Figure 11:
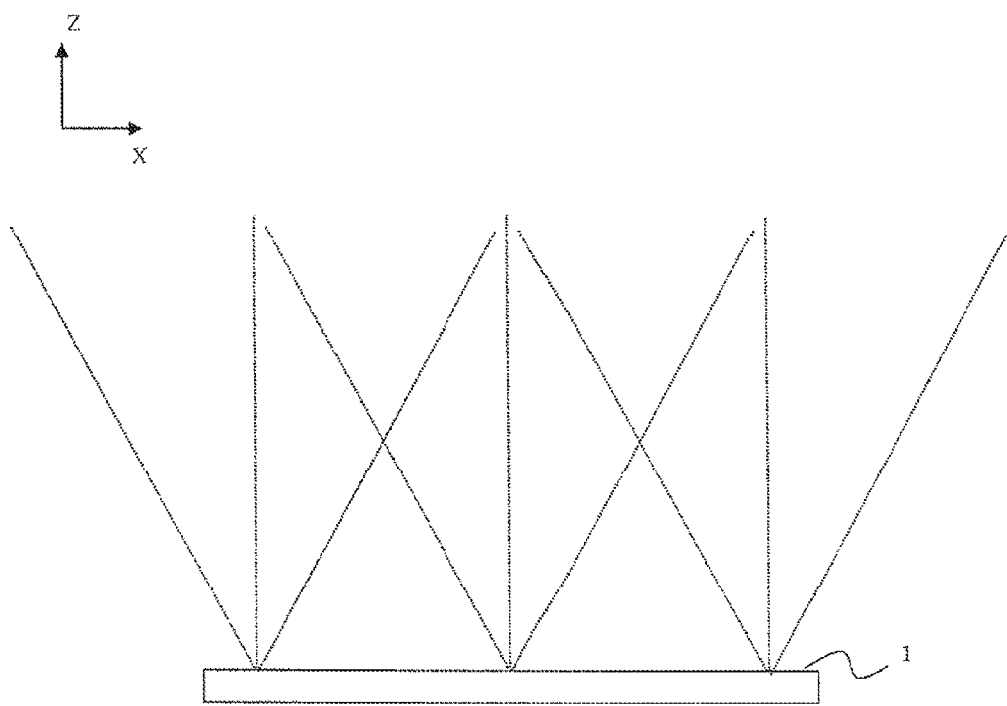
FIG. 11 is a conceptual diagram showing a spatial image system.

Further, as shown in FIG. 11, there are also proposed types such as a spatial image type and a spatial image reproducing type, a spatial image regenerating type, a spatial image forming type, and the like. Unlike the light converging type, the spatial image types do not set specific viewpoints. The spatial image types are different from the light converging type in respect that images are displayed to regenerate the light emitted from objects in the space. Stereoscopic image display devices such as an integral photography type, an integral videography type, and an integral imaging type are classified as such spatial image types. With the spatial image type, an observer at an arbitrary position does not visually recognize only the pixels for a same viewpoint on the entire display surface. However, there are a plurality of kinds of areas with a prescribed width formed by the pixels for a same viewpoint. In each of those areas, the present invention can achieve the same effect as that of the light converging type described above. Thus, the present invention can also be applied to the spatial image type effectively.

Note here that the term "viewpoint" in this exemplary embodiment means as "the position from which the display device is observed (observing position)" and "a point or an area where the eyes of the user are to be located" but not "a certain point on the display area the user pays special attention (viewing point)".

For simplifying the explanations, the number of the gate lines and the number of the data lines in this exemplary embodiment are limited to the numbers required for the explanations. However, the exemplary embodiment of the invention is not limited to such numbers, and the essential of the exemplary embodiment of the invention is not affected by those numbers. In this exemplary embodiment in particular, the data lines are arranged periodically and repeatedly by having six lines as the minimum unit in the X-axis direction that is the arranging direction of the data lines. The minimum unit number of the data lines, "6", is the product of the viewpoint number N=2 and the phase deployment number M=3. The pitch for the data line unit to be periodically and repeatedly disposed can be expressed as "N×M×P", provided that the pixel pitch is P. It is necessary to make the cycle of the phase deployment invisible to the user, in order to reduce the influence of the phase deployment operations further so as to achieve still higher image quality.

Now, the visibility of the phase deployment cycle will be described in detail. The visibility also depends on the eyesight of the human beings and the observing distance. There is a stereoscopic visual field in stereoscopic display, so that the observing distance is assumed to be within that visual field. First, the stereoscopic visual field will be described.

Figure 12:
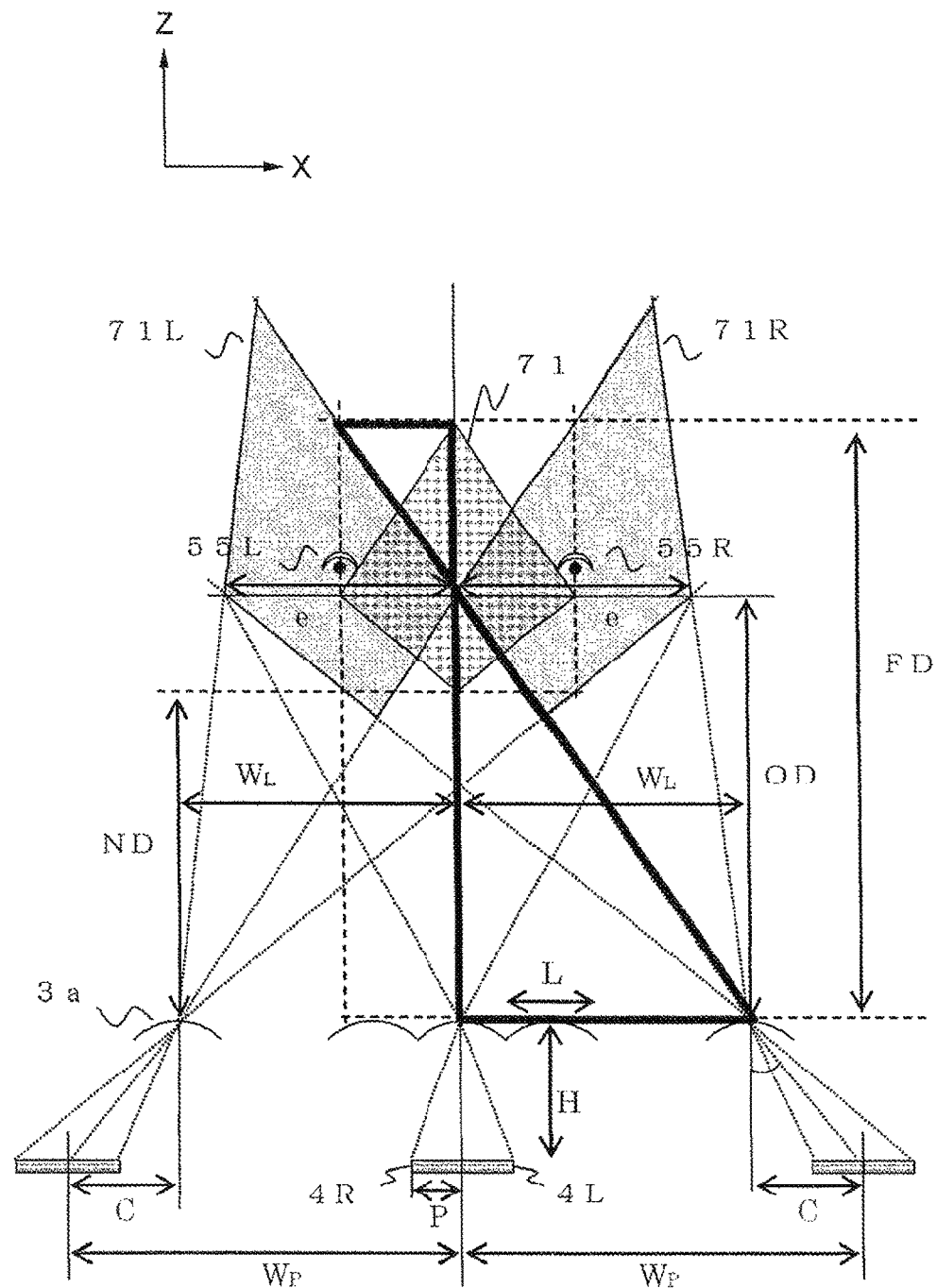
FIG. 12 is a sectional view showing an optical model for calculating the maximum observing distance.

FIG. 12 is a sectional view showing an optical model for calculating the maximum observing distance regarding the lenticular-lens type display device. The light emitted from an arbitral left-eye pixel of the display panel is deflected by the lenticular lens towards a prescribed area. This area is a left-eye area 71L. Similarly, the light emitted from an arbitral right-eye is deflected towards a right-eye area 71R. When the user places the left eye 55L at the left-eye area 71L and the right eye 55R at the right-eye area 71R, different images can be formed to the left and right eyes. If these images are parallax images, the user can visually recognize a stereoscopic image.

However, it is not possible to place each of the eyes to arbitrary positions of the left-eye area 71L and the right-eye area 71R. This is because there is a restriction set due to the distance between both eyes. According to a literature, the distances between both eyes of human beings are almost the same. As a way of example, the mean value of the distances of both eyes of male adults is 65 mm and the standard deviation is ±3.7 mm, while the mean value of the distances of both eyes of female adults is 62 mm and the standard deviation is ±3.6 mm (Neil A. Dodgson, "Variation and extreme of human interpupillary distance", Proc. SPIE Vol. 5291). Therefore, when designing a stereoscopic display device, it is appropriate to set the distance value between both eyes to be within the range of 62-65 mm, and so that a value of about 63 mm is used. It is necessary to calculate the stereoscopic visual field by adding the restriction in the distance between both eyes to the sizes of the left-eye area and the right-eye area.

Here, the widths of the left-eye area and the right-eye area will be described. As mentioned above, the cycle of enlarged projection image of each pixel at the optimum observing distance OD is defined as "e." This value is preferable to be set as equal to the distance between both eyes. If the cycle "e" is smaller than the distance between both eyes, the stereoscopic visual field width becomes small because it is restricted by the cycle "e." In the meantime, if the cycle "e" is larger than the distance between both eyes, the stereoscopic visual field width becomes restricted by the distance between both eyes even though it is not restricted by the cycle "e." In addition, visual recognition using side robes generated in an oblique direction becomes difficult. Thus, the stereoscopic visual field width does not become expanded by expanding the cycle "e." Based on the reasons above, the cycle "e" is set as equal to the distance between both eyes.

Thereby, the maximum observing distance in the stereoscopic visual field becomes the intersection point between the locus of the light emitted from the display unit located at the end of the display panel in the X-axis direction and the center line of the left-eye area or the right-eye area in the X-axis direction. Paying attention now to the light ray emitted from the center of the display unit located at the end of the display panel in the X-axis direction, there is a relation of similarity between a triangle having "WL" as the base and the optimum observing distance "OD" as the height and a triangle having "e/2" as the base and "FD−OD" as the height. Therefore, following Expression 17 applies. From this, the maximum observing distance FD can be obtained as expressed in following Expression 18.

$$WL:OD=e/2:FD-OD \qquad 17$$

$$FD=OD \times (WL+e/2)/WL \qquad 18$$

Figure 13:
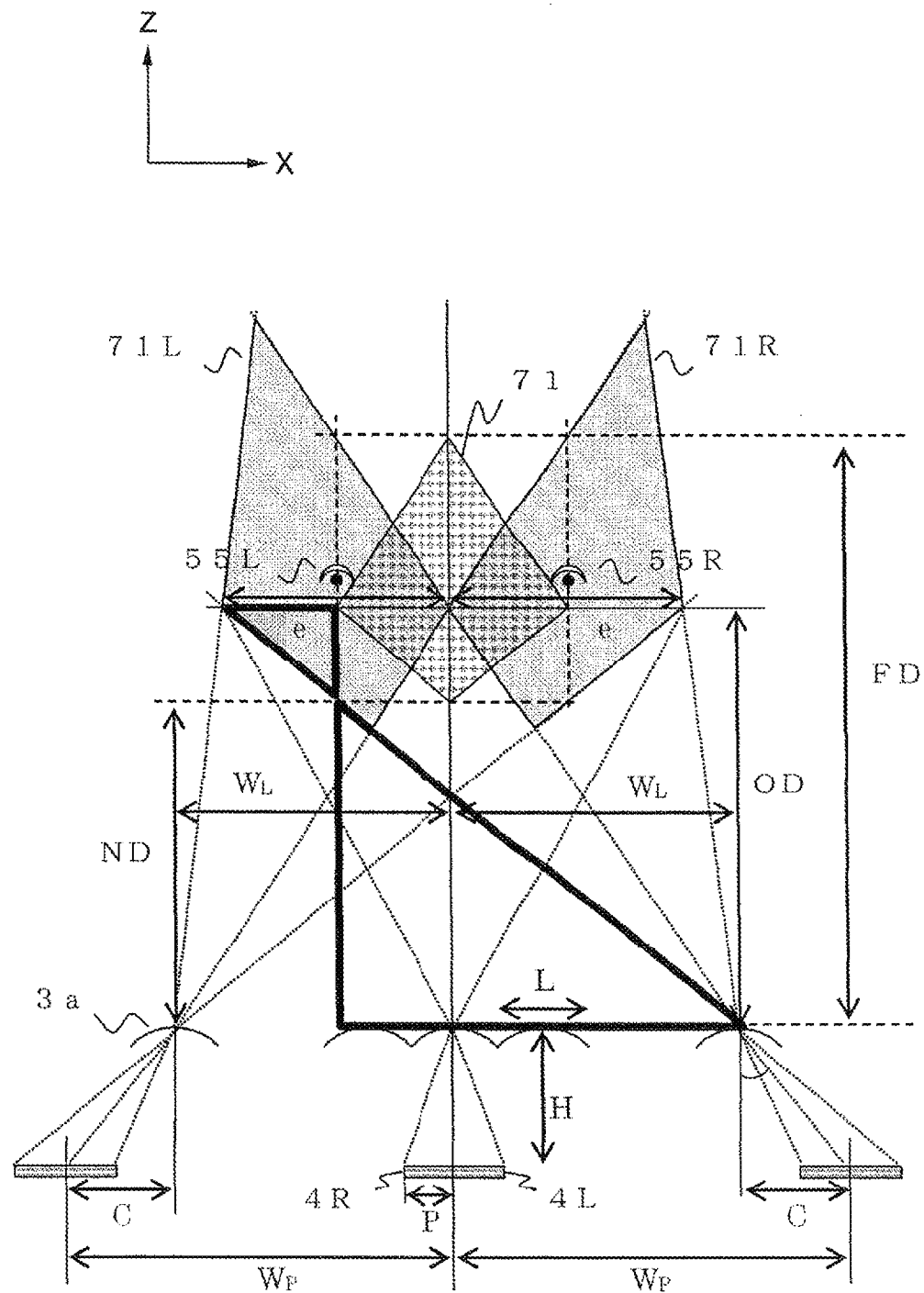
FIG. 13 is a sectional view showing an optical model for calculating the minimum observing distance.

Next, the minimum observing distance will be calculated. FIG. 13 is a sectional view showing an optical model for calculating the minimum observing distance regarding the lenticular-lens type display device. The minimum observing distance in the stereoscopic visual field becomes the intersection point between the locus of the light emitted from the display unit located at the end of the display panel in the X-axis direction and the center line of the left-eye area or the right-eye area in the X-axis direction. Paying attention to the light ray emitted from the right-side (in the drawing) end of the display unit located at the end of the display panel in the X-axis direction, there is a relation of similarity between a triangle having "WL+e/2" as the base and the minimum observing distance "ND" as the height and a triangle having "e/2" as the base and "OD−ND" as the height. Therefore, following Expression 19 applies. From this, the minimum observing distance ND can be obtained as expressed in following Expression 20.

$$e/2:OD-ND=WL+e/2:ND \qquad 19$$

$$ND=OD \times (WL+e/2)/(WL+e) \qquad 20$$

With the above, a stereoscopic visual field 71 is calculated. This area has a diamond-like quadrilateral shape, as shown in FIG. 12 or FIG. 13. The width thereof in the x-axis direction is a half the cycle "e" of the enlarged projection image of the pixel. The width in the Y-axis direction is a difference between the maximum observing distance FD and the minimum observing distance ND.

For the visibility of the phase deployment cycle, it is preferable that the user cannot recognize it when the user is within the stereoscopic visual field. For example, it is essential to be visually unrecognizable from the maximum observing distance FD that is the farthest end of the stereoscopic visual field from the display device, and it is preferable to be visually unrecognizable from the optimum observing distance OD. Further, it is perfect if the phase deployment cycle cannot be recognized from the minimum observing distance ND.

Figure 14:
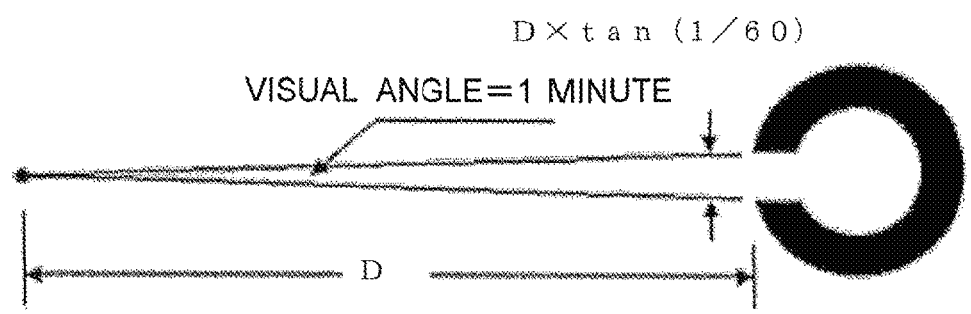
FIG. 14 is a conceptual diagram showing a definition of eyesight.

Now, a relation between the visibility of the phase deployment cycle (i.e., visual range) and the phase deployment cycle will be described in detail. It is necessary to set the width of the light shielding area to be equal to or less than the resolution of the eyesight of the observer, in order for the user not to visually recognize the light shielding area. As shown in FIG. 14, a relation between the eyesight of the observer and the recognizable minimum visual angle can be obtained from a following Expression 21.

$$\text{Eyesight}=1/\text{visual angle(minute)} \qquad 21$$

Normally, eyesight of human beings is 1.0. Thus, the minimum visual angle of the observer having the eyesight of 1.0 is calculated as 1 minute, i.e., $1/60$ degrees from Expression 21. In this case, the resolution of the eyes of the observer at the observing distance D (mm) is "D×tan ($1/60$) (mm)". Note that the unit of angles in tan is "degree", and "tan ($1/60$) (mm)" is 0.00029 as a specific value. Therefore, the width of the light shielding area can be made smaller than the resolution of the eyes by setting the phase deployment cycle "M×N×P" to be smaller than "D×tan ($1/60$) (mm)". This makes it possible to prevent the light shielding area from being visually recognized by the user.

In short, it is necessary to set the phase deployment cycle "M×N×P" to be smaller than "FD×tan ($1/60$) (mm)", and preferable to be smaller than "FD×tan ($1/60$) (mm)". Furthermore, when it is smaller than "ND×tan ($1/60$) (mm)", influences by the phase deployment operations can be reduced further in all the areas of the stereoscopic visual field, thereby still higher image quality can be obtained.

In the above, described is the case of using the lens with the maximum performance for separating the left and right images. However, the exemplary embodiment of the invention can also be applied to a case of a pin-hole type barrier with the maximum separating performance. In the case of using the lens, the stereoscopic visual field becomes narrower than the above-described value under a defocus setting, i.e., when the focal-point plane of the lens is shifted from the pixel face. It is the same when the aperture of the barrier is set larger. However, when the stereoscopic visual field is narrower, there is no change in the optimum observing distance OD. The maximum observing distance FD becomes smaller and becomes closer to the optimum observing distance OD, while the minimum observing distance ND becomes larger and becomes closer to the optimum observing distance OD. Therefore, the above-described condition calculated for the case where the separating performance becomes the maximum can also be applied to the case where the separating performance is decreased.

Further, the exemplary embodiment has been so described that the source electrode and the drain electrode of the thin film transistor become conductive, when the potential of the gate electrode becomes higher than the potential of the source electrode or the drain electrode. It is also possible to use so-called a PMOS-type thin film transistor which becomes conductive when the potential of the gate electrode becomes lower than the potential of the source electrode or the drain electrode.

Further, while it has been described that the switches ASW are formed on the TFT substrate by using thin film transistors, the present invention is not limited only to such case. The whole data driver circuit may also be formed as an integrated circuit on a different substrate such as a silicon wafer.

The lenticular lens according to the exemplary embodiment has been described by referring to the structure where the lens plane is arranged on the plane in the +Z direction that is the direction of the user side. However, the exemplary embodiment of the present invention is not limited to such case. The lens plane may be arranged on the plane in the −Z direction that is the direction on the display panel side. In this case, the distance between the lens and the pixels can be made shorter, so that it is advantageous for achieving high definition.

Further, it is not essential for the lenticular lens to be arranged in parallel to the extending direction of the gate lines. The lenticular lens may be arranged by being rotated. Further, the viewpoint number N may not necessarily be an integer. This is because the essential and important point of the present invention is that the pixel groups of each viewpoint are not deviated to a specific phase deployment order, i.e., the switching order. The high image quality can be achieved not only with the one-dimensional image separating device such as the lenticular lens but also with a two-dimensional image separating device such as a fly-eye lens, by having such a structure that the pixel groups of each viewpoint are not deviated to a specific phase deployment order.

Further, the display unit may be formed in a square. To form the display unit in a square means that the pitch in the X-axis direction of the display unit is the same as the pitch in the Y-axis direction. In other words, all the pitches for repeatedly arranging the pixel units are the same in the direction towards which the pixel units are arranged.

Further, the display panel according to the exemplary embodiment has been described as a liquid crystal display panel that utilizes liquid crystal molecules as electro-optical elements. As the liquid crystal display panel, not only a transmissive liquid crystal display panel but also a reflective liquid crystal display panel, a transflective liquid crystal display panel, a small-reflective liquid crystal display panel that has a larger proportion of the transmission area than the reflection area, a small-transmissive liquid crystal display panel that has a larger proportion of the reflection area than the transmission area, and the like can be employed. Further, the driving method of the display panel can be applied suitably to the TFT type. As the thin film transistors of the TFT type, not only those using amorphous silicon, low-temperature polysilicon, high-temperature polysilicon, or a single crystal silicon, but also those using an organic substance such as pentacene, metal oxide such as zinc oxide, or carbon nanotube may be employed suitably. Further, as described above, when the whole data driver circuit is formed as an integrated circuit on a silicon wafer as described above, the present invention can also be applied to an active-matrix type such as TFD (Thin Film Diode) type and a passive-matrix type such as STN (Super Twisted Nematic Liquid crystal) type. Furthermore, the exemplary embodiment of the invention does not depend on the structure of the thin film transistor. A bottom-gate type, a top-gate type, a stagger type, an inverted stagger type, and the like may be employed suitably. Furthermore, the exemplary embodiment of the invention can be applied to display panels other than the liquid crystal type, such as an organic electro-luminescence display panel, a plasma display panel, an LED (Light Emitting Diode) display panel, a field emission display panel, or a PALC (Plasma Address Liquid Crystal).

Further, a portable telephone is described as the terminal device in this exemplary embodiment. However, the exemplary embodiment of the invention is not limited only to that, but may be applied to various kinds of portable terminal devices such as PDAs, personal TVs, game machines, digital cameras, digital video cameras, and notebook-type personal computers. Furthermore, the exemplary embodiment can be applied not only to the portable terminal devices but also to various kinds of fixed terminal devices such as cash dispensers, vending machines, monitors, and television receiver sets.

As an exemplary advantage according to the invention, it is possible to achieve a high image quality in a display device that is provided with an image separating optical element such as a lenticular lens or a parallax barrier, for example, by suppressing deterioration in the display image quality caused when a driving method such as a block division driving method is employed, through structuring each pixel groups for displaying a same-viewpoint image to have no deviation in the phase deployment order.

Figure 15:
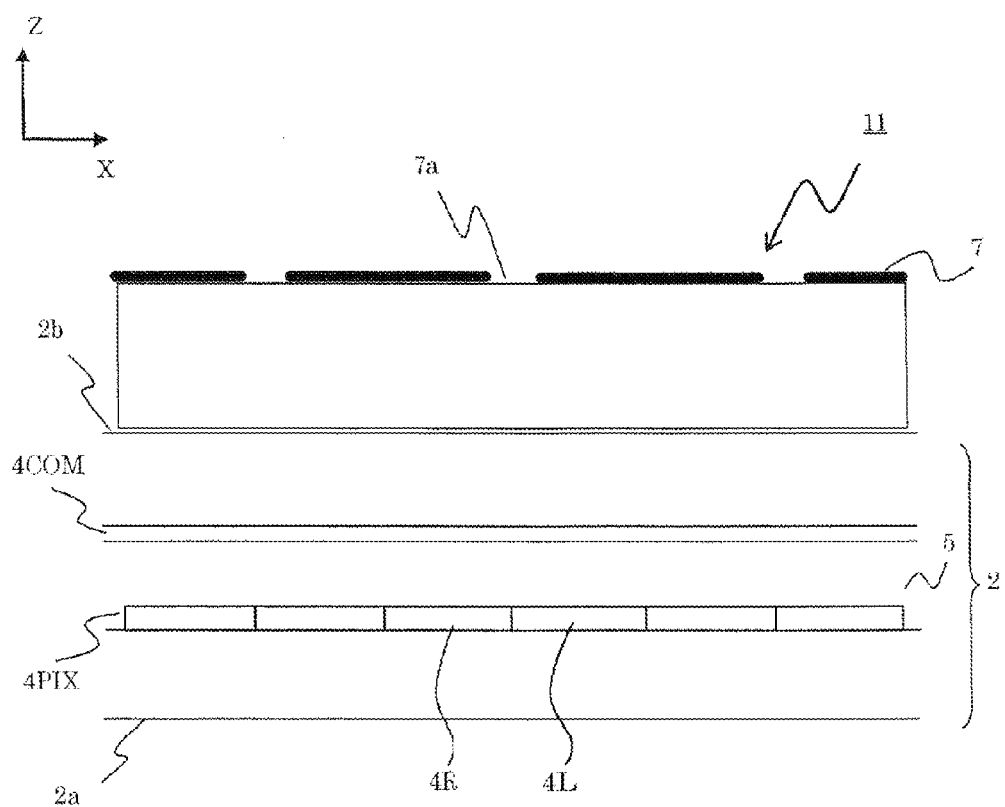
FIG. 15 is a sectional view showing a display device according to a second exemplary embodiment of the invention.

Next, a second exemplary embodiment of the invention will be described. FIG. 15 is a sectional view showing display device according to the second exemplary embodiment of the invention. Compared to the first exemplary embodiment of the invention, the second exemplary embodiment is different in respect that it uses a parallax barrier as the image distributing device instead of using the lenticular lens. As shown in FIG. 12, in a display device 11 of this exemplary embodiment, a parallax barrier 7 that is a slit array having a great number of slits 7a provided in the X-axis direction is disposed. Other structures of the second exemplary embodiment are the same as those of the first exemplary embodiment described above.

This exemplary embodiment implements reduction of the cost, since the parallax barrier can be fabricated easily by using photolithography. This is also due to the fact that the parallax barrier is in a flat two-dimensional shape, whereas the lenticular lens is in a three-dimensional shape having a structure in the height direction. However, there is no light loss caused by the image separating device, when the lenticular lens is used. Therefore, the lenticular lens type is advantageous in terms of achieving bright reflection display.

Here, conditions for the parallax barrier to work as the image distributing device will be described in detail. First, the parallax barrier system will be described by referring to FIG. 16.

The parallax barrier 7 is a barrier (light shielding plate) on which a great number of thin vertically striped openings, i.e., the slits 7a, are formed. In other words, the parallax barrier is an optical member in which a plurality of slits extending in a second direction that is orthogonal to a first direction to be the distributing direction are formed to be arranged along the first direction. When light emitted from a left-eye pixel 4L toward the parallax barrier 7 transmits through the slits 7a, it turns out as a light flux that travels towards an area EL. Similarly, when light emitted from a right-eye pixel 4R toward the parallax barrier 7 transmits through the slits 7a, it turns out as a light flux that travels towards an area ER. When an observer places the left eye 55L at the area EL and the right eye 55R at the area ER, the observer can recognize a stereoscopic image.

Figure 16:
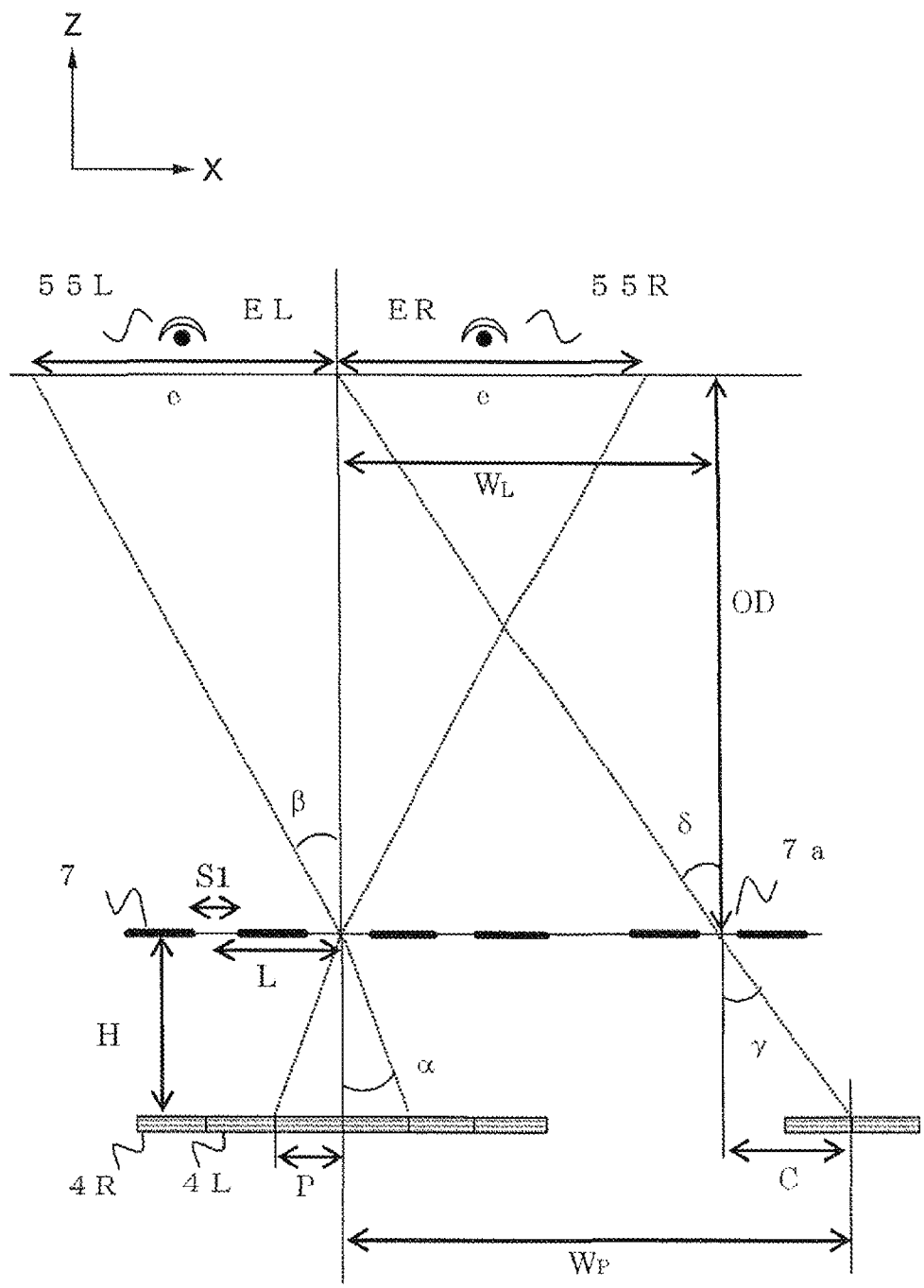
FIG. 16 is a sectional view showing an optical model of a case using a parallax barrier.

Next, a stereoscopic display device having a parallax barrier with slit-like openings formed on the front face of a display panel will be described in detail, regarding the sizes of each part. As shown in FIG. 16, an arranging pitch of the slits 7a of the parallax barrier 7 is defined as L, and distance between the parallax barrier and the pixels is defined as H.

Further, distance between the parallax barrier 7 and the observer is defined as an optimum observing distance OD. Furthermore, distance from the center of a slit 7a positioned at the center of the parallax barrier 7 to the center of a slit 7a positioned at the end of the parallax barrier 7 in the X-axis direction is defined as WL. The parallax barrier 7 itself is a light shielding plate, so that incident light does not transmit therethrough except for the slits 7a. However, a substrate for supporting a barrier layer is to be provided, and the refractive index of the substrate is defined as n. If there is no supporting substrate provided therein, the refractive index n may be set as "1" that is the refractive index of the air. With such definitions, the light emitted from the slit 7a is refracted according to the Snell's law when it is emitted from the substrate that supports the barrier layer. Here, the light incident angle and the light exit angle regarding the slit 7a located in the center of the parallax barrier 7 are defined as α and β, respectively, and the light incident angle and the light exit angle at the slit 7a located at the end of the parallax barrier 7 in the X-axis direction are defined as γ and δ, respectively. Further, the opening width of the slit 7a is defined as S1. There is a mutual relationship between the arranging pitch L of the slits 7a and the arranging pitch P of the pixels. Thus, one of the pitches is determined depending on the other. Normally, the arranging pitch P of the pixels is taken as the constant since the parallax barrier is designed in accordance with the display panel in many cases. Further, the refractive index n is determined depending on the selection of the material for the supporting substrate of the barrier layer. In the meantime, desired values are set for the observing distance OD between the parallax barrier and the observer, and the cycles "e" of the pixel enlarged projection images at the observing distance OD. The distance H between the barrier and the pixel as well as the barrier pitch L is determined by using those values. Following Expressions 22-27 apply, according to Snell's law and geometrical relations. Further, following Expressions 28-30 apply.

$$n \times \sin \alpha = \sin \beta \quad 22$$

$$OD \times \tan \beta = e \quad 23$$

$$H \times \tan \alpha = P \quad 24$$

$$n \times \sin \gamma = \sin \delta \quad 25$$

$$H \times \tan \gamma = C \quad 26$$

$$OD \times \tan \delta = WL \quad 27$$

$$WP - WL = C \quad 28$$

$$WP = 2 \times m \times P \quad 29$$

$$WL = m \times L \quad 30$$

In the above, the two-viewpoint stereoscopic image display device having left-eye pixels and right-eye pixels has been described. However, the exemplary embodiment of the invention is not limited only to that. For example, the exemplary embodiment of the invention can be applied to an N-viewpoint type display device in the same manner. In this case, the number of pixels contained in the area of the distance WP may be changed from "2 m" to "N×m" in the definition of the distance WP described above.

The parameters above can be summarized as follows. That is, the arranging pitch P of the pixels is a value determined depending on the display panel, and the observing distance OD and the cycle "e" of the enlarged projection images are values determined according to the setting of the display device. The refractive index n is determined depending on the material and quality of the supporting substrate and the like. The arranging pitch L of the slits and the distance H between the parallax barrier and the pixels calculated from those values can be the parameters for determining the positions where the light from each pixel is projected on the observing plane. The parameter that changes the image distributing effect is the opening width S1 of the slits. That is, when the distance H between the barrier and the pixels is fixed, the smaller the opening width S1 of the slits, the clearer the images at the pixels on the left and right sides can be separated. This is the same principle as the case of a pinhole camera. Thus, when the opening width S1 becomes larger, the images at the pixels on the left and right sides become blur. Thus, those images cannot be separated clearly.

Figure 17:
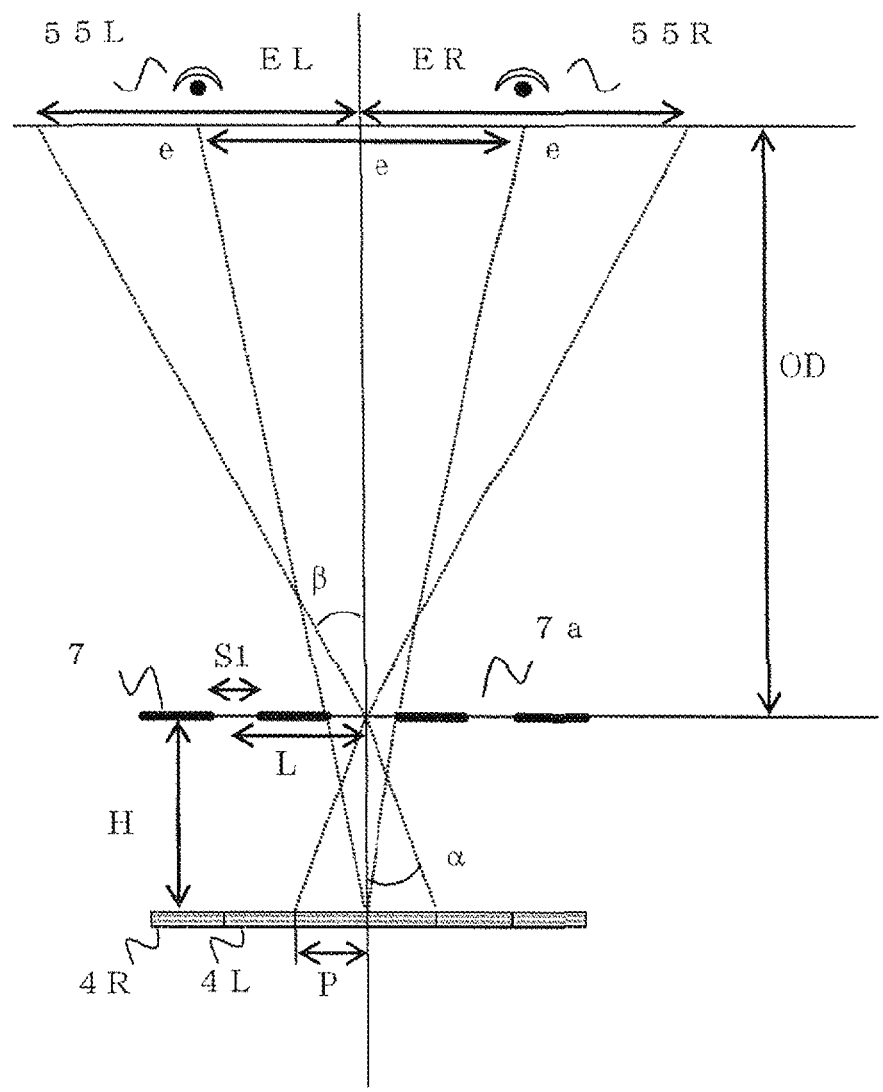
FIG. 17 is an illustration of an optical model at the time where the opening width of slits is the maximum, for calculating an image separating condition of the parallax barrier.

The range of the widths of the slits with which effective separation can be achieved by the parallax barrier can be calculated more intuitively than the case of the lens type. As shown in FIG. 17, the light emitted from the boundary between the left-eye pixel 4L and the right-eye pixel 4R is narrowed into the width S1 that is the opening width of the slit, when passing through the slit 7a. Then, it travels the distance OD and reaches the observing plane. In order to have the separating effect, the width at the observing plane needs to be equal to "e" or smaller. If the width becomes wider than that, it is larger than the projection cycle of the left and right pixels, so that the images cannot be separated. The opening width of the slit 7a in this case is a half the slit pitch L. That is, the range of the width of the slits with which effective separation can be achieved by the parallax barrier is ½ of the slit pitch or smaller.

Effects of the second exemplary embodiment other than those described above are the same as those of the first exemplary embodiment described above.

Figure 18:
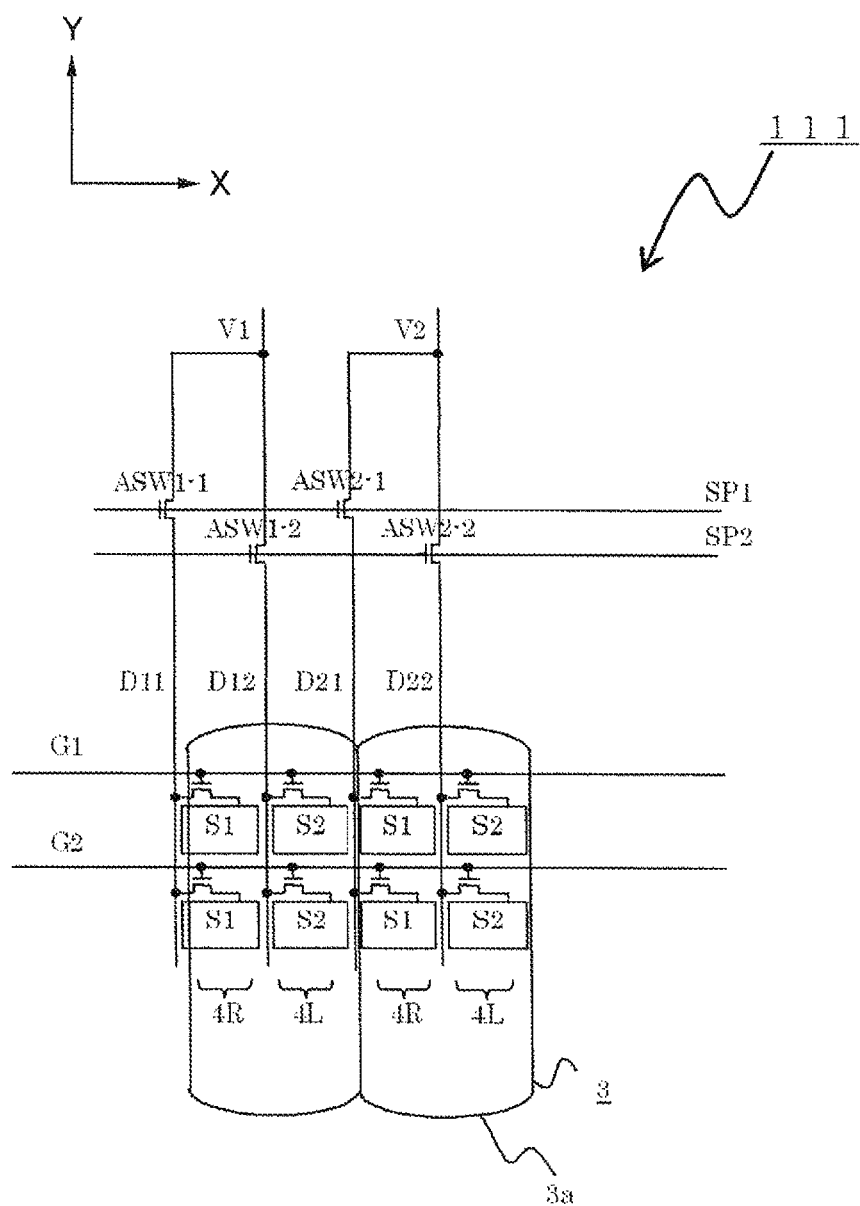
FIG. 18 is a top plan view showing a phase deployment order of left-eye pixels and right-eye pixels of a display device according to a first comparative example.

Next, a first comparative example of the present invention will be described. FIG. 18 is a top plan view showing a phase deployment order of left-eye pixels and right-eye pixels of a display device according to the first comparative example. The first comparative example is different from the above-described first exemplary embodiment of the invention in respect that the number of phase deployment thereof is "2". There are two viewpoints on the left and right sides. That is, this is a case where there is a relation of "M=N" established between the phase deployment number M and the viewpoint number N.

As shown in FIG. 18, in a display device 111 of the first comparative example, the pixels connected to the data lines D11 and D21 are allotted for the right-eye pixels 4R due to the positional relation with respect to the cylindrical lenses 3a. Meanwhile, the pixels connected to the data lines D12 and D22 are allotted for the left-eye pixels 4L. Therefore, the right eye of the observer is to visually recognize the pixel groups that are phase-deployed in the first phase, and the left eye of the observer is to visually recognize the pixel groups that are phase-deployed in the second phase. As described above, there is a difference between the writing operations of each phase in the phase deployment operations. As in the comparative example, when there is deviation in the phase deployment order in the pixel groups for each viewpoint (e.g., there is deviation in the left-eye pixel groups), it becomes difficult to have the same display image quality for each viewpoint. As a result, the observer perceives it as having deterioration in the display image quality. Therefore, the structure such as the one according to the comparative example is not preferable.

When the comparative example is expanded, it can be found that the same logic applies not only for the case of 2-viewpoint and 2-phase deployment (N=2 and M=2) but also for case with larger number of viewpoints and deployment of a larger number of phases. That is, cases where there is a relation of "N=M" established between the viewpoint number N and the phase deployment number M, e.g., 3-viewpoint and 3-phase deployment (N=3 and M=3), 4-viewpoint and 4-phase deployment (N=4 and M=4), 5-viewpoint and 5-phase deployment (N=5 and M=5), are not preferable. Cases where a relation of "N≠M" applies are desirable. Such case is also considered as a mode where "NmodM≠0" applies or a mode where "MmodN≠0" applies.

Figure 19:
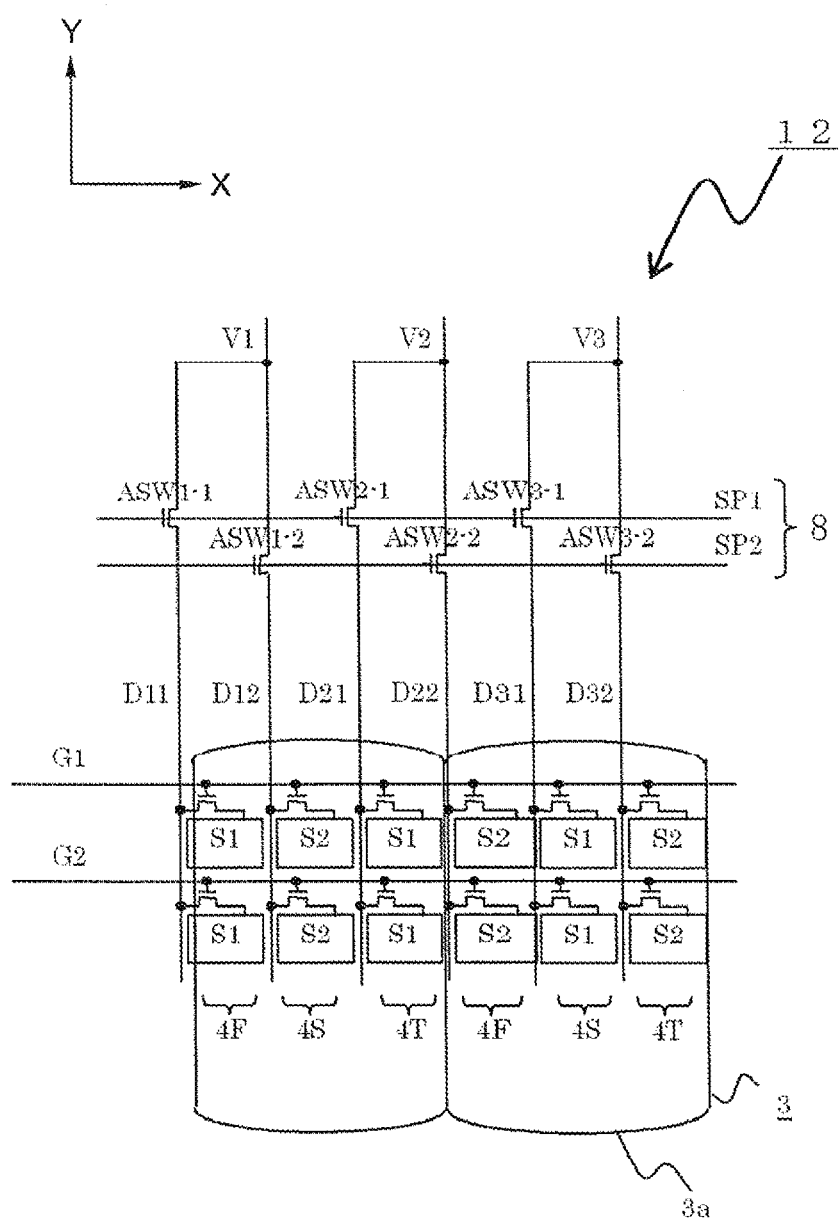
FIG. 19 is a top plan view showing a phase deployment order of first-viewpoint pixels to third-viewpoint pixels of a display device according to a third exemplary embodiment of the invention.

Next, a third exemplary embodiment of the invention will be described. FIG. 19 is a top plan view showing a phase deployment order of the first-viewpoint pixels to the third-viewpoint pixels of a display device according to the third exemplary embodiment of the invention. Compared to the first exemplary embodiment of the invention described above, the third exemplary embodiment is distinctive in respect that the viewpoint number N thereof is "3" and the phase deployment number M is "2". That is, the first exemplary embodiment of the invention described above is the case where the relation of "N<M and NmodM≠0" applies, while the third exemplary embodiment is an example of cases where the relation of "N>M and NmodM≠0" applies.

As shown in FIG. 19, in a display device 12 of the third exemplary embodiment, the pixels connected to the data lines D11 and D22 are allotted for the first-viewpoint pixels 4F due to the positional relation with respect to the cylindrical lenses 3a. The pixels connected to the data lines D12 and D31 are allotted for the second-viewpoint pixels 4S. The pixels connected to the data lines D21 and D32 are allotted for the third-viewpoint pixels 4T. With this, the pixel groups of the first-viewpoint pixels 4F are configured with a column of the pixels deployed in the first phase and a column of the pixels deployed in the second phase. The pixel groups of the second-viewpoint pixels 4S and the pixel groups of the third-viewpoint pixels 4T are also the same as the case of the pixel groups of the first-viewpoint pixels 4F. As described, the pixels groups of each viewpoint are not deviated to a specific phase deployment order, i.e., the switching order. Structures of the second exemplary embodiment other than those described above are the same as those of the first exemplary embodiment described above.

Specifically, in FIG. 19, the wiring switching element 8 distributes the 4F-viewpoint image signal supplied to the data line D11 to the pixel (S1) out of the display unit S1-S2, distributes the 4T-viewpoint image signal supplied to the data line D21 to the pixel (S1) out of the display unit S1-S2, and distributes the 4S-viewpoint image signal supplied to the data line D31 to the pixel (S1) out of the display unit S1-S2. Further, the wiring switching element 8 distributes the 4S-viewpoint image signal supplied to the data line D12 to the pixel (S2) out of the display unit S1-S2, distributes the 4F-viewpoint image signal supplied to the data line D22 to the pixel (S2) out of the display unit S1-S2, and distributes the 4T-viewpoint image signal supplied to the data line D32 to the pixel (S2) out of the display unit S1-S2.

In the multiple-viewpoint type stereoscopic image display device having more than two viewpoints as in the case of this exemplary embodiment, there are several possible situations considered depending on the position of the eyes pf the observer. For example, considered is a case where the right eye of the observer visually recognizes the pixel group of the first-viewpoint pixels 4F, and the left eye visually recognize the pixel group of the second-viewpoint pixels 4S. In this case, each eye of the observer can visually recognize displays having no deviation in the phase deployment orders. Therefore, the display qualities for each viewpoint can be made equal, thereby making it possible to improve the display qualities. This is the same for other situations such as a case where the right eye visually recognizes the pixel group of the second-viewpoint pixels 4S, and the left eye visually recognize the pixel group of the third-viewpoint pixels 4T, or a case where the right eye visually recognizes the pixel group of the first-viewpoint pixels 4F, and the left eye visually recognize the pixel group of the third-viewpoint pixels 4T.

This exemplary embodiment has been described by referring to the case of 3-viewpoint and 2-phase deployment as an example of the case where, in particular, the relation of "N>M and NmodM≠0" applies. This structure makes it possible to improve the display image quality especially with the case of multiple viewpoints. Particularly, when the number of viewpoints increases, the number of pixels tends to increase as well. Thus, the present invention can be preferably applied. Effects of the third exemplary embodiment other than those described above are the same as those of the first exemplary embodiment described above.

Figure 20:
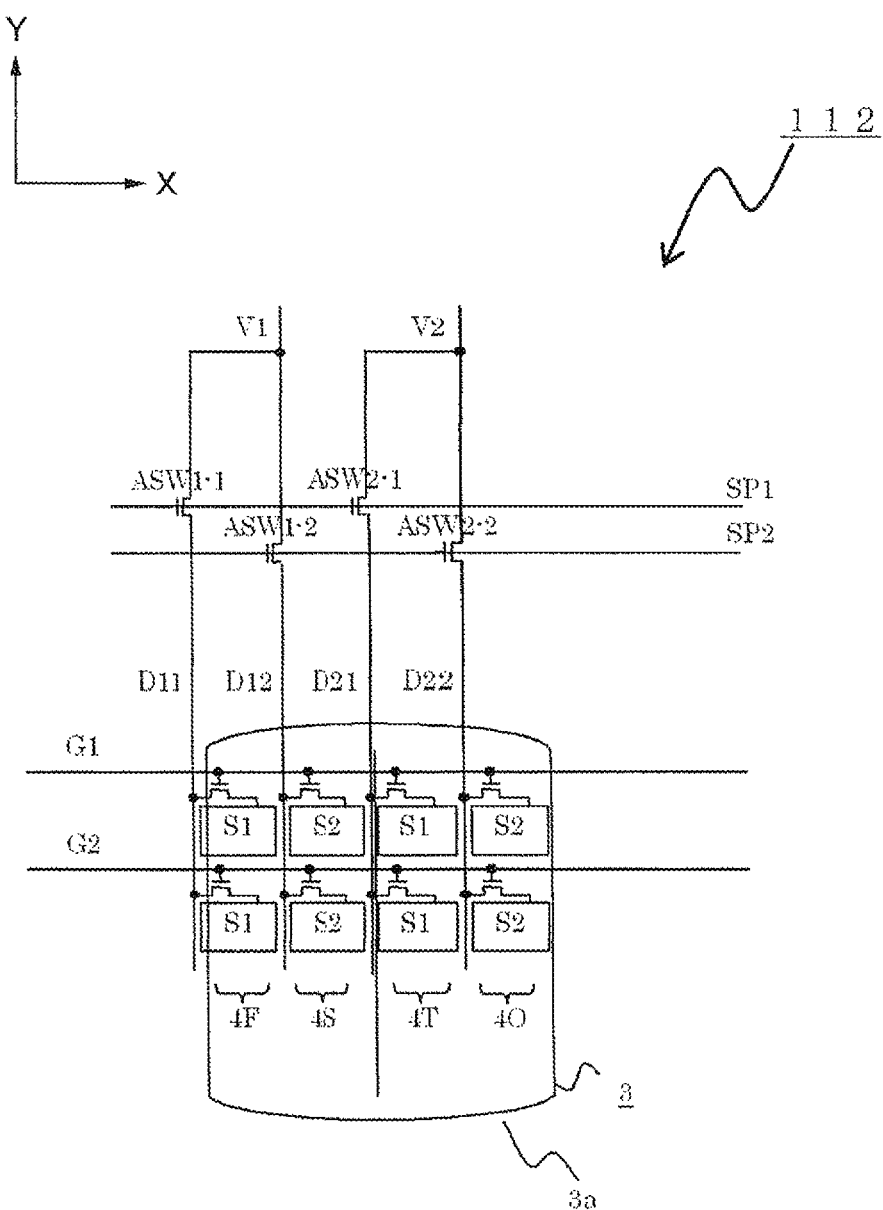
FIG. 20 is a top plan view showing a phase deployment order of first-viewpoint pixels to fourth-viewpoint pixels of a display device according to a second comparative example.

Next, a second comparative example of the present invention will be described. FIG. 20 is a top plan view showing a phase deployment order of the first-viewpoint pixels to the fourth-viewpoint pixels of a display device according to the second comparative example of the present invention. The second comparative example is different from the third exemplary embodiment of the invention described above that the viewpoint number N thereof is "4". That is, the second comparative example is a case where a relation of "N>M and NmodM=0" applies between the viewpoint number N and the phase deployment number M.

As shown in FIG. 20, in a display device 112 of the second comparative example, the pixels connected to the data line D11 are allotted for the first-viewpoint pixels 4F due to the positional relation with respect to the cylindrical lenses 3a. Further, the pixels connected to the data line D12 are allotted for the second-viewpoint pixels 4S, the pixels connected to the data line D21 are allotted for the third-viewpoint pixels 4T, and the pixels connected to the data line D22 are allotted for the fourth-viewpoint pixels 4O. That is, each of the pixel group configured with the first-viewpoint pixels 4F and the pixel group configured with the third-viewpoint pixels 4T is a set of the pixels that are phase-deployed in the first phase. Further, each of the pixel group configured with the second-viewpoint pixels 4S and the pixel group configured with the fourth-viewpoint pixels 4O is a set of the pixels that are phase-deployed in the second phase.

In the comparative example, there is deviation generated in the phase deployment order in the pixel groups for each viewpoint. Thus, it becomes difficult to have the same display image quality for each viewpoint. Therefore, the structure such as the one according to this comparative example is not preferable.

When the comparative example is expanded, it can be found that the same logic applies not only for the case of 4-viewpoint and 2-phase deployment (N=4 and M=2) but also for a case with larger number of viewpoints and deployment of a larger number of phases. That is, cases where there is a relation of "N>M and NmodM=0" established between the viewpoint number N and the phase deployment number M, e.g., 6-viewpoint and 2-phase deployment (N=6 and M=2), 8-viewpoint and 2-phase deployment (N=8 and M=2), 10-viewpoint and 2-phase deployment (N=10 and M=2), are not preferable. Similarly, even when the phase deployment number M is 3 or more, cases where there is a relation of "N>M and NmodM=0" applies, e.g., 6-viewpoint and 3-phase deployment (N=6 and M=3), 9-viewpoint and 3-phase deployment (N=9 and M=3) are not preferable. This is the same for the case where M is 4 or more.

Figure 21:
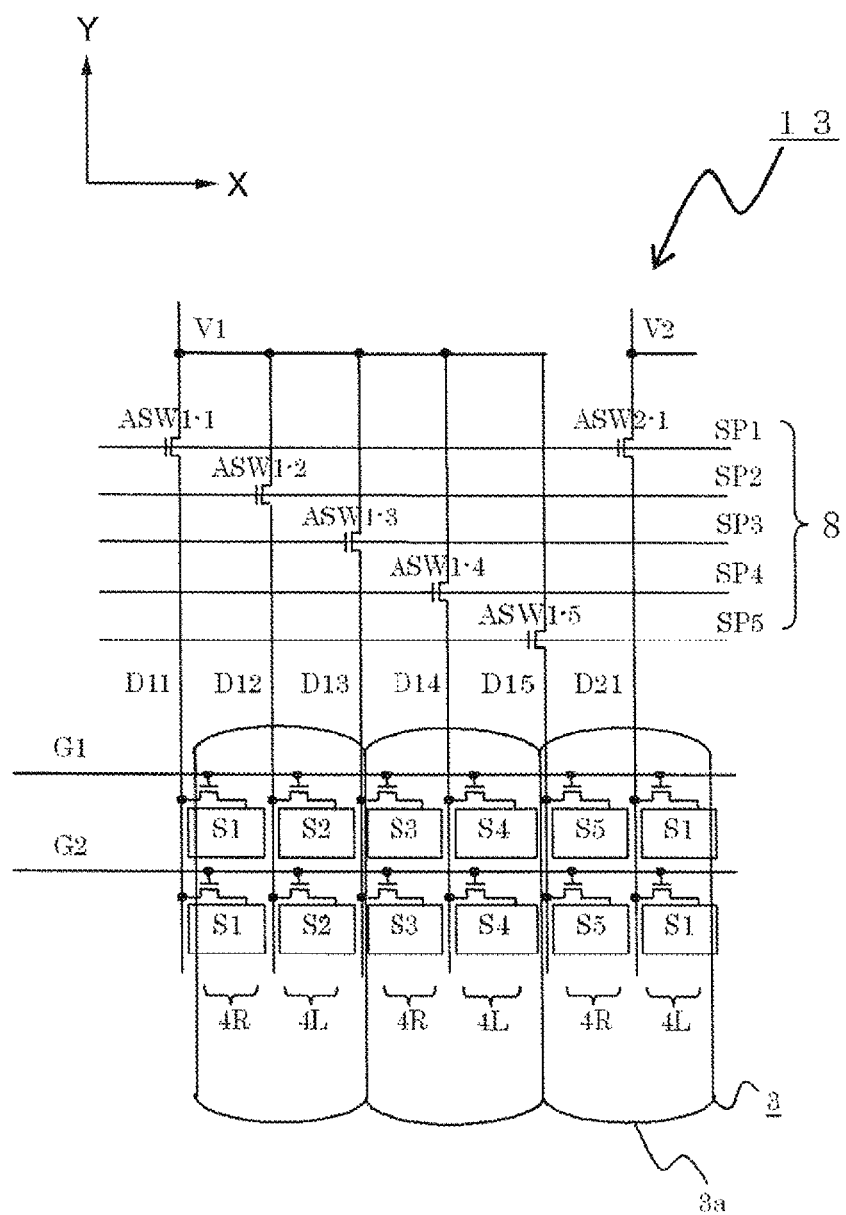
FIG. 21 is a top plan view showing a phase deployment order of left-eye pixels and right-eye pixels of a display device according to a fourth exemplary embodiment of the invention.

Next, a fourth exemplary embodiment of the invention will be described. FIG. 21 is a top plan view showing a phase deployment order of the left-eye pixels and the right-eye pixels of a display device according to the fourth exemplary embodiment of the present invention. Compared to the first exemplary embodiment of the invention described above, the fourth exemplary embodiment is distinctive in respect that the phase deployment number M thereof is "5". The viewpoint number N is the same, so that there are two viewpoints on the left and right sides. That is, the first exemplary embodiment of the invention has been described by referring to the case of "N=2 and M=3" as an example of the case where the relation of "N<M and NmodM≠0" applies. The fourth exemplary embodiment is a case of "N=2 and M=5".

As shown in FIG. 21, in a display device 13 of the fourth exemplary embodiment, the pixels connected to the data lines D11, the pixels connected to the data lines D13, and the pixels connected to the data lines D15 are allotted for the right-eye pixels 4R due to the positional relation with respect to the cylindrical lenses 3a. Further, the pixels connected to the data lines D12 and the pixels connected to the data lines D14 are allotted for the left-eye pixels 4L. Furthermore, the pixels connected to the data lines D21 are allotted also for the left-eye pixels 4L. There is only the data line D21 illustrated in the drawing as the data line to be connected to the video signal line V2. However, the data lines are repeatedly disposed with a certain periodicity. Therefore, the pixels connected to the data line D23 and the pixels connected to the data line D25 are also allotted for the left-eye pixels 4L. The pixels connected to the data line D22 and the pixels connected to the data line D24 are allotted for the right-eye pixels 4R as well.

This exemplary embodiment is the case of 2-viewpoint and 5-phase deployment, so that ten data lines can be treated as a base unit. That is, the data lines connected to the pixels configuring the right-eye pixel group are D11, D13, D15, D22, and D24, and the data lines connected to the pixels configuring the left-eye pixel group are D12, D14, D21, D23, and D25. It is possible to dispose still larger number of pixels by repeatedly disposing the base unit of ten data lines.

In FIG. 21, the wiring switching element 8 distributes the 4R-viewpoint (right-eye) image signal supplied to the data line D11 to the pixel (S1) out of the display unit S1-S2, and distributes the 4L-viewpoint (left-eye) image signal supplied to the data line D21 to the pixel (S1) out of the display unit S1-S2. Further, the wiring switching element 8 distributes the 4L-viewpoint (left-eye) image signal supplied to the data line D12 to the pixel (S2) out of the display unit S1-S2, and distributes the 4R-viewpoint (right-eye) image signal supplied to the data line D13 to the pixel (S3) out of the display unit S3-S4. Furthermore, the wiring switching element 8 distributes the 4L-viewpoint (right-eye) image signal supplied to the data line D14 to the pixel (S4) out of the display unit S3-S4, and distributes the 4L-viewpoint (left-eye) image signal supplied to the data line D15 to the pixel (S1) out of the display unit S5-S1.

As described, the pixel groups for each viewpoint are configured with the pixels that are deployed in the first phase to fifth phase. That is, the pixel groups of each viewpoint are not deviated to a specific phase deployment order. Structures of the fourth exemplary embodiment other than those described above are the same as those of the first exemplary embodiment described above.

This exemplary embodiment has been described by referring to the case of 2-viewpoint and 5-phase deployment as an example of the case where, in particular, the relation of "N<M and NmodM≠0" applies. This structure makes it possible to improve the display image quality especially with the case where the phase deployment number M is larger than the viewpoint number N. Furthermore, it is possible to reduce the circuit scale and to cut the cost by increasing the phase deployment number M.

When this exemplary embodiment is expanded, it can be found that the same logic applies not only for the case of 2-viewpoint and 5-phase deployment (N=2 and M=5) but also for a case with deployment of a larger number of phases, i.e., the case of 2-viewpoint and 7-phase deployment (N=2 and M=7) and the case of 2-viewpoint and 9-phase deployment (N=2 and M=9). Further, cases with three viewpoints or more can be treated in the same manner as well. As described, this exemplary embodiment can be applied preferably to the case where "MmodN≠0" applies in particular. Effects of the fourth exemplary embodiment other than those described above are the same as those of the first exemplary embodiment described above.

This exemplary embodiment has been described by excluding the cases where "MmodN=0" applies such as 2-viewpoint and 4-phase deployment (N=2 and M=4) and 2-viewpoint and 6-phase deployment (N=2 and M=6). This is because the case where "MmodN=0" applies is a special case that is different from other cases. Thus, a mode where "MmodN=0" applies, i.e., a fifth exemplary embodiment of the invention, will be described next.

Figure 22:
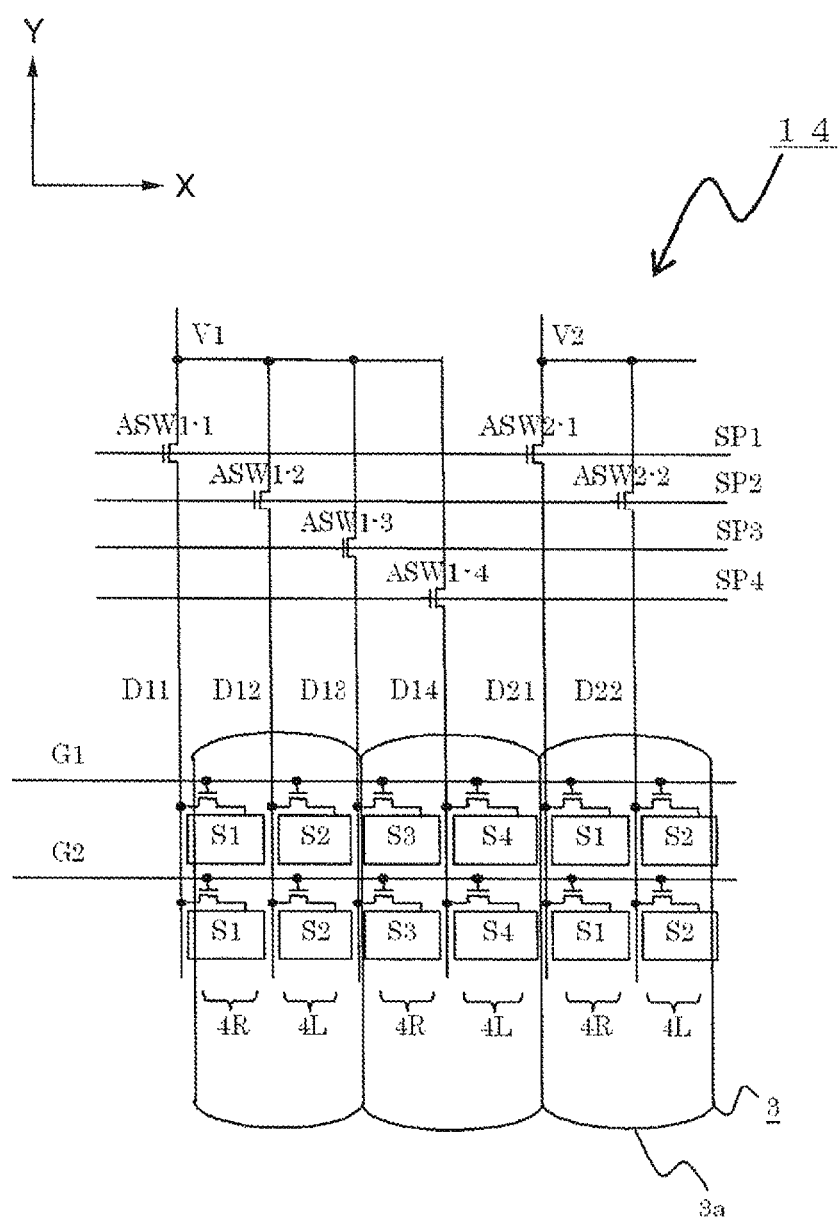
FIG. 22 is a top plan view showing a phase deployment order of left-eye pixels and right-eye pixels of a display device according to a fifth exemplary embodiment of the invention.

FIG. 22 is a top plan view showing a phase deployment order of the left-eye pixels and the right-eye pixels of a display device according to the fifth exemplary embodiment of the invention. Compared to the fourth exemplary embodiment of the invention described above, the fifth exemplary embodiment is distinctive in respect that the phase deployment number thereof is "4". The viewpoint number is the same, so that there are two viewpoints on the left and right sides. That is, the fifth exemplary embodiment is a case where "NmodM≠0 and MmodN=0" applies.

As shown in FIG. 22, in a display device 14 of the fifth exemplary embodiment, the pixels connected to the data line D11 and the pixels connected to the data lines D13 are allotted for the right-eye pixels 4R due to the positional relation with respect to the cylindrical lenses 3a. Further, the pixels connected to the data line D12 and the pixels connected to the data lines D14 are allotted for the left-eye pixels 4L. This exemplary embodiment is so configured that the phase deployment number M becomes a multiple of the viewpoint number N. Thus, the phase deployment operation of the video signal V1 is repeatedly executed in the same manner also in the video signal line V2 and thereafter.

As described, in this exemplary embodiment, the pixel groups of the left-eye pixels are configured with the pixels that are deployed in the first phase and the third phase. Further, the pixel groups of the right-eye pixels are configured with the pixels that are deployed in the second phase and the fourth phase. That is, the pixel groups of each viewpoint are not deviated to a specific phase deployment order, even though it is not in a perfectly undeviating state, either. Structures of the fifth exemplary embodiment other than those described above are the same as those of the fourth exemplary embodiment described above.

With this exemplary embodiment, deviation in the phase deployment order can be reduced for the pixel groups of each viewpoint pixels. The above-described fourth exemplary embodiment can provide a state where there is no deviation at all. Thus, needless to say, the fourth exemplary embodiment is more preferable. However, the deviation can also be reduced by simply configuring the pixel groups for each viewpoint with a plurality of kinds of phase deployment orders, as in the case of the fifth exemplary embodiment. With this, adverse effects can be reduced by using different phase deployment orders, so that the display image quality can be improved. That is, with the display device of this structure, it is essential to satisfy the condition of "NmodM≠0" but not essential to satisfy the condition of "MmodN≠0". It can be said that it is preferable to satisfy "MmodN≠0". The exemplary embodiment can be also applied to combinations of N and M other than the combination of 2-viewpoint and 4-phase deployment. The above explanations are for the case of M>N. In the case of N>M, "MmodN≠0" applies at all times. Therefore, it is desirable to have the condition where "MmodN≠0" applies, regardless of the relation between M and N. Effects of the fifth exemplary embodiment other than those described above are the same as those of the fourth exemplary embodiment described above.

Figure 23:
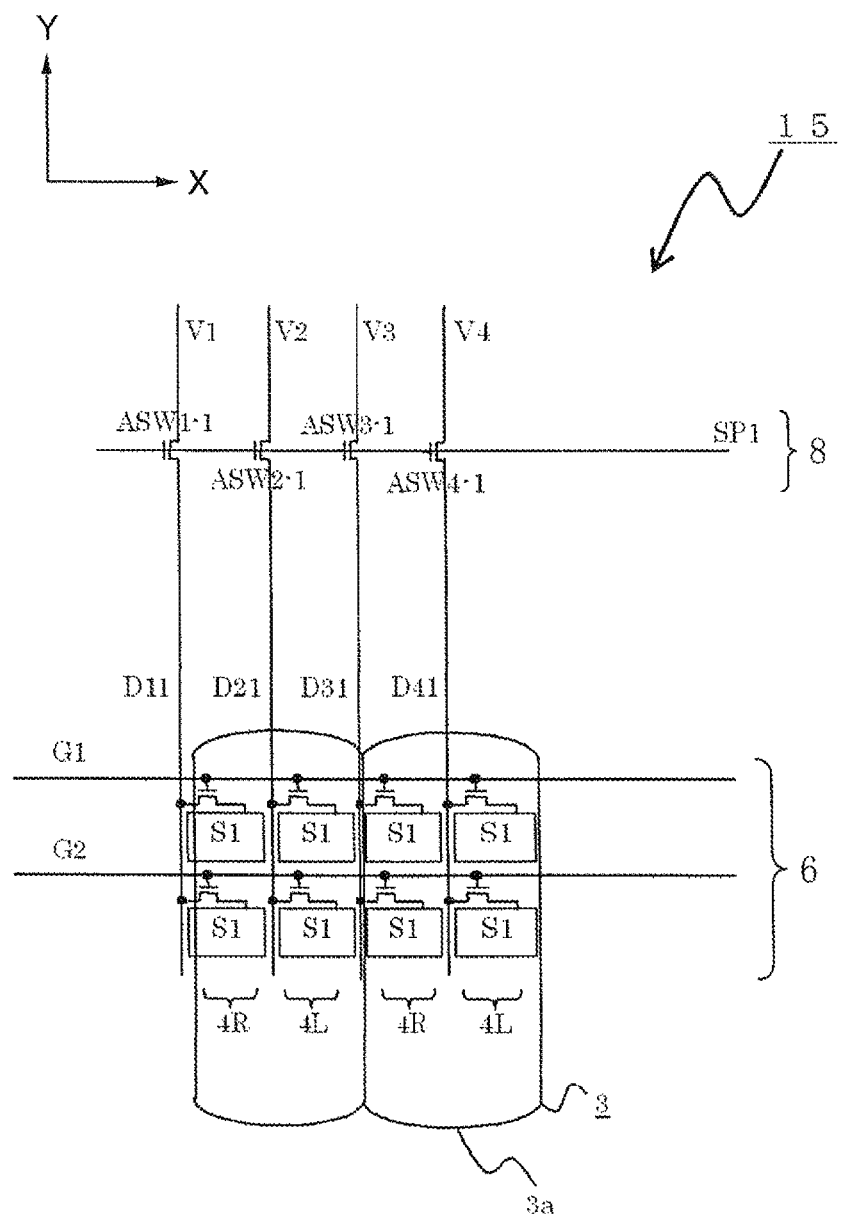
FIG. 23 is a top plan view showing a phase deployment order of left-eye pixels and right-eye pixels of a display device according to a sixth exemplary embodiment of the invention.

Next, a sixth exemplary embodiment of the invention will be described. As shown in FIG. 23, a display device 15 according to this exemplary embodiment includes: a pixel matrix 6 configured with a plurality of pixel units S1 and S1, - - - disposed in matrix, each including two neighboring pixels for respectively displaying images for two (as N) viewpoints, in which the pixels S1, - - - are disposed in the vicinity of each proximal point between gate lines G1, G2 and data lines D11-D41; video signal lines V1-V4 for outputting display data; a wiring switching element 8 which simultaneously switches and connects a single (as M) data line out of the data lines D11-D41 to each of the video signal lines V1-V4 so as to supply the display data to the pixels S1, - - - via the data lines D11, - - - ; a lenticular lens 3 for distributing the light emitted from each of the pixels S1, - - - configuring the display unit S1, - - - into the X-axis direction for each of the two viewpoints; and TFTs (reference numerals are omitted) as a plurality of pixel switches for transmitting the display data to each of the pixels S1, - - - from the data lines D11-D41. The gate lines G1, G2 having a function of controlling those TFTs are extended along the X-axis direction. Two each of the pixels S1, - - - as a display unit and one each of the data lines D11, - - - are disposed along the X-axis direction, respectively. The wiring switching element 8 also functioning as a switching order dispersing device in the case of "M=1" disperses the switching orders of the wiring switching element 8 corresponding to each pixel S1, - - - for the right-eye pixels 4R and the left-eye pixels 4L as the pixel groups configured with the pixels S1, - - - which display the images for the same viewpoint.

Conventionally, the switching order of the wiring switching element 8 for all the pixels S1, - - - within the right-eye pixels 4R is the first, for example, and the switching order for all the pixels S1, - - - within the left-eye pixels 4L is the second. Thus, there generates a difference in the display between the right-eye pixels 4R and the left-eye pixels 4L caused due to the switching order. Therefore, this embodiment improves the image quality by equalizing the switching orders as a whole for the right-eye pixels 4R and the left-eye pixels 4L through setting the condition to be "M=1". This will be described in detail hereinafter.

FIG. 23 is a top plan view showing a phase deployment order of the left-eye pixels and right-eye pixels of a display device according to a sixth exemplary embodiment of the invention. Compared to the first exemplary embodiment of the invention described above, the sixth exemplary embodiment is distinctive in respect that the phase deployment number M thereof is "1". The viewpoint number N is the same, so that there are two viewpoints on the left and right sides. That is, the sixth exemplary embodiment is largely different from the above-described exemplary embodiments that it is possible to achieve high image quality with the condition of "NmodM=0". In other words, this exemplary embodiment is a special case where "M=1" applies, rather than a case where "NmodM=0" applies. This is because the condition "NmodM=0" applies essentially when "M=1".

As shown in FIG. 23, the display device 15 according to the sixth exemplary embodiment has a structure of 1-phase deployment (M=1). Thereby, not only the data lines to which the right-eye pixels 4R are connected but also the data lines to which the left-eye pixels 4L are connected are all phase-deployed in the first phase. This means that the pixel groups for each viewpoint are all configured equally without being deviated to a specific phase deployment order. Structures of the sixth exemplary embodiment other than those described above are the same as those of the first exemplary embodiment described above.

With this exemplary embodiment, the phase deployment orders for each viewpoint can be made uniform and a high image quality can be achieved by satisfying "M=1". This exemplary embodiment requires a video signal line driving circuit having outputs for the number of data lines, but requires no complicated phase deployment processing. Thus, this exemplary embodiment cab be applied preferably for the display device with a small number of pixels in particular. Further, even though this exemplary embodiment has a structure with only 1-phase deployment, it is possible to adjust the timings of the signals supplied to the data lines more adequately through providing phase deployment switches. As a result, it becomes possible to improve the display quality by reducing the influences of the neighboring pixels disposed in the data line extending direction, for example. Effects of the sixth exemplary embodiment other than those described above are the same as those of the first exemplary embodiment described above.

Here, the relations between the phase deployment number M and the viewpoint number N in the case of the first to sixth exemplary embodiment of the invention described above will be summarized. The essential feature of the present invention is to configure the pixel groups for each viewpoint to have no difference (i.e., no deviation) in the phase deployment orders between those pixel groups. Even if there is a deviation, it is possible to reduce the adverse effects caused due to the phase deployment, through having not a single phase but a plurality of phases. In particular, when the image separating direction of the image separating device is directed towards a direction along the phase deployment direction, i.e., along the arranging direction of the data lines, a high image quality can be achieved at all times with "M=1", regardless of the viewpoint number N. Further, in the case of "M>1", the condition of "NmodM≠0" needs to apply regardless of the relation between N and M. Furthermore, it is preferable that the condition of "MmodN≠0" applies regardless of the relation between N and M.

Figure 24:
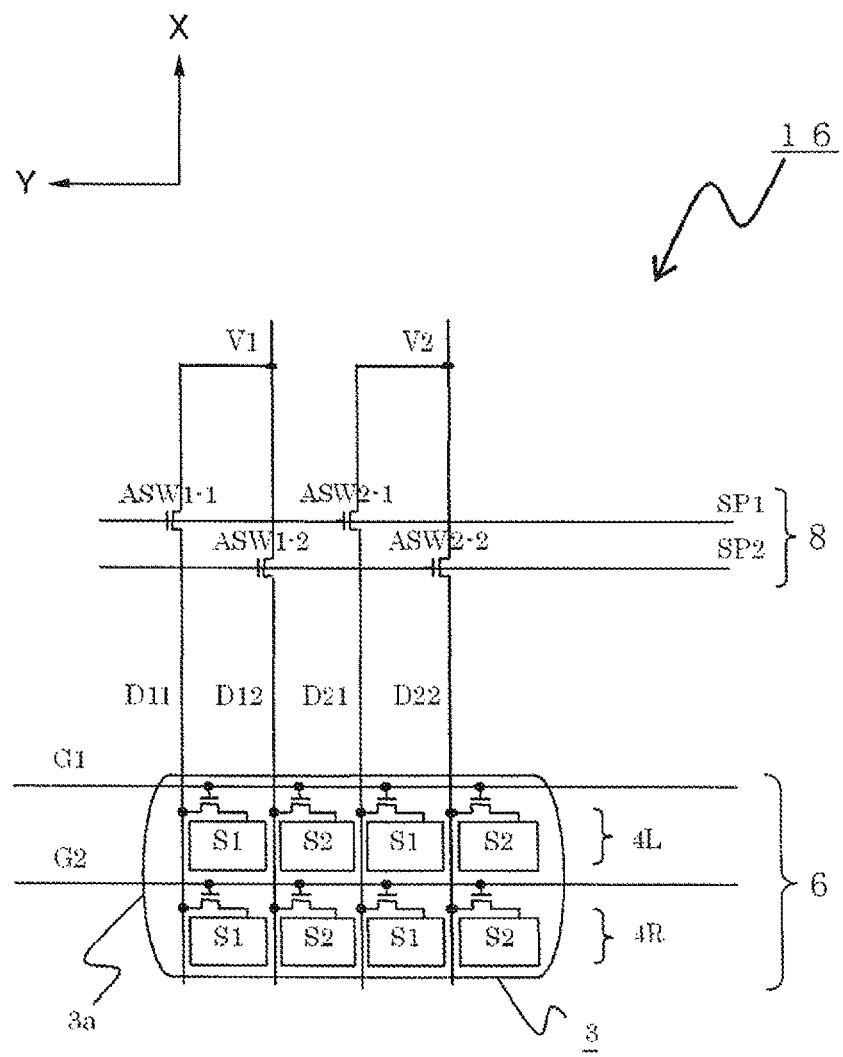
FIG. 24 is a top plan view showing a phase deployment order of left-eye pixels and right-eye pixels of a display device according to a seventh exemplary embodiment of the invention.

Next, a seventh exemplary embodiment of the invention will be described. As shown in FIG. 24, a display device 16 according to this exemplary embodiment includes: a pixel matrix 6 configured with a plurality of pixel units S1 and S1, - - - disposed in matrix, each including two neighboring pixels for respectively displaying images for two (as N) viewpoints, in which the pixels S1, - - - are disposed in the vicinity of each proximal point between gate lines G1, G2 and data lines D11-D22; video signal lines V1 and V2 for outputting display data; a wiring switching element 8 which successively switches and connects two (as M) data lines D11, - - - to each of the video signal lines V1, V2 so as to supply the display data to the pixels S1, - - - via the data lines D11, - - -; a lenticular lens 3 for distributing the light emitted from each of the pixels S1, - - - configuring the display unit S1, - - - into the X-axis direction for each of the two viewpoints; and a plurality of TFTs (reference numerals are omitted) for transmitting the display data to each of the pixels S1, - - - from the data lines D11-D22. The gate lines G1, G2 having a function of controlling those TFTs are extended along the X-axis direction. One each of the data lines D11, - - - is disposed along the Y-axis direction, and two each of the pixels S1, - - - as a display unit are arranged along the X-axis direction. The lenticular lens 3 also functioning as a switching order dispersing device disperses the switching orders of the wiring switching element 8 corresponding to each of the pixels S1, - - - for the right-eye pixels 4R and the left-eye pixels 4L as the pixel groups configured with the pixels S1, - - - which display the images for the same viewpoint.

Specifically, in FIG. 23, the wiring switching element 8 distributes the 4R-viewpoint (right eye) image signal supplied to the data line D11 to the pixel (S1 on the left side) out of the display unit S1-S2, distributes the 4L-viewpoint (left eye) image signal supplied to the data line D21 to the pixel (S1 on the right side) out of the display unit S1-S1, distributes the 4R-viewpoint (right eye) image signal supplied to the data line D31 to the pixel (S1 on the right side) out of the display unit S1-S1, and distributes the 4L-viewpoint (left eye) image signal supplied to the data line D41 to the pixel (S1 on the left side) out of the display unit S1-S1.

Conventionally, the switching order of the wiring switching element 8 for all the pixels S1, - - - within the right-eye pixels 4R is the first, for example, and the switching order for all the pixels S1, - - - within the left-eye pixels 4L is the second. Thus, there generates a difference in the display between the right-eye pixels 4R and the left-eye pixels 4L caused due to the switching order. Therefore, this embodiment improves the image quality by leveling the switching orders as a whole for the right-eye pixels 4R and the left-eye pixels 4L through setting the arranging direction of the data lines D11-D22 and the light distributing direction of the lenticular lens 3 to be orthogonal to each other. This will be described in detail hereinafter.

FIG. 24 is a top plan view showing a phase deployment order of the left-eye pixels and the right-eye pixels of a display device according to a seventh exemplary embodiment of the invention. Compared to the first exemplary embodiment of the invention or the first comparative example described above, the seventh exemplary embodiment is distinctive in terms of the arranging direction of the display panel, while the lenticular lens as the image separating device is arranged in the same manner. In the display panel of this structure, there is a direction along which the pixels (to which signals are written in a same phase i.e., at the same timing, even if phase deployment operations are executed) are arranged. It is a feature of the seventh exemplary embodiment to set the arranging direction of the same-phase pixels and the image separating direction of the one-dimensional lens to be the same.

That is, as shown in FIG. 24, a display panel of 2-phase deployment (M=2) is used in a display device 16 of the seventh exemplary embodiment, as in the case of the first comparative example described above. However, unlike the above-described first comparative example, the display panel is disposed by being rotated by 90 degrees on the display plane. As a result, the data lines are arranged in the Y-axis direction, and extended in the X-axis direction. Accordingly, the pixels of a same phase are arranged along the X-axis direction. Pixels that are phase-deployed in the first phase are disposed in line along the X-axis direction. This is the same for the pixels that are phase-deployed in the second phase. In the meantime, the lenticular lens is arranged in such a manner that the image separating direction comes to be along the X-axis direction. That is, the extending direction of the cylindrical lenses configuring the lenticular lens is the Y-axis direction. There are a plurality of cylindrical lenses disposed along the X-axis direction.

This exemplary embodiment is structured in such a manner that the arranging direction of the pixels of the same-phase deployment operations comes to be consistent with the image separating direction of the image separating device. With this, the image separating operations and the phase deployment operations can be separated, thereby making it possible to prevent the image separating operation from being affected by the phase deployment operation. As a result, it becomes possible to prevent both operations from interfering with each other, so that a high image quality can be obtained. The essential feature of the present invention, which is to configure the pixel groups for each viewpoint to have no deviation in the phase deployment order, is also accomplished in this case. It can also be expressed that the arranging direction of the data lines is made consistent with the image separating direction of the image separating device in the TFT-drive type display panel, as shown in FIG. 24.

In this exemplary embodiment, the arranging direction of the pixels with the same-phase deployment operations is only the X-axis direction. In the meantime, the arranging direction of the pixels having different-phase deployment operations is the direction other than the X-axis direction. Therefore, this exemplary embodiment can also be considered as a case where the image separating direction of the image separating device is set to be a direction other than the arranging direction of the same-phase pixels. In other words, it is not always necessary with the exemplary embodiment to set the image separating direction to be orthogonal to the arranging direction of the same-phase pixels. For example, the image separating device may be disposed by being rotated so that the image separating direction becomes different from the arranging direction of the same-phase pixels.

Effects of the seventh exemplary embodiment other than those described above are the same as those of the first exemplary embodiment described above.

Figure 26:
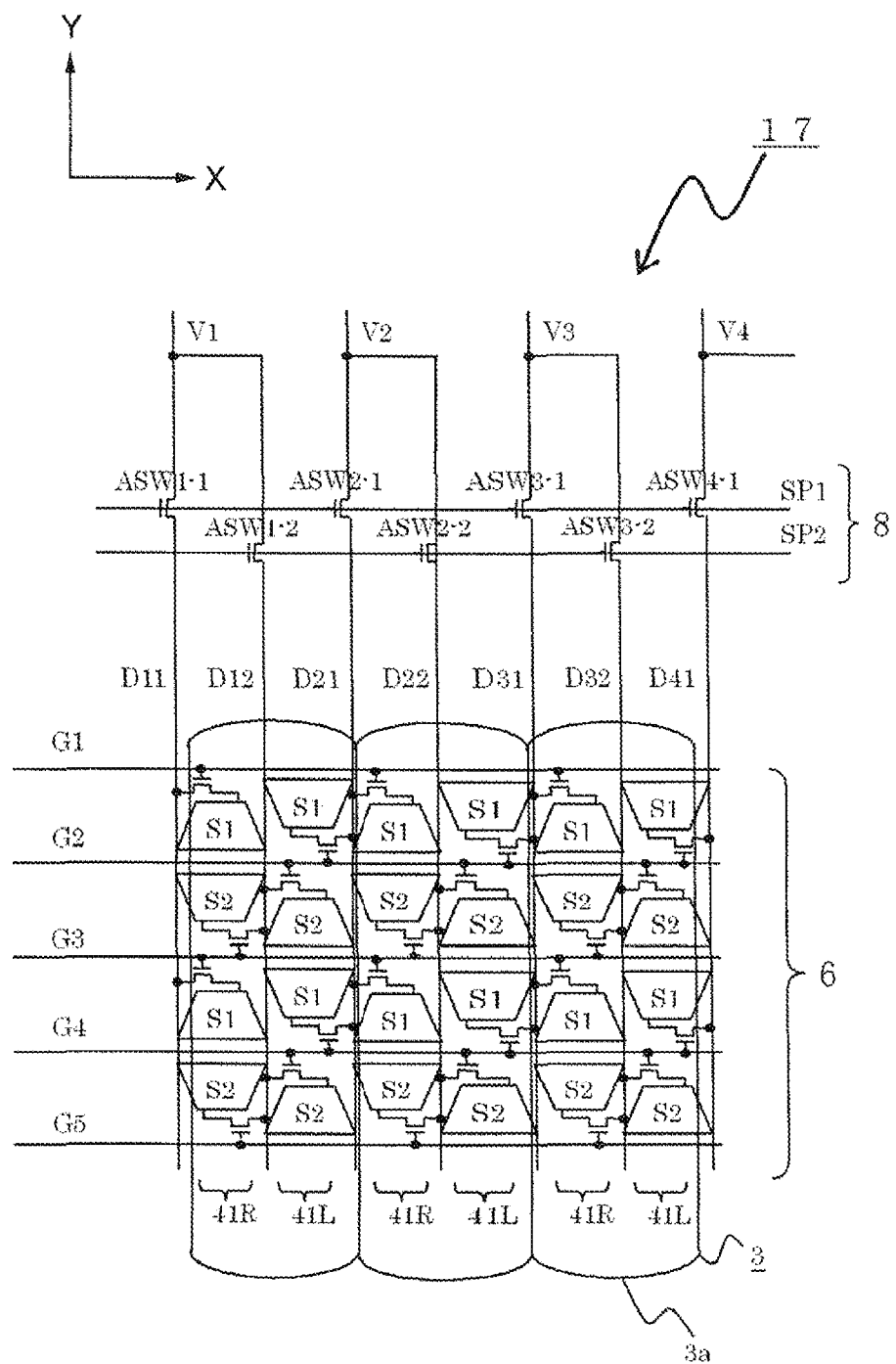
FIG. 26 is a top plan view showing a phase deployment order of left-eye pixels and right-eye pixels of a display device according to this exemplary embodiment.

Next, an eighth exemplary embodiment of the invention will be described. As shown in FIG. 26, a display device 17 according to this exemplary embodiment includes: a pixel matrix 6 configured with a plurality of pixel units S1 and S1, - - - disposed in matrix, each including two neighboring pixels for respectively displaying images for two (as N) viewpoints, in which the pixels S1, - - - are disposed in the vicinity of each proximal point between gate lines G1-G5 and data lines D11-D41; video signal lines V1-V4 for outputting display data; a wiring switching element 8 which successively switches and connects two (as M) data line D11, - - - to each of the video signal lines V1-V4 so as to supply the display data to the pixels S1, - - - via the data lines D11, - - - -; a lenticular lens 3 for distributing the light emitted from each of the pixels S1, - - - configuring the display unit S1, - - - into the X-axis direction for each of the two viewpoints; and a plurality of TFTs (reference numerals are omitted) for transmitting the display data to each of the pixels S1, - - - from the data lines D11-D41. The gate lines G1-G5 having a function of controlling those TFTs are extended along the X-axis direction. One each of the data lines D11, - - - is disposed along the X-axis direction, and two each of the pixels S1, - - - as a display unit are arranged along the X-axis direction. The switching order dispersing device is structured to alternately distribute each of the pixels S1, - - - in a column sandwiched between any of two neighboring gate lines such as the gate lines G1 and G2 out of the gate lines G1-G5 into the pixels S1, - - - which are connected to the gate line G1 via the TFTs and into the pixels S1, - - - which are connected to the gate line G2 via the TFTs. Further, the switching order dispersing device is structured to alternately distribute each of the pixels S1, S2 - - - in a column sandwiched between two neighboring data lines such as the data lines D11 and D12 out of the data lines D11-D41 into the pixels S1, - - - which are connected to the data line D11 via the TFTs and into the pixels S2, - - - which are connected to the data line D12 via the TFTs.

This structure of the switching order dispersing device disperses the switching orders of the wiring switching element 8 for each of the pixels S1, S2 - - - within the right-eye pixels 41R and the left-eye pixels 41L as the pixel groups configured with the pixels S1, S2, - - - for displaying the images for the same viewpoint.

Conventionally, the switching order of the wiring switching element 8 for all the pixels S1, - - - within the right-eye pixels 41R is the first, for example, and the switching order for all the pixels S1, - - - within the left-eye pixels 41L is the second. Thus, there generates a difference in the display between the right-eye pixels 41R and the left-eye pixels 41L caused due to the switching order. Therefore, this embodiment improves the image quality by equalizing the switching orders as a whole for the right-eye pixels 41R and the left-eye pixels 41L through connecting the each of the pixels S1, - - - on a single column in the Y-axis direction to different data lines D11, - - - and connecting each of the pixels S1, - - - on a single column in the X-axis direction to different gate lines G1, - - - . This will be described in detail hereinafter.

Figure 25:
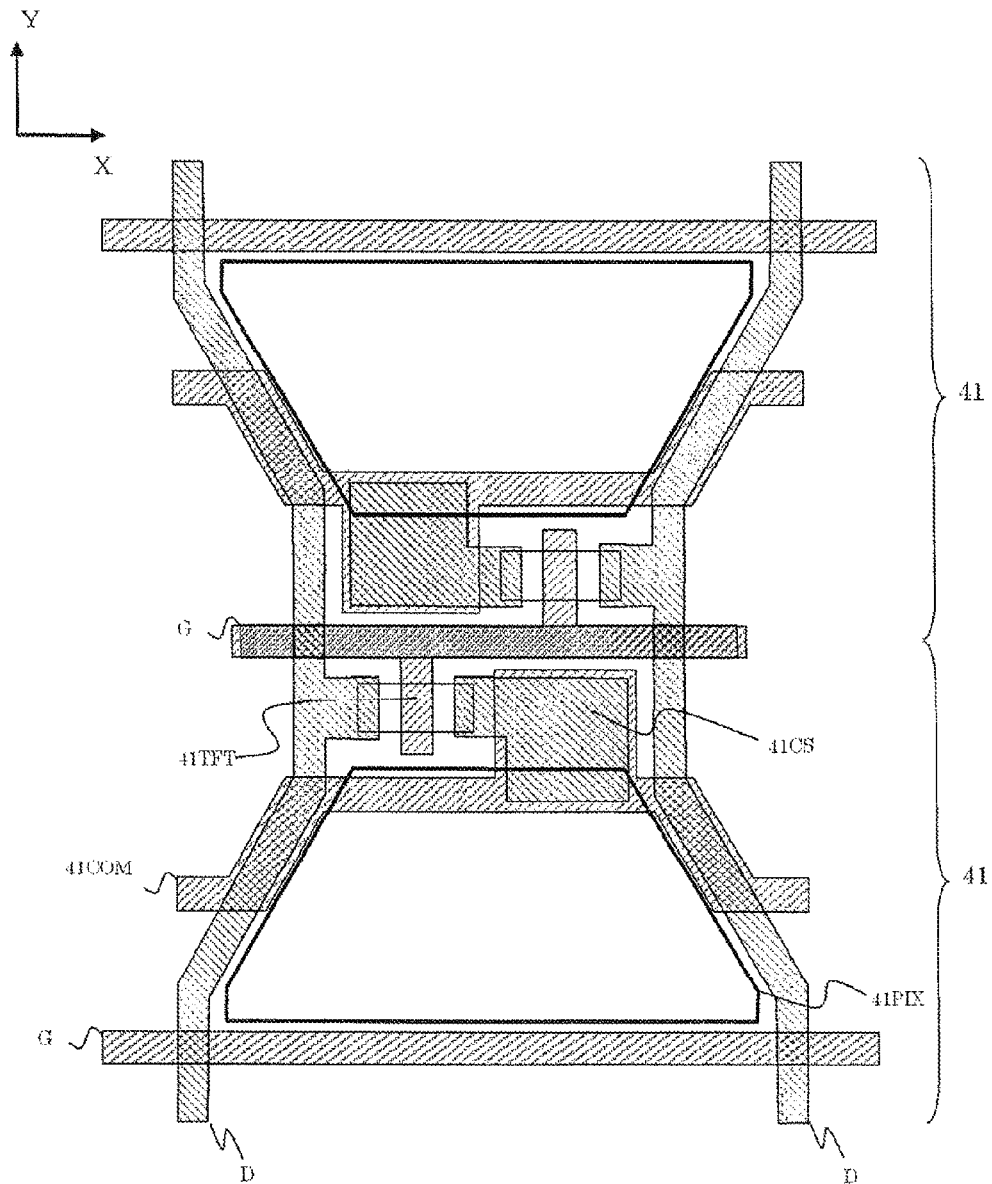
FIG. 25 is a top plan view showing pixels of a display device according to an eighth exemplary embodiment of the invention.

FIG. 25 is a top plan view showing pixels of a display device according to an eighth exemplary embodiment of the invention, and FIG. 26 is a top plan view showing a phase deployment order of left-eye pixels and right-eye pixels of a display device according to this exemplary embodiment. Compared to the first comparative example described above, the eighth exemplary embodiment is distinctive in terms of the structure of the pixels of the display panel. A high image quality can be achieved by using the pixel structure of this exemplary embodiment, even though the viewpoint number and the phase deployment number are both "2". That is, combinations of the viewpoint number and the phase deployment number that are not suitable for the pixel structure of the foregoing exemplary embodiments can be applied, which makes it possible to ease the requirement.

As shown in FIG. 25, it is a feature of the structure of the pixel 41 according to the eighth exemplary embodiment that the thin film transistors 41 (that is, the switching devices) of the two pixels 41 disposed in a direction (for example, Y-axis direction) substantially orthogonal to the extending direction (X-axis direction) of the gate lines G are controlled by the gate line that is disposed between those two pixels 41.

These two pixels 41 receive the signals to be written thereto from the data lines D that are neighboring to each other. In other words, the neighboring pixels 41 disposed by sandwiching the common gate lines G receive signals supplied from different data lines D. FIG. 25 shows the two neighboring pixels that are disposed substantially orthogonal to the extending direction of the gate lines G.

As shown in FIG. 26, the cylindrical lenses 3a are extended in the Y-axis direction, and arranged in the X-axis direction. That is, the direction towards which the images is not separated by the image separating device, i.e., the extending direction of the cylindrical lenses, is consistent with the arranging direction of the neighboring pixels that are disposed with the common gate line interposed therebetween. In other words, the neighboring pixels disposed with the common gate line interposed therebetween and connected to different data lines configure the pixel group for the same viewpoint. This is the first feature of the pixel structure according to the eighth exemplary embodiment.

With the first feature, the pixels to which signals are written with different phase deployment orders can be arranged in the direction towards which the images are not separated by the image separating device. For example, among the pixels connected to the gate line G3 and the data line D11 and the pixels connected to the gate line G3 and the data line D12, a pair of neighboring pixels that are disposed with the gate line G3 interposed therebetween and connected to the gate line G3 as a common gate line will be discussed. In this neighboring pixel pair, the pixel connected to the gate line G3 and the data line D11 is disposed on the −Y direction side of the gate line G3 and phase-deployed in the first phase. Further, the pixel connected to the gate line G3 and the data line D12 is disposed on the +Y direction side of the gate line G3 and phase-deployed in the second phase. Due to the positional relation with respect to the cylindrical lens 3a, the pixels of this neighboring pixel pair both function as the right-eye pixels. That is, the pixel group of the right-eye pixels is configured with the pixel that is phase-deployed in the first phase and the pixel that is phase-deployed in the second phase.

In this manner, the pixel group for each viewpoint can be configured by using pixels with a plurality of phase deployment orders. As a result, it is possible to reduce deviation in the phase deployment orders in the pixels groups for each viewpoint. That is, since the pixel group for each viewpoint can be configured by using pixels with a plurality of phase deployment orders, the deviation in the phase deployment orders can be reduced and the image quality can be improved.

As shown in FIG. 26, in the pixel columns neighboring to each other in the extending direction of the gate lines, the neighboring pixels having a different gate line as the common gate line and disposed with the respective common gate lines interposed therebetween receive signals from different data lines. In other words, for the neighboring pixel pair disposed with the common gate line interposed therebetween, a neighboring pixel pair having different common gate line is disposed neighboring to that pair in the image separating direction of the image separating device. Specifically, the neighboring pixel pair configured with the pixel that is connected to the gate line G3 and the data line D11 and the pixel that is connected to the gate line G3 and the data line D12 will be considered. These two pixels are disposed by sandwiching the gate line G3, and connected to the gate line G3 as the common gate line. A pixel pair that is neighboring to this pixel pair in the +X direction that is the image separating direction of the image separating device takes the gate line different from the gate line G3, particularly the gate line neighboring to the gate line G3, as the common gate line (for example, gate line G2, gate line G4). The neighboring pixel pair taking the gate line G2 as the common gate line is configured with the pixel that is connected to the data line D12 and the pixel that is connected to the data line D21. Similarly, the neighboring pixel pair taking the gate line G4 as the common gate line configured with the pixel that is connected to the data line D12 and the pixel that is connected to the data line D21. As described, in the pixel columns neighboring to each other in the extending direction of the gate lines, the pixel pairs use different gate lines as the common gate lines. This is a second feature of the pixel structure according to the eighth exemplary embodiment.

When 2-phase deployment is combined with the second feature, it is possible to dispose the pixels having the same-phase deployment operations along the image separating direction of the image separating device. With this, it becomes possible to make the phase deployment operations be independent from the image separating operations and prevent both operations from interfering with each other, so that a high image quality can be obtained.

This exemplary embodiment is structured with viewpoint number N=2 and phase deployment number M=2. In the first comparative example, the structure with 2-viewpoint and 2-phase deployment is depicted as a non-preferable example. This is because the pixels disposed in the vicinity of the intersection points between the gate lines and the data lines are arranged by being translated, and this pixel layout and the structure with 2-viewpoint and 2-phase deployment are combined in the first comparative example. In that case, the pixels with the same-phase deployment are arranged in the direction towards which the image separation effect of the image separating device does not work.

In the meantime, this exemplary embodiment is different in respect that the neighboring pixel pair disposed by sandwiching the common gate line receives signals supplied from different data lines, even though it employs the same structure of 2-viewpoint and 2-phase deployment. This structure makes it possible to dispose the pixels of different phase deployment orders in the direction towards which the image separation effect of the image separating device does not work. In other words, the phase deployment operations can be dispersed to the direction towards which the image separation effect does not work. That is, it is revolutionary in respect that the pixels with different phase deployment orders can be disposed in the extending direction of the data lines.

That is, with the pixel structure of this exemplary embodiment, it is not necessary to satisfy "NmodM≠0" at least. This is because a high image quality can be achieved even in the case where N=2 and M=2. It is also evident that the high image quality can be achieved as well even when the viewpoint number N is increased. This is because the columns of the pixels arranged in the data line extending direction are configured with the pixels having different phase deployment orders, when the phase deployment number M is 2. That is, when the phase deployment number M is 2, it is possible to achieve a high image quality regardless of the viewpoint number N.

Further, it can be also said that this exemplary embodiment can achieve the same phase deployment layout as that of the seventh exemplary embodiment described above through changing the pixel layout of the first comparative example described above.

As shown in FIG. 25, each of the pixels in the neighboring pixel pair disposed by sandwiching the common gate line may have a relation of rotational symmetry, i.e., dot symmetry. The angle of rotation in that case is preferable to be 180 degrees. This makes it possible to configure the neighboring pixel pair with the same pixels. Thus, the number of designing steps can be reduced, thereby making it possible to cut the cost. Furthermore, when the pixels of different shapes are used, it becomes necessary to check the display qualities that may be deteriorated due to liquid crystal alignment and the like in each pixel. By using the same pixels and arranging those in a rotational symmetric manner, it becomes easier to check the display image quality or to improve the quality.

Further, as shown in FIG. 25, each data line may be disposed by being bent with respect to the direction that is orthogonal to the extending direction of the gate lines. Furthermore, the bending directions of neighboring data lines may be opposite directions from each other. With this, each pixel can be formed substantially in a trapezoid shape. When such pixels are arranged according to the features of the above-described exemplary embodiment, the pixels are disposed in a honeycomb shape as shown in FIG. 26. A honeycomb is a nest of bees that is formed by bees to have a highly dense living space. That is, the proportion of the space in the whole honeycomb is high, so that it is often used as a light structural member. To have the high proportion of the space means that it is possible to achieve a high numerical aperture, when employed for the display panel. That is, even when the pixels are disposed with high density, a high numerical aperture can be achieved. Therefore, a bright display can be provided.

Furthermore, it is preferable to form the pixels into substantially a trapezoid shape by having the scanning line to which each pixel is connected as the upper bottom, through making each video signal line declined from the direction that is orthogonal to the extending direction of the scanning lines. Thereby, not only the aperture area of the substantially trapezoid shape can be expanded, but also the numerical aperture can be increased. In addition, the heights of the areas used for display can be set uniform at an arbitrary position, and it is possible to provide a high image-quality display where shadows of the video signal lines are eliminated. Further, the wirings extending in the direction orthogonal to the image separating direction (X-axis direction in the drawing) can be bent, so that it is possible to prevent the non-display area generated due to the wiring and the like from being expanded by the image separating device. Thereby, a high image quality can be achieved. Furthermore, the neighboring pixel pairs may be disposed in a line symmetrical relation while being inverted on the left and right sides with respect to the arranging direction of the gate lines. Moreover, there may be pixels disposed by being inverted and pixels disposed without being inverted.

Effects of the eighth exemplary embodiment other than those described above are the same as those of the first exemplary embodiment described above.

Figure 27:
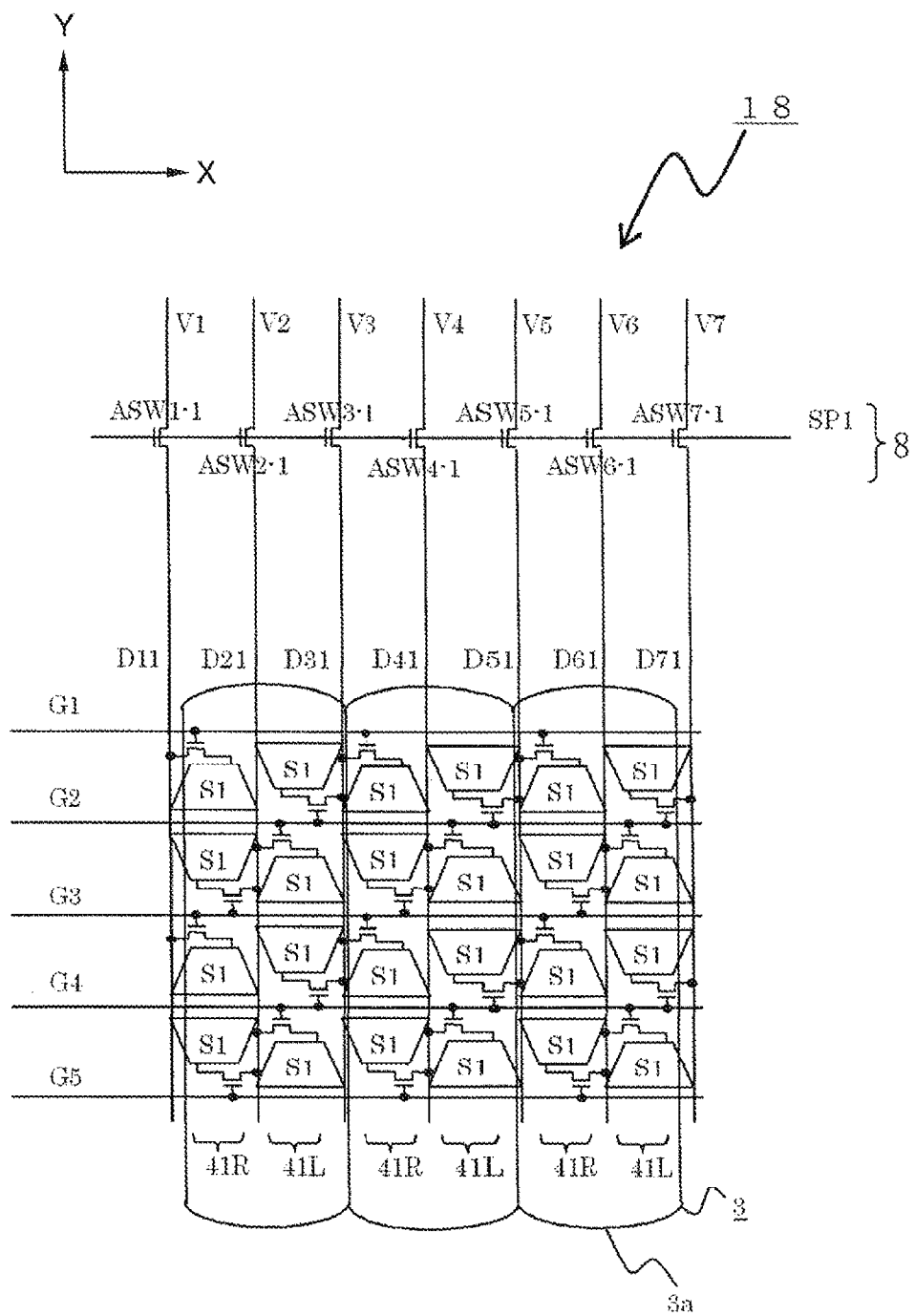
FIG. 27 is a top plan view showing a phase deployment order of left-eye pixels and right-eye pixels of a display device according to a ninth exemplary embodiment of the invention.

Next, a ninth exemplary embodiment of the invention will be described. FIG. 27 is a top plan view showing a phase deployment order of the left-eye pixels and right-eye pixels of a display device according to a ninth exemplary embodiment of the invention. Compared to the eighth exemplary embodiment of the invention described above, the ninth exemplary embodiment is distinctive in respect that the phase deployment number M thereof is "1". The viewpoint number is the same, so that there are two viewpoints on the left and right sides. That is, the ninth exemplary embodiment can also be expressed as the case where the above-described sixth exemplary embodiment is applied to the above-described eighth exemplary embodiment.

As shown in FIG. 27, a display device 18 according to the ninth exemplary embodiment has a structure of 1-phase deployment (M=1). Thereby, not only the data lines to which the right-eye pixels 4R are connected but also the data lines to which the left-eye pixels 4L are connected are all phase-deployed in the first phase. This means that the pixel groups for each viewpoint are all configured equally without being deviated to a specific phase deployment order. Structures of the ninth exemplary embodiment other than those described above are the same as those of the eighth exemplary embodiment described above.

With this exemplary embodiment, the phase deployment orders for each viewpoint can be made uniform and a high image quality can be achieved by satisfying "M=1". That is, it is possible with the pixel structure of this exemplary embodiment to achieve a high image quality when the phase deployment number M is 1, regardless of the viewpoint number N. Effects of the ninth exemplary embodiment other than those described above are the same as those of the eighth exemplary embodiment described above.

Figure 28:
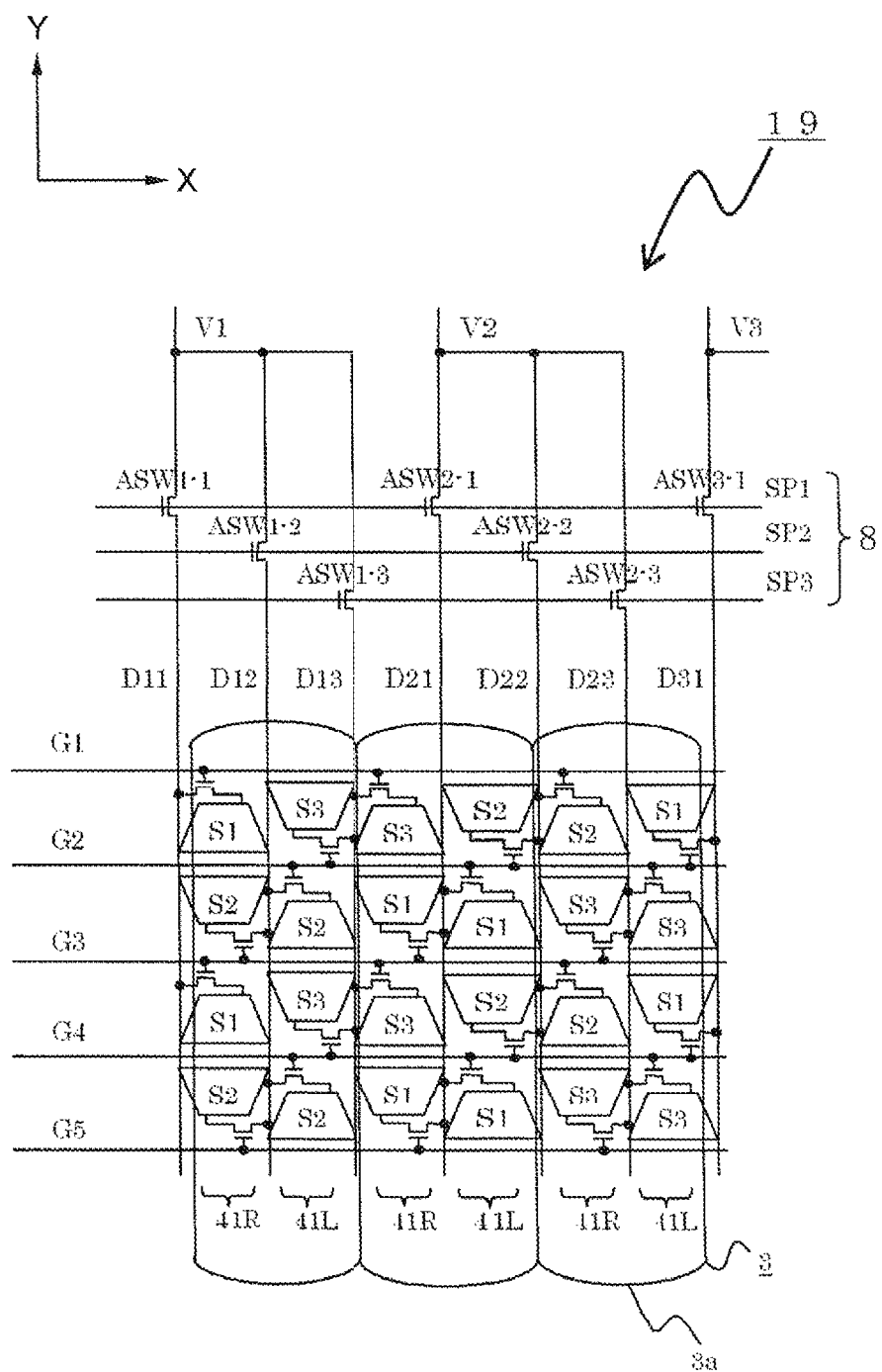
FIG. 28 is a top plan view showing a phase deployment order of first-viewpoint pixels to third-viewpoint pixels of a display device according to a tenth exemplary embodiment of the invention.

Next, a tenth exemplary embodiment of the invention will be described. FIG. 28 is a top plan view showing a phase deployment order of the left-eye pixels and the right-eye pixels of a display device according to the tenth exemplary embodiment of the invention. Compared to the eighth exemplary embodiment of the invention described above, the tenth exemplary embodiment is distinctive in respect that the phase deployment number thereof is "3". The viewpoint number is the same, so that there are two viewpoints on the left and right sides. That is, discussed in the tenth exemplary embodiment is a case where the condition of "M=3 and NmodM≠0" applies.

As shown in FIG. 28, in a display device 19 of the tenth exemplary embodiment, the pixel groups of the right-eye pixels 41R are configured with the pixels deployed in the first to third phases. This is the same for the pixel groups of the left-eye pixels 41L. As described, the pixels groups of each viewpoint are not deviated to a specific phase deployment order, i.e., the switching order. Structures of the tenth exemplary embodiment other than those described above are the same as those of the eighth exemplary embodiment described above.

With this exemplary embodiment, it is also possible to achieve a high image quality even with the case of 2-viewpoint and 3-phase deployment. There is no problem when "NmodM≠0" applies, such as when the viewpoint number is changed to "4", "5", "7", "8", etc., provided that the phase deployment number is "3". However, it is necessary to be careful about the case where "NmodM=0" applies, such as the case where the viewpoint number is "3" or "6". This will be described in detail in a next exemplary embodiment. Furthermore, this exemplary embodiment can also be applied to the case of the phase deployment number of "4" or more, provided that "NmodM≠0" applies.

The visibility of the phase deployment cycle in this exemplary embodiment can be considered the same as that of the first exemplary embodiment described above. Effects of the tenth exemplary embodiment other than those described above are the same as those of the eighth exemplary embodiment described above.

Figure 29:
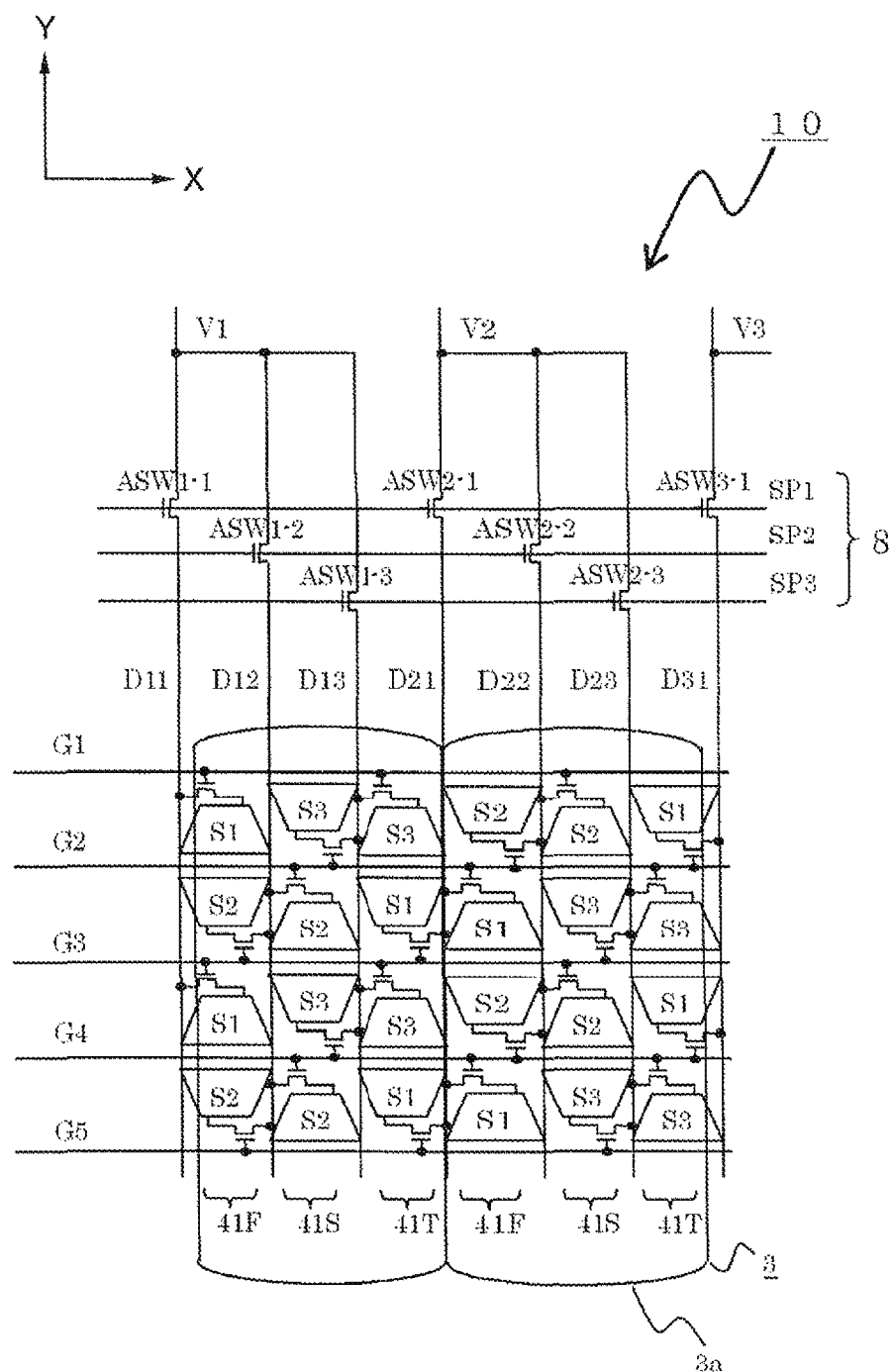
FIG. 29 is a top plan view showing a phase deployment order of first-viewpoint pixels to third-viewpoint pixels of a display device according to an eleventh exemplary embodiment of the invention.

Next, an eleventh exemplary embodiment of the invention will be described. FIG. 29 is a top plan view showing a phase deployment order of the first-viewpoint pixels to the third-viewpoint pixels of a display device according to the eleventh exemplary embodiment of the invention. Compared to the tenth exemplary embodiment of the invention described above, the eleventh exemplary embodiment is distinctive in respect that it is a case of 3-phase deployment and 3-viewpoint. That is, discussed in the eleventh exemplary embodiment is the case where the condition of "M=3 and NmodM=0" applies.

As shown in FIG. 29, in the display device according to the eleventh exemplary embodiment, the pixel groups of the first-viewpoint pixels 41F are configured with the pixels that are deployed in the first phase and the second phase. Further, the pixel groups of the second-viewpoint pixels 41S are configured with the pixels that are deployed in the second phase and the third phase, and the pixel groups of the third-viewpoint pixels 41T are configured with the pixels that are deployed in the third phase and the first phase.

As described, in this exemplary embodiment, the pixel groups of each viewpoint are not deviated to a specific phase deployment order, even though it is not in a perfectly undeviating state, either. Structures of the eleventh exemplary embodiment other than those described above are the same as those of the tenth exemplary embodiment described above.

With this exemplary embodiment, deviation in the phase deployment order can be reduced (even though not perfectly) for the pixel groups of each viewpoint pixels. That is, by configuring the pixel groups for each viewpoint with a plurality of kinds of phase deployment orders, adverse effects can be reduced with the use of different phase deployment orders. Thus, it is possible to improve the display image quality. This exemplary embodiment is the case of "M=3 and N=3". However, this exemplary embodiment can also be applied to the cases where "NmodM=0" applies, such as the cases where the viewpoint number N is "6", "9", "12", or the like. That is, with the pixel structure depicted in this exemplary embodiment, it is not essential to satisfy the condition of "NmodM≠0". It can be said that it is preferable to satisfy the condition as in the tenth exemplary embodiment described above. Effects of the eleventh exemplary embodiment other than those described above are the same as those of the tenth exemplary embodiment described above.

Figure 30:
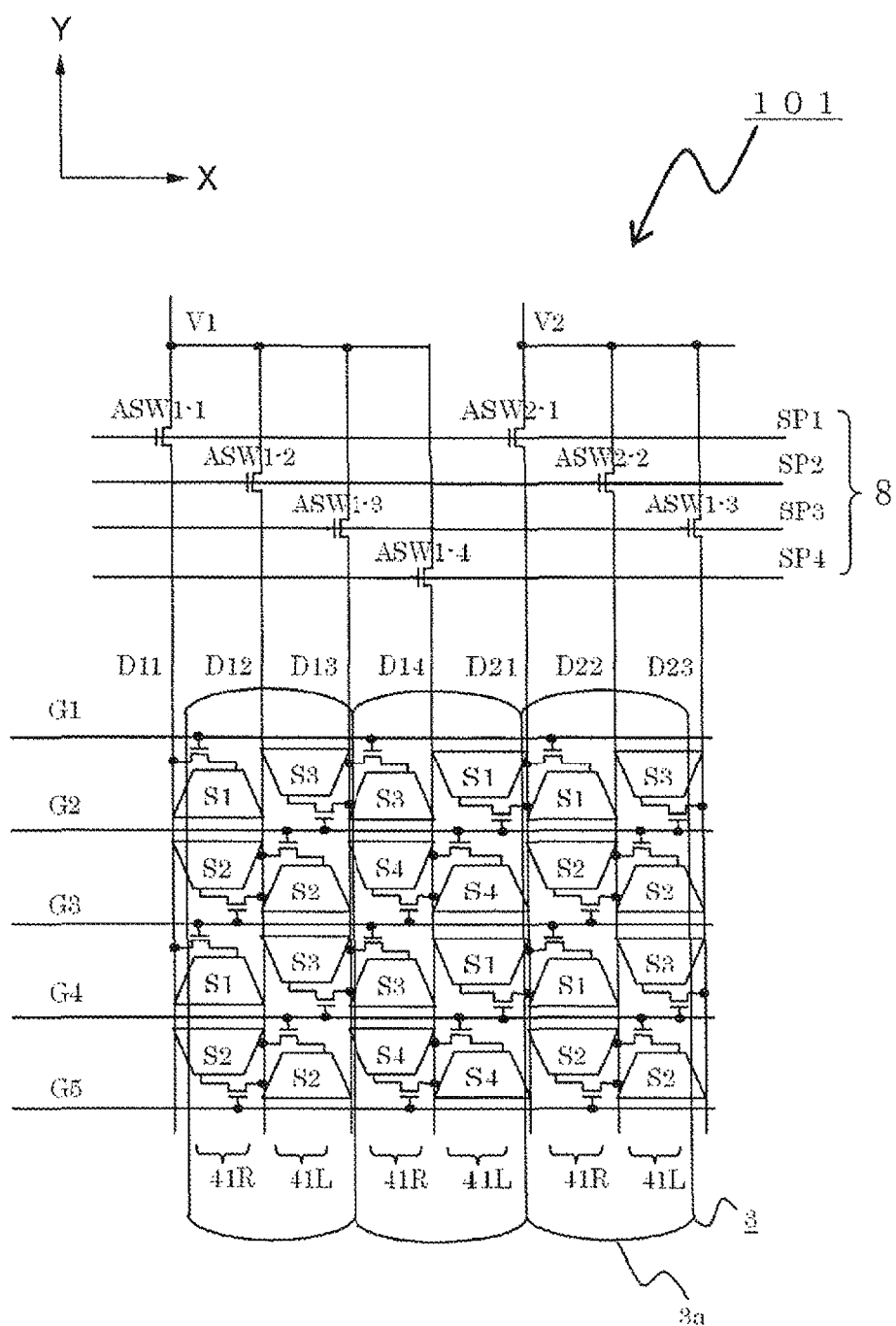
FIG. 30 is a top plan view showing a phase deployment order of left-eye pixels and right-eye pixels of a display device according to a twelfth exemplary embodiment of the invention.

Next, a twelfth exemplary embodiment of the invention will be described. FIG. 30 is a top plan view showing a phase deployment order of the left-eye pixels and the right-eye pixels of a display device according to the twelfth exemplary embodiment of the invention. Compared to the eleventh exemplary embodiment of the invention described above, the twelfth exemplary embodiment is distinctive in respect that it is a case of 4-phase deployment and 2-viewpoint. This is a case where the phase deployment number can be divided by the viewpoint number. It sometimes happens that the phase deployment number can be divided by the viewpoint number N, when the phase deployment number M becomes large. Such case is a unique case.

As shown in FIG. 30, in a display device 101 of the twelfth exemplary embodiment, the pixel groups of the right-eye pixels 41R are configured with the pixels that are deployed in the first to fourth phases. This is the same for the pixel groups of the left-eye pixels 41L. As described, the pixel groups of each viewpoint are not deviated to a specific phase deployment order, i.e., switching order. Structures of the twelfth exemplary embodiment other than those described above are the same as those of the eleventh exemplary embodiment described above.

By employing the pixel structure depicted in this exemplary embodiment, a high image quality can be achieved even in a case where the phase deployment number M can be divided by the viewpoint number N, i.e., in a case where "MmodN=0" applies. This also applies for a case with a still larger phase deployment number. Effects of the twelfth exemplary embodiment other than those described above are the same as those of the eleventh exemplary embodiment described above.

Figure 31:
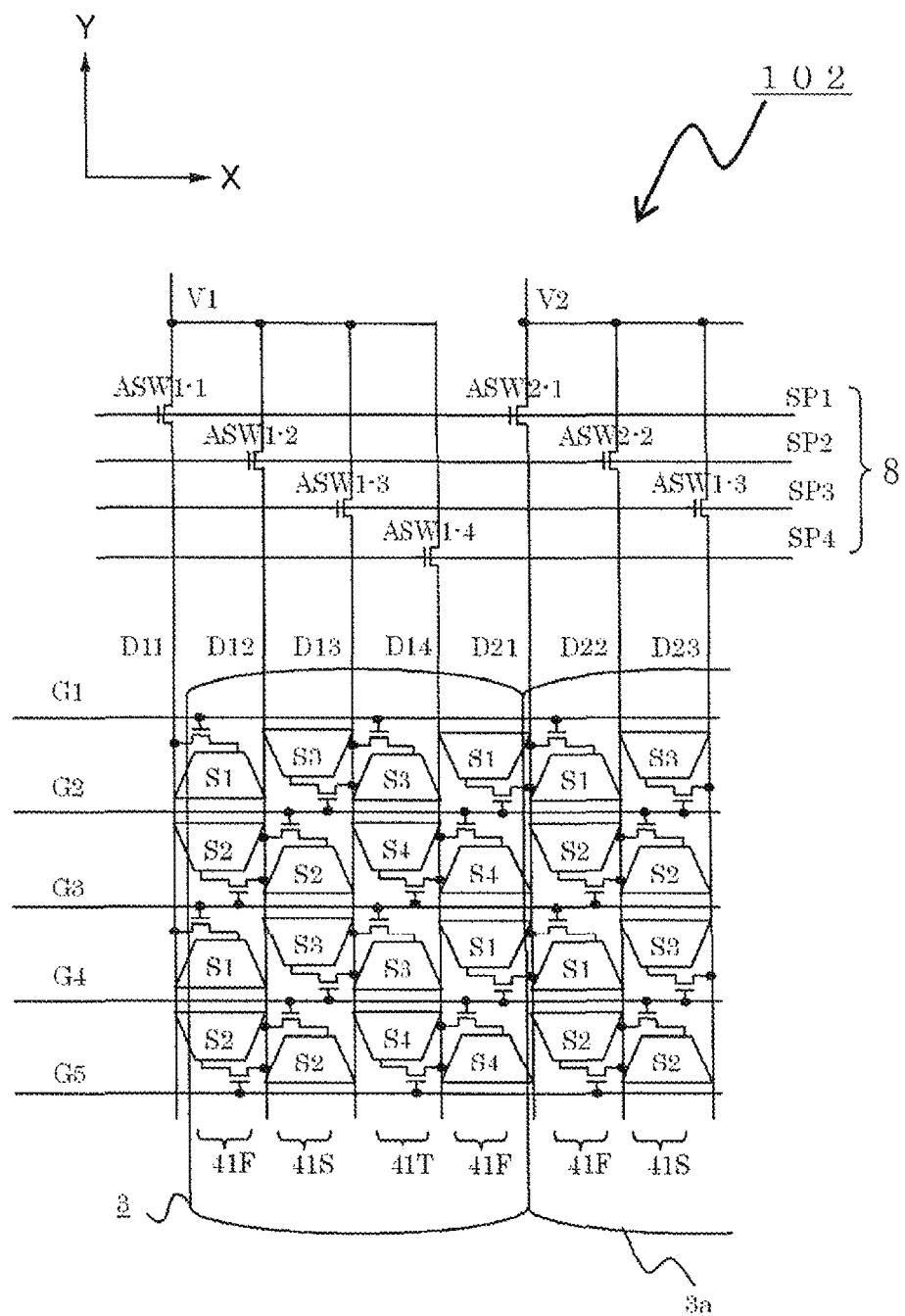
FIG. 31 is a top plan view showing a phase deployment order of first-viewpoint pixels to fourth-viewpoint pixels of a display device according to a thirteenth exemplary embodiment of the invention.

Next, a thirteenth exemplary embodiment of the present invention will be described. FIG. 31 is a top plan view showing a phase deployment order of the first-viewpoint pixels to the fourth-viewpoint pixels of a display device according to the thirteenth exemplary embodiment of the present invention. Compared to the eleventh exemplary embodiment of the present invention described above, the thirteenth exemplary embodiment is distinctive in respect that it is a case of 4-phase deployment and 4-viewpoint. The eleventh exemplary embodiment has shown that the image quality can be improved with 3-viewpoint and 3-phase deployment. The thirteenth exemplary embodiment shows that it is the same for the case with the phase deployment number of "4" and larger.

As shown in FIG. 31, in a display device 102 of the thirteenth exemplary embodiment, the pixel groups of the first-viewpoint pixels 41F are configured with the pixels that are deployed in the first phase and the second phase, the pixel groups of the second-viewpoint pixels 41S are configured with the pixels that are deployed in the second phase and the third phase, the pixel groups of the third-viewpoint pixels 41T are configured with the pixels that are deployed in the third phase and the fourth phase, and the pixel groups of the fourth-viewpoint pixels 41F are configured with the pixels that are deployed in the fourth phase and the first phase.

As described, in this exemplary embodiment, the pixel groups of each viewpoint are not deviated to a specific phase deployment order, even though it is not in a perfectly undeviating state, either. Structures of the this exemplary embodiment other than those described above are the same as those of the eleventh exemplary embodiment described above.

With this exemplary embodiment, deviation in the phase deployment order can be reduced (even though not perfectly) for the pixel groups of each viewpoint pixels. That is, by configuring the pixel groups for each viewpoint with a plurality of kinds of phase deployment orders, bad influences can be reduced with the use of different phase deployment orders. Thus, it is possible to improve the display image quality. This exemplary embodiment is the case of "M=4 and N=4". However, this exemplary embodiment can also be applied to the cases where "NmodM=0" applies, such as the cases where the viewpoint number N is "8", "12", "16", or the like. Further, it is also possible to improve the display image quality even in a case where the phase deployment number M is "5" or larger. Effects of the thirteenth exemplary embodiment other than those described above are the same as those of the eleventh exemplary embodiment described above.

Here, the eighth exemplary embodiment to the thirteenth exemplary embodiment of the invention described above will be summarized. With those exemplary embodiments, the phase deployment operations can be dispersed also in the data line extending direction by supplying the signals from different data lines to the neighboring pixel pair disposed by sandwiching the common gate line. With this, it becomes possible to provide a high image quality when the phase deployment number M is "2" or smaller, regardless of the viewpoint number N. It is also possible to provide a high image quality when the phase deployment number M is "3" or larger, regardless of the viewpoint number N. However, it is preferable to satisfy the condition of "NmodM≠0".

Figure 32:
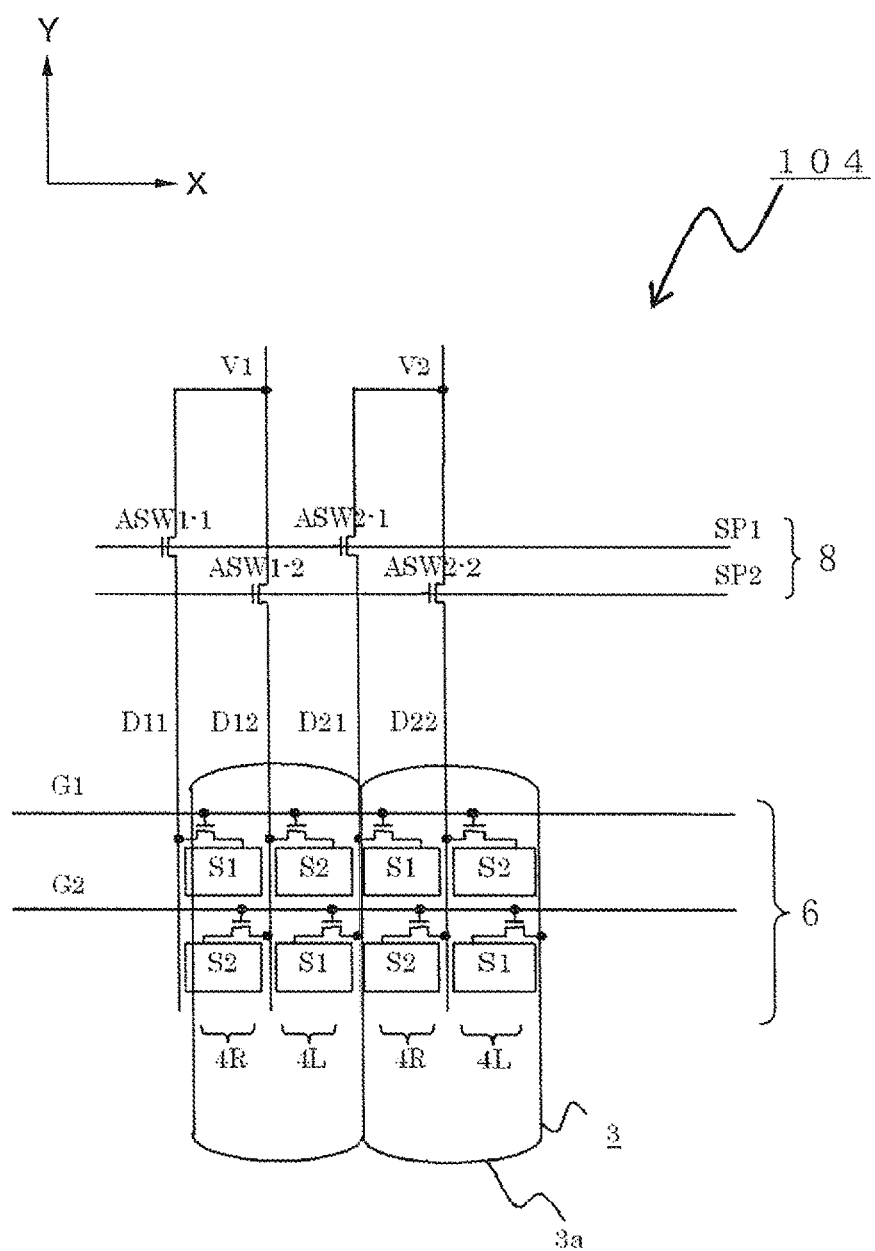
FIG. 32 is a top plan view showing a phase deployment order of left-eye pixels and right-eye pixels of a display device according to a fourteenth exemplary embodiment of the invention.

Next, a fourteenth exemplary embodiment of the invention will be described. As shown in FIG. 32, a display device 104 according to this exemplary embodiment includes: a pixel matrix 6 configured with a plurality of pixel units S1 and S2, - - - disposed in matrix, each including two neighboring pixels for respectively displaying images for two (as N) viewpoints, in which the pixels S1, - - - are disposed in the vicinity of each proximal point between gate lines G1, G2 and data lines D11-D22; video signal lines V1, V2 for outputting display data; a wiring switching element 8 which successively switches and connects two (as M) data lines D11, - - - to each of the video signal lines V1, V2 so as to supply the display data to the pixels S1, - - - via the data lines D11, - - - ; a lenticular lens 3 for distributing the light emitted from each of the pixels S1, - - - configuring the display unit S1 and S2 - - - to the X-axis direction for each of the two viewpoints; and a plurality of TFTs (reference numerals are omitted) for transmitting the display data to each of the pixels S1, - - - from the data lines D11-D22. The gate lines G1, G2 having a function of controlling those TFTs are extended along the X-axis direction. One each of the data lines D11, - - - is arranged along the X-axis direction, and two each of the pixels S1, S2 - - - as a display unit are disposed along the X-axis direction. The switching order dispersing device is structured to alternately distributes each of the pixels S1, S2 - - - in a column sandwiched between any of two neighboring data lines such as the data lines D11 and D12 out of the gate lines D11-D22 to the pixels S1, - - - which are connected to the data line D11 via the TFTs and to the pixels S2, - - - which are connected to the data line D12 via the TFTs.

This structure of the switching order dispersing device disperses the switching order of the wiring switching element 8 for each of the pixels S1, S2 - - - within the right-eye pixels 4R and the left-eye pixels 4L as the pixel groups configured with the pixels S1, S2, - - - for displaying the images for the same viewpoint.

Conventionally, the switching order of the wiring switching element 8 for all the pixels S1, - - - within the right-eye pixels 4R is the first, for example, and the switching order for all the pixels S2, - - - within the left-eye pixels 4L is the second. Thus, there generates a difference in the display between the right-eye pixels 4R and the left-eye pixels 4L caused due to the switching order. Therefore, this embodiment improves the image quality by equalizing the switching orders as a whole for the right-eye pixels 41R and the left-eye pixels 41L through connecting each of the pixels S1, - - - on a single column in the Y-axis direction to different data lines D11, - - - - . This will be described in detail hereinafter.

FIG. 32 is a top plan view showing a phase deployment order of left-eye pixels and right-eye pixels of a display device according to a fourteenth exemplary embodiment of the invention. The fourteenth exemplary embodiment is a mode which extracts only a part of the features of the above-described eighth exemplary embodiment (i.e., the feature that the pixels arranged in the arranging direction of the gate lines are connected to different neighboring data lines) and applies it to the first comparative example described above. That is, the pixels arranged by sandwiching the gate line do not take the gate line interposed between those pixels as the common gate line. Further, there are disposed a large number of pixel columns that have the same pixel layout in the extending direction of the gate lines.

That is, as shown in FIG. 32, a pixel that is connected to the gate line G2 and the data line D12 is disposed on the gate line arranging direction side (−Y direction side, for example) of the pixel that is connected to the gate line G1 and the data line D11. The pixel connected to the gate line G1 and the data line D11 is phase-deployed in the first phase, while the pixel connected to the gate line G2 and the data line D12 is phase-deployed in the second phase. That is, the pixels of different phase deployment orders are disposed along the arranging direction of the gate lines. Structures of the fourteenth exemplary embodiment other than those described above are the same as those of the first exemplary embodiment described above.

With this exemplary embodiment, the pixels to which signals are written in different phase deployment orders can be disposed in the direction towards which the image separating effect of the image separating device does not work. As a result, the pixel groups for each viewpoint can be configured with the pixels of a plurality of phase deployment orders, so that deviation in the phase deployment orders can be reduced.

As described, it can be seen that the pixels disposed in the arranging direction of the gate lines need to be connected to different data lines, in order to disperse the phase deployment operations to the direction towards which the image separation effect does not work.

In this exemplary embodiment, the pixels connected to different data lines are disposed alternately towards the arranging direction of the gate lines. However, the exemplary embodiment is not limited only to such case. Every plural number of pixels may be connected to different data lines. Furthermore, pixel columns having different pixel layout may also be disposed. Effects of the fourteenth exemplary embodiment other than those described above are the same as those of the first exemplary embodiment described above.

Figure 33:
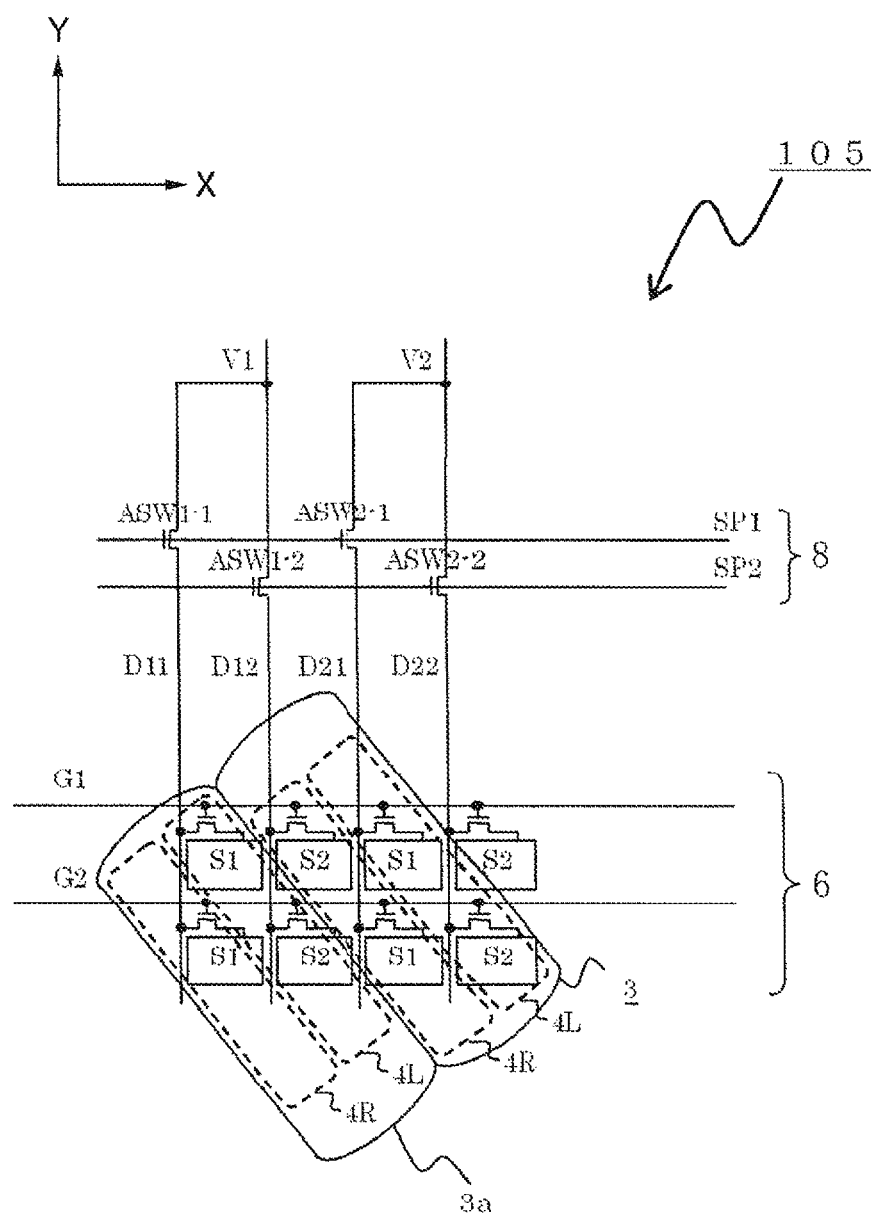
FIG. 33 is a top plan view showing a phase deployment order of left-eye pixels and right-eye pixels of a display device according to a fifteenth exemplary embodiment of the invention.

Next, a fifteenth exemplary embodiment of the invention will be described. As shown in FIG. 33, a display device 105 according to this exemplary embodiment includes: a pixel matrix 6 configured with a plurality of pixel units S1 and S1, - - - disposed in matrix, each including two neighboring pixels for respectively displaying images for two (as N) viewpoints, in which the pixels S1, - - - are disposed in the vicinity of each proximal point between gate lines G1, G2 and data lines D11-D22; video signal lines V1 and V2 for outputting display data; a wiring switching element 8 which successively switches and connects two (as M) data lines D11, - - - to each of the video signal lines V1, V2 so as to supply the display data to the pixels S1, - - - via the data lines D11, - - - ; a lenticular lens 3 for respectively distributing the light emitted from each of the pixels S1, - - - configuring the display unit S1, - - - into the ±(X+Y)-axis direction for each of the two viewpoints; and a plurality of TFTs (reference numerals are omitted) for transmitting the display data to each of the pixels S1, - - - from the data lines D11-D22. The gate lines G1, G2 having a function of controlling those TFTs are extended along the X-axis direction. One each of the data lines D11, - - - is disposed along the X-axis direction, and two each of the pixels S1, - - - as a display unit are arranged along the Y-axis direction. The lenticular lens 3 also functioning as a switching order dispersing device disperses the switching orders of the wiring switching element 8 corresponding to each of the pixels S1, - - - for the right-eye pixels 4R and the left-eye pixels 4L as the pixel groups configured with the pixels S1, - - - which display the images for the same viewpoint.

Conventionally, the switching order of the wiring switching element 8 for all the pixels S1, - - - within the right-eye pixels 4R is the first, for example, and the switching order for all the pixels S1, - - - within the left-eye pixels 4L is the second. Thus, there generates a difference in the display between the right-eye pixels 4R and the left-eye pixels 4L caused due to the switching order. Therefore, this embodiment improves the image quality by equalizing the switching orders as a whole for the right-eye pixels 4R and the left-eye pixels 4L through setting the arranging direction of the data lines D11-D22 and the light distributing direction of the lenticular lens 3 to be oblique with each other. This will be described in detail hereinafter.

FIG. 33 is a top plan view showing a phase deployment order of the left-eye pixels and the right-eye pixels of a display device according to a fifteenth exemplary embodiment of the invention. The fifteenth exemplary embodiment is a case where the layout depicted in the first exemplary embodiment is rotated, i.e., a case where the arranging direction of the cylindrical lenses is rotated from the extending direction of the gate lines. Particularly, it is a mode that is combined with 2-phase deployment depicted in the first comparative example described above.

That is, as shown in FIG. 33, the pixel connected to the gate line G1 and the data line D11 is phase-deployed in the first phase, while the pixel connected to the gate line G2 and the data line D12 is phase-deployed in the second phase. These two pixels are contained in the pixel group configured with the left-eye pixels 4L. Further, the pixel connected to the gate line G1 and the data line D12 is phase-deployed in the second phase, while the pixel connected to the gate line G2 and the data line D21 is phase-deployed in the first phase. These two pixels are contained in the pixel group configured with the right-eye pixels 4R. Structures of the fifteenth exemplary embodiment other than those described above are the same as those of the first exemplary embodiment described above.

With this exemplary embodiment, the image separating direction of the one-dimensional image separating device is disposed with rotated from the extending direction of the gate line or data line. This makes it possible to reduce the deviation in the phase deployment orders of the pixel groups for each viewpoint, so that a high image quality can be achieved.

This exemplary embodiment is depicted by referring to a case of two viewpoints on the left and right sides. However, this exemplary embodiment can also be applied to cases of still larger number of viewpoints. When there is deviation generated in the phase deployment orders due to increased number of viewpoints, it is very effective to combine this exemplary embodiment with the fourteenth exemplary embodiment described above. Effects of the fifteenth exemplary embodiment other than those described above are the same as those of the first exemplary embodiment described above.

Figure 34:
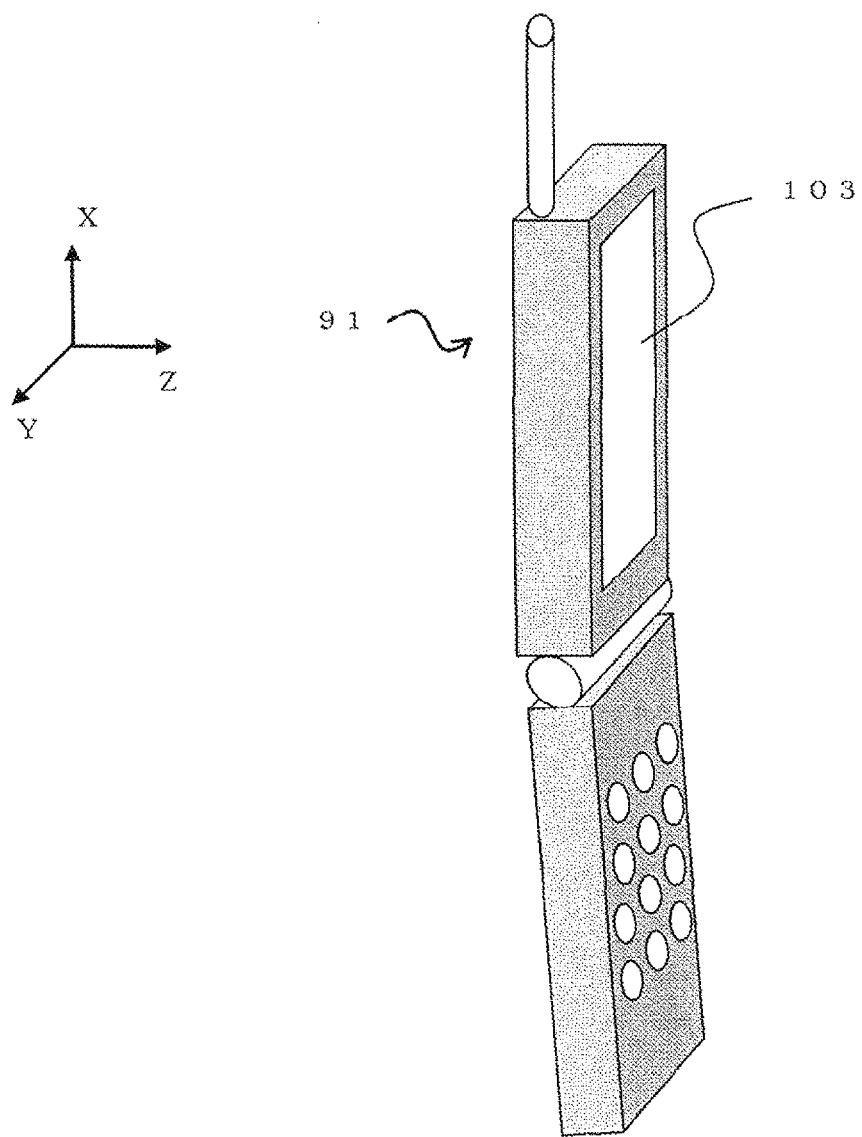
FIG. 34 is a perspective view showing a terminal device according to a sixteenth exemplary embodiment of the invention.

Next, a sixteenth exemplary embodiment of the invention will be described. FIG. 34 is a perspective view showing a terminal device according to this exemplary embodiment of the invention, and FIG. 35 is a top plan view showing a phase deployment order of first-viewpoint pixels and second-viewpoint pixels of a display device according to this exemplary embodiment.

Figure 35:
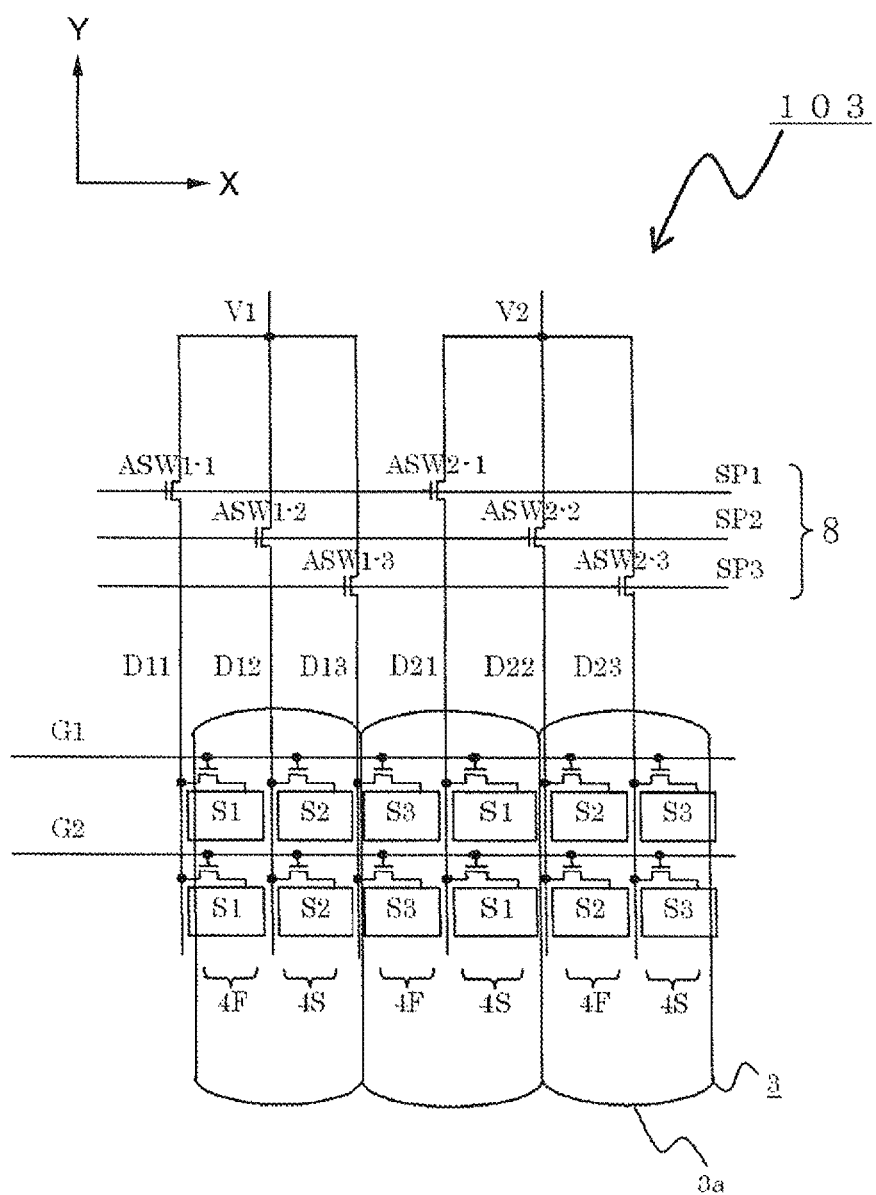
FIG. 35 is a top plan view showing a phase deployment order of first-viewpoint pixels and second-viewpoint pixels of a display device according to this exemplary embodiment.

As shown in FIG. 34 and FIG. 35, a display device 103 according to this exemplary embodiment is mounted onto a portable telephone 91 as the terminal device. Compared to the first exemplary embodiment described above, the sixteenth exemplary embodiment is different in respect that the longitudinal direction of the cylindrical lenses 3a configuring the lenticular lens (the Y-axis direction) is the lateral direction of the image display device (horizontal direction of the image), and the arranging direction of the cylindrical lenses 3a (X-axis direction) is the vertical direction (perpendicular direction of the image).

Further, as shown in FIG. 35, a plurality of pixel pairs each configured with a single first-viewpoint pixel 4F and a single second-viewpoint pixel 4S are arranged in matrix in the display device 103. The arranging direction of the first-viewpoint pixel 4F and the second-viewpoint pixel 4S in a single pixel pair is the X-axis direction that is the arranging direction of the cylindrical lenses 3a, which is the vertical direction (perpendicular direction) of the screen. Further, structures of each of the pixels 4F and 4S are the same as those of the first exemplary embodiment described above. Furthermore, the viewpoint number, the phase deployment number, and the phase deployment operations are the same as those of the first exemplary embodiment. Structures of the sixteenth exemplary embodiment other than those described above are the same as those of the first exemplary embodiment described above.

Next, operations of the display device according to this exemplary embodiment will be described. However, the basic operations are the same as those of the first exemplary embodiment described above, and images to be displayed are different. The first-viewpoint pixel 4F of the display device 103 shows an image for the first viewpoint, and the second-viewpoint pixel 4S shows an image for the second viewpoint. The image for the first viewpoint and the image for the second viewpoint are not stereoscopic images having parallax from each other but plane images. Further, both images may be independent images from each other, or may be images showing information related to each other.

This exemplary embodiment has such an advantage that the observer can select the first viewpoint image or the second viewpoint image by simply changing the angle of the portable telephone 91. Particularly when there is a relevancy between the first viewpoint image and the second viewpoint image, each image can be switched to be observed alternatively by simply changing the observing angle. Therefore, convenience for the observers can be greatly improved. When the first viewpoint image and the second viewpoint image are arranged in the lateral direction, it sometimes happens that the right eye and the left eye observe different images depending on the observing position. In that case, the observer becomes confused, and becomes unable to recognize the images at each viewpoint. However, when the plural viewpoint images are arranged in the vertical direction as in this exemplary embodiment, the observer can always observe the images for each viewpoint with both eyes. Therefore, those images can be recognized easily. Effects of the sixteenth exemplary embodiment other than those described above are the same as those of the first exemplary embodiment described above. This exemplary embodiment can also be combined with any of the second to thirteenth exemplary embodiments described above.

Figure 36:
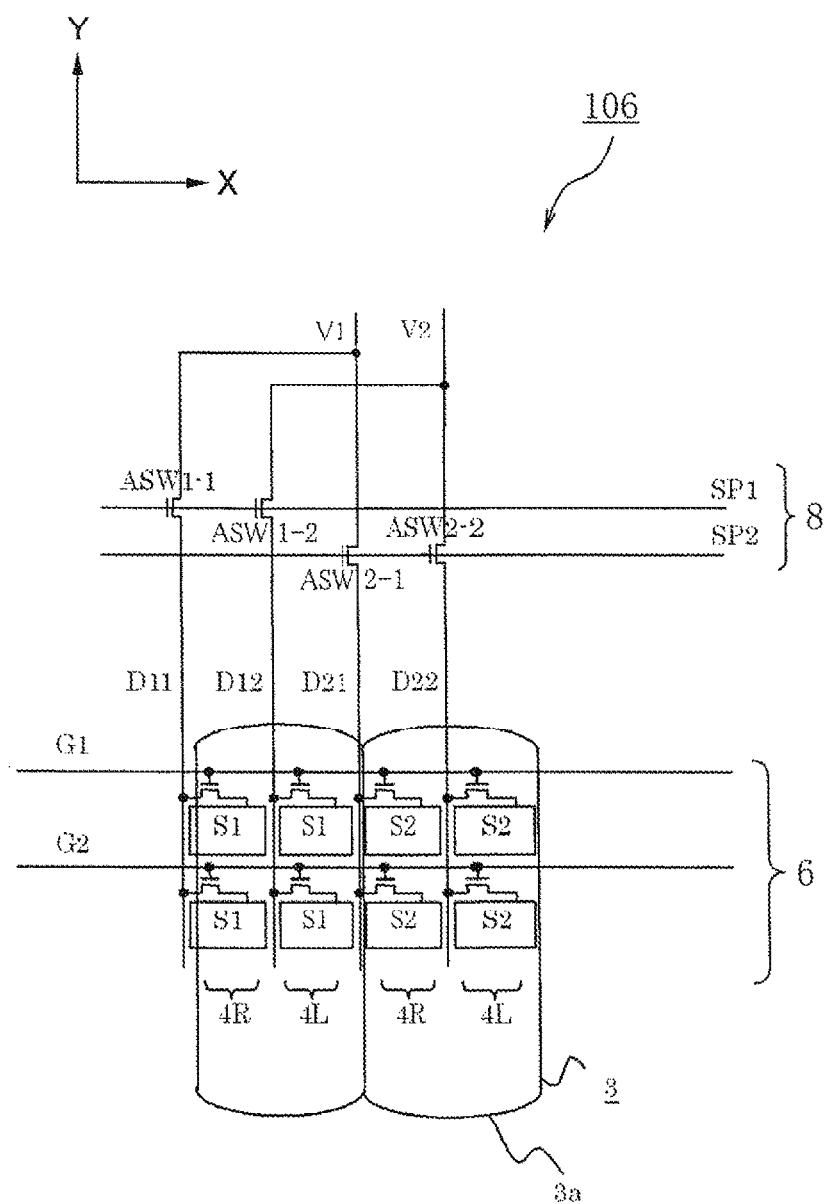
FIG. 36 is a top plan view showing a phase deployment order of left-eye pixels and right-eye pixels of a display device according to a seventeenth exemplary embodiment of the invention.

Next, a seventeenth exemplary embodiment of the invention will be described. As shown in FIG. 36, a display device 106 according to this exemplary embodiment includes: a pixel matrix 6 configured with a plurality of pixel units S1 and S1, - - - disposed in matrix, each including two neighboring pixels for respectively displaying images for two (as N) viewpoints, in which the pixels S1, - - - are disposed in the vicinity of each proximal point between gate lines G1, G2 and data lines D11-D22; video signal lines V1, V2 for outputting display data; a wiring switching element 8 which successively switches and connects two (as M) data lines D11, - - - to each of the video signal lines V1, V2 so as to supply the display data to the pixels S1, - - - via the data lines D11, - - - ; a lenticular lens 3 for distributing the light emitted from each of the pixels S1, - - - configuring the display unit S1 and S1, - - - into the X-axis direction for each of the two viewpoints; and a plurality of TFTs (reference numerals are omitted) for transmitting the display data to each of the pixels S1, - - - from the data lines D11-D22. The gate lines G1, G2 having a function of controlling those TFTs are extended along the X-axis direction. One each of the data lines D11, - - - is arranged along the X-axis direction, and two each of the pixels S1 and S1, - - - as a display unit are disposed along the X-axis direction. The wiring switching element 8 also functioning as a switching order dispersing device disperses the switching orders of the data lines D11, - - - which correspond to each of the pixels S1, S2, - - - for the right-eye pixels 4R and the left-eye pixels 4L as the pixel groups configured with the pixels S1, S2, - - - which display the images for the same viewpoint.

Conventionally, the switching order of the wiring switching element 8 for all the pixels S1, - - - within the right-eye pixels 4R is the first, for example, and the switching order for all the pixels S2, - - - within the left-eye pixels 4L is the second. Thus, there generates a difference in the display between the right-eye pixels 4R and the left-eye pixels 4L caused due to the switching order. Therefore, this embodiment improves the image quality by equalizing the switching orders as a whole for the right-eye pixels 4R and the left-eye pixels 4L through successively switching and connecting the data lines D11, - - - by two lines as a unit simultaneously to each of the display unit S1 and S1, - - - which are configured with two neighboring pixels. Other structures, functions, and effects are the same as those of each of the exemplary embodiment described above.

Figure 37:
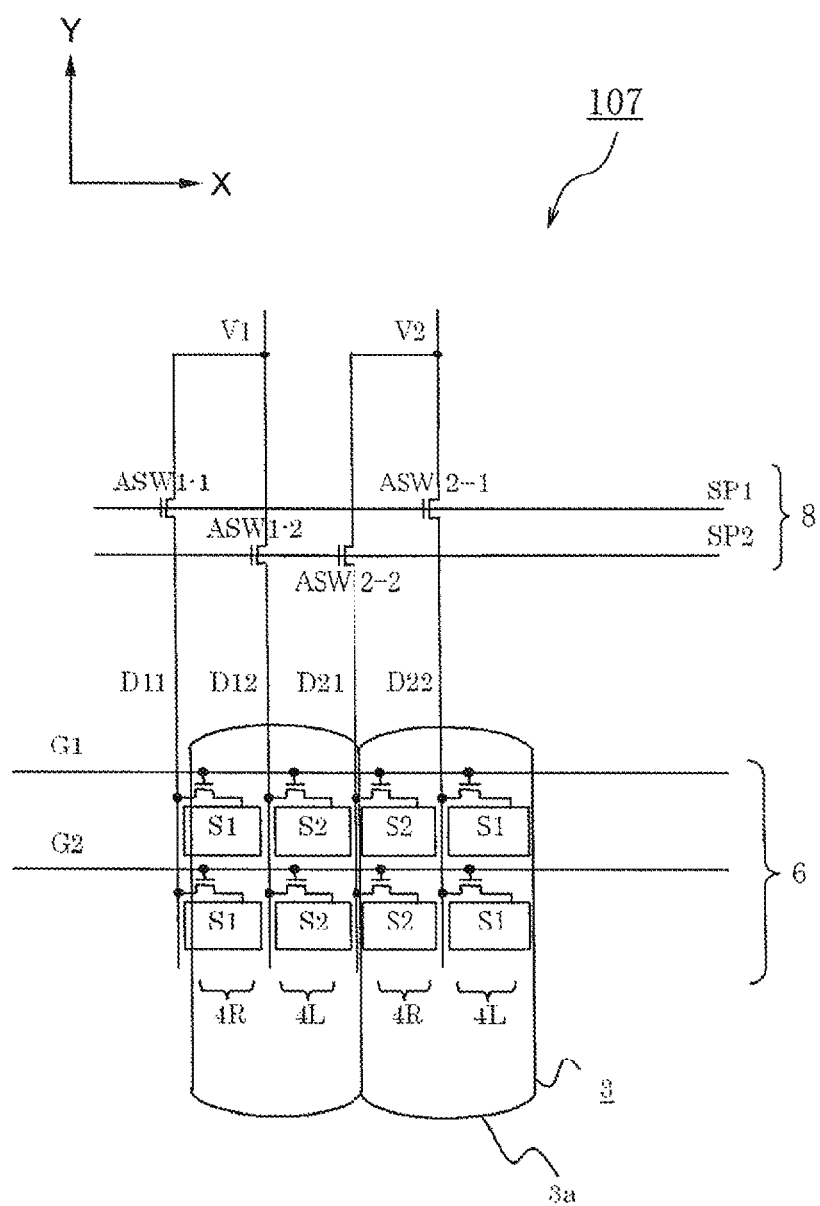
FIG. 37 is a top plan view showing a phase deployment order of left-eye pixels and right-eye pixels of a display device according to an eighteenth exemplary embodiment of the invention.

Next, an eighteenth exemplary embodiment of the invention will be described. As shown in FIG. 37, a display device 107 according to this exemplary embodiment includes: a pixel matrix 6 configured with a plurality of pixel units S1 and S2, - - - disposed in matrix, each including two neighboring pixels for respectively displaying images for two (as N) viewpoints, in which the pixels S1, - - - are disposed in the vicinity of each proximal point between gate lines G1, G2 and data lines D11-D22; video signal lines V1, V2 for outputting display data; a switching device 8 which successively switches and connects two (as M) data lines D11, - - - to each of the video signal lines V1, V2 so as to supply the display data to the pixels S1, - - - via the data lines D11, - - - ; a lenticular lens 3 for distributing the light emitted from each of the pixels S1, - - - configuring the display unit S1 and S2, - - - into the X-axis direction for each of the two viewpoints; and a plurality of TFTs (reference numerals are omitted) for transmitting the display data to each of the pixels S1, - - - from the data lines D11-D22. The gate lines G1, G2 having a function of controlling those TFTs are extended along the X-axis direction. One each of the data lines D11, - - - is arranged along the X-axis direction, and two each of the pixels S1 and S2, - - - as a display unit are disposed along the X-axis direction. At the wiring switching element 8 functioning as a switching order dispersing device, the switching order of the two data lines D11, - - - for each of the video signal lines V1, V2 is different for at least in a part of the neighboring display unit S1 an S2 and the display unit S2 and S1. That is, the switching order of the data lines D11, D12 in the display unit S1 and S2 is "the data line D11 on the left→ the data line D12 on the right".

Inversely, the switching order of the data lines D21, D22 in the display unit S2 and S1 is "the data line D22 on the right→ the data line D21 on the left". This makes it possible to disperse the switching orders of the wiring switching element 8 corresponding to each of the pixels S1, S2, - - - for the right-eye pixels 4R and the left-eye pixels 4L as the pixel groups configured with the pixels S1, S2, - - - which display the images for the same viewpoint.

Conventionally, the switching order of the wiring switching element 8 for all the pixels S1, - - - within the right-eye pixels 4R is the first, for example, and the switching order for all the pixels S2, - - - within the left-eye pixels 4L is the second. Thus, there generates a difference in the display between the right-eye pixels 4R and the left-eye pixels 4L caused due to the switching order. Therefore, this embodiment improves the image quality by equalizing the switching orders as a whole for the right-eye pixels 4R and the left-eye pixels 4L through changing the switching order of the data lines D11, - - - for each of the pixel units S1 and S2, - - - configured with two neighboring pixels. Other structures, functions, and effects are the same as those of each of the exemplary embodiment described above.

Figure 38:
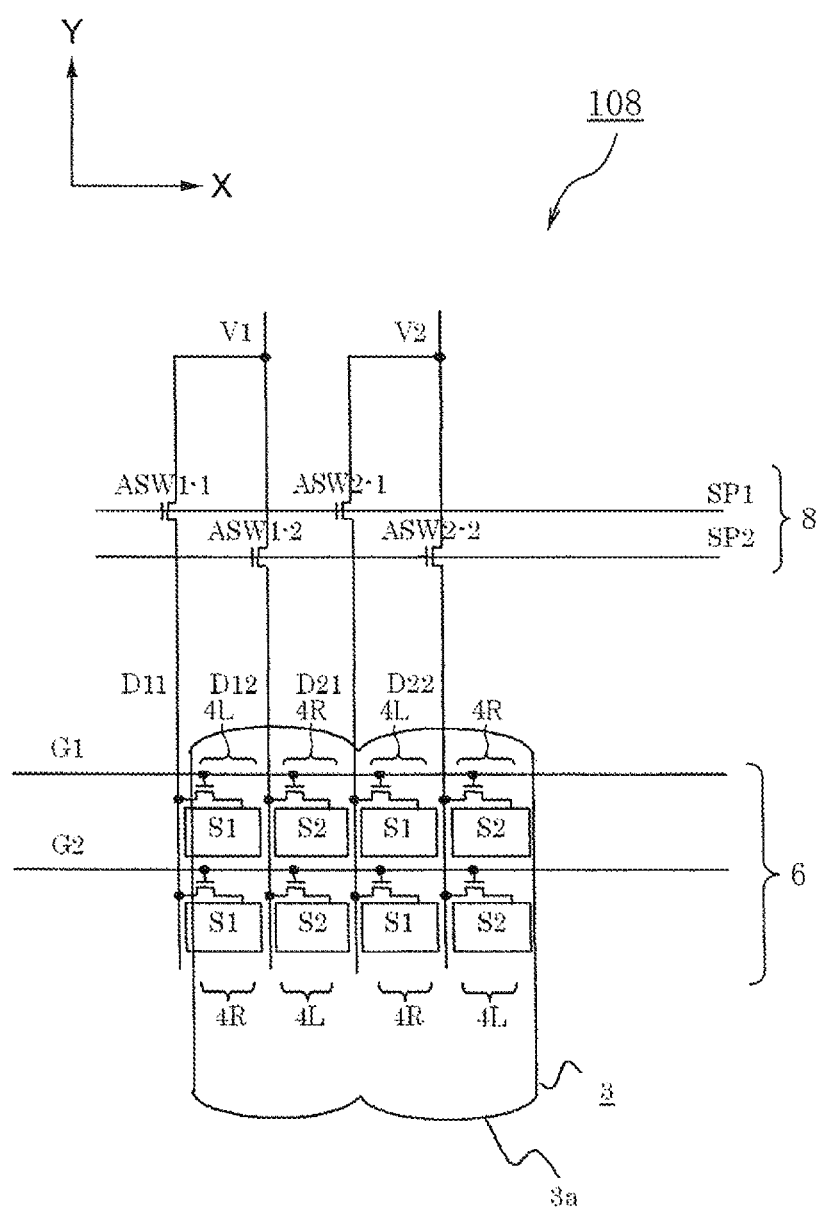
FIG. 38 is a top plan view showing a phase deployment order of left-eye pixels and right-eye pixels of a display device according to a nineteenth exemplary embodiment of the invention.

Next, a nineteenth exemplary embodiment of the invention will be described. As shown in FIG. 38, a display device 108 according to this exemplary embodiment includes: a pixel matrix 6 configured with a plurality of pixel units S1 and S2, - - - disposed in matrix, each including two neighboring pixels for respectively displaying images for two (as N) viewpoints, in which the pixels S1, - - - are disposed in the vicinity of each proximal point between gate lines G1, G2 and data lines D11-D22; video signal lines V1, V2 for outputting display data; a wiring switching element 8 which successively switches and connects two (as M) data lines D11, - - - to each of the video signal lines V1, V2 so as to supply the display data to the pixels S1, - - - via the data lines D11, - - - ; a lenticular lens 3 for distributing the light emitted from each of the pixels S1, - - - configuring the display unit S1, S2, - - - into the X-axis direction for each of the two viewpoints; and a plurality of TFTs (reference numerals are omitted) for transmitting the display data to each of the pixels S1, - - - from the data lines D11-D22. The gate lines G1, G2 having a function of controlling those TFTs are extended along the X-axis direction. One each of the data lines D11, - - - is arranged along the X-axis direction, and two each of the pixels S1 and S2, - - - as a display unit are disposed along the X-axis direction. The lenticular lens 3 also functioning as a switching order dispersing device distributes the light to the different directions from each other for at least a part of the neighboring pixels S1 and S1 which are arranged on a column along the Y-axis direction. For example, the upper pixel on the far left column is for the left eye and the lower pixel is for the right eye. The cylindrical lenses 3a of the lenticular lens 3 are structured to distribute the light towards the opposite directions from each other for the neighboring pixels S1, - - - . This makes it possible to disperse the switching orders of the wiring switching element 8 corresponding to each of the pixels S1, S2, - - - for the right-eye pixels 4R and the left-eye pixels 4L as the pixel groups configured with the pixels S1, S2, - - - which display the images for the same viewpoint.

Conventionally, the switching order of the wiring switching element 8 for all the pixels S1, - - - within the right-eye pixels 4R is the first, for example, and the switching order for all the pixels S2, - - - within the left-eye pixels 4L is the second. Thus, there generates a difference on the display between the right-eye pixels 4R and the left-eye pixels 4L caused due to the switching order. Therefore, this embodiment improves the image quality by equalizing the switching orders as a whole for the right-eye pixels 4R and the left-eye pixels 4L through changing the light distributing directions for the neighboring pixels S1, - - - - . Other structures, functions, and effects are the same as those of each of the exemplary embodiment described above.

Figure 39:
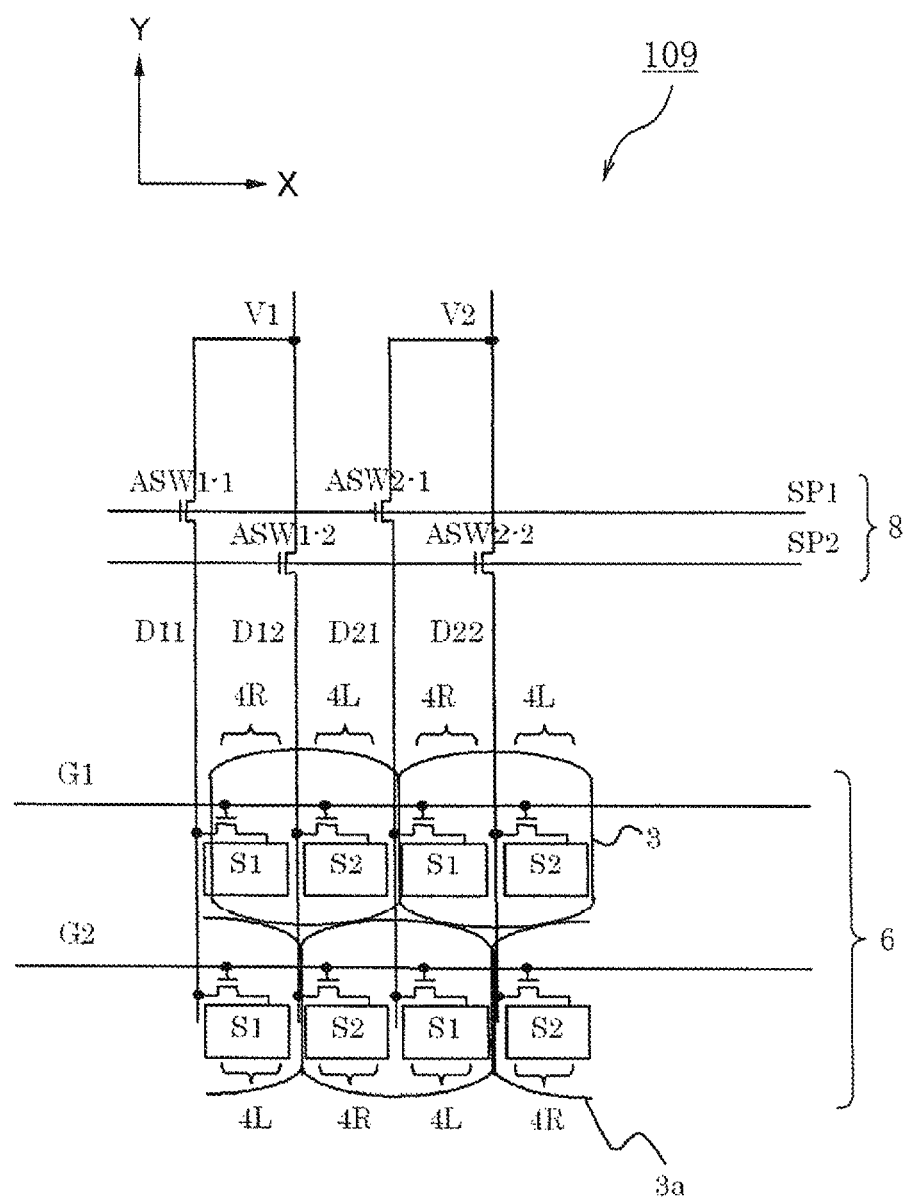
FIG. 39 is a top plan view showing a phase deployment order of left-eye pixels and right-eye pixels of a display device according to a twentieth exemplary embodiment of the invention.

Next, a twentieth exemplary embodiment of the invention will be described. As shown in FIG. 39, a display device driving method according to this exemplary embodiment is a method for driving a following display device 109. The display device 109 includes: a pixel matrix 6 configured with a plurality of pixel units S1 and S2, - - - disposed in matrix, each including two neighboring pixels for respectively displaying images for two (as N) viewpoints, in which the pixels S1, - - - are disposed in the vicinity of each proximal point between gate lines G1, G2 and data lines D11-D22; video signal lines V1, V2 for outputting display data; a wiring switching element 8 which successively switches and connects two (as M) data lines D11, - - - to each of the video signal lines V1, V2 so as to supply the display data to the pixels S1, via the data lines D11, - - - ; a lenticular lens 3 for distributing the light emitted from each of the pixels S1, - - - configuring the pixel units S1 and S2, - - - into the X-axis direction for each of the two viewpoints; and a plurality of TFTs (reference numerals are omitted) for transmitting the display data to each of the pixels S1, - - - from the data lines D11-D22. The gate lines G1, G2 having a function of controlling those TFTs are extended along the X-axis direction. One each of the data lines D11, - - - is arranged along the X-axis direction, and two each of the pixels S1 and S2, - - - as a display unit are disposed along the X-axis direction. With the driving method of this exemplary embodiment, the wiring switching element 8 switches the two data lines D11, - - - in a certain order, and then switches the two data lines D11, - - - in another order that is different from that certain order. For example, the wiring switching element 8 switches the data lines in order of "the data line D11→ the data line D12" and, thereafter, inversely switches the data lines in order of "the data line D12→ the data line D11". Such operation can be achieved by a multiplexer which operates with 1-bit selection signals, for example. This makes it possible to disperse the switching orders of the wiring switching element 8 corresponding to each of the pixels S1, S2, - - - for the right-eye pixels 4R and the left-eye pixels 4L as the pixel groups configured with the pixels S1, S2, - - - which display the images for the same viewpoint.

Conventionally, the switching order of the wiring switching element 8 for all the pixels S1, - - - within the right-eye pixels 4R is the first, for example, and the switching order for all the pixels S2, - - - within the left-eye pixels 4L is the second. Thus, there generates a difference in the display between the right-eye pixels 4R and the left-eye pixels 4L caused due to the switching order. Therefore, this embodiment improves the image quality by equalizing the switching orders as a whole for the right-eye pixels 4R and the left-eye pixels 4L through changing the switching order of the two data lines D11, - - - chronologically. Other structures, functions, and effects are the same as those of each of the exemplary embodiment described above.

Figure 40A:
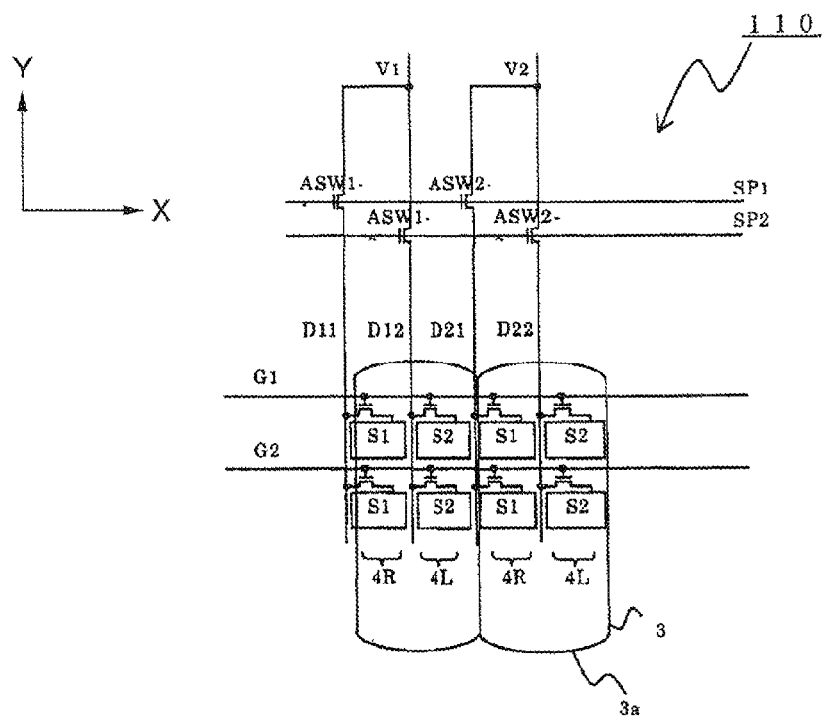
FIGS. 40A and 40B are top plan views showing a phase deployment order of left-eye pixels, respectively, and right-eye pixels of a display device according to a twenty-first exemplary embodiment of the invention.
Figure 40B:
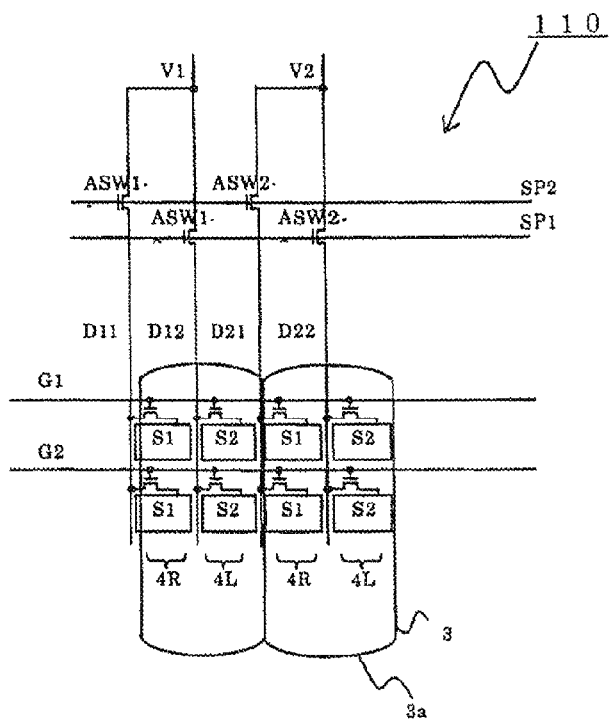
Figure 41:
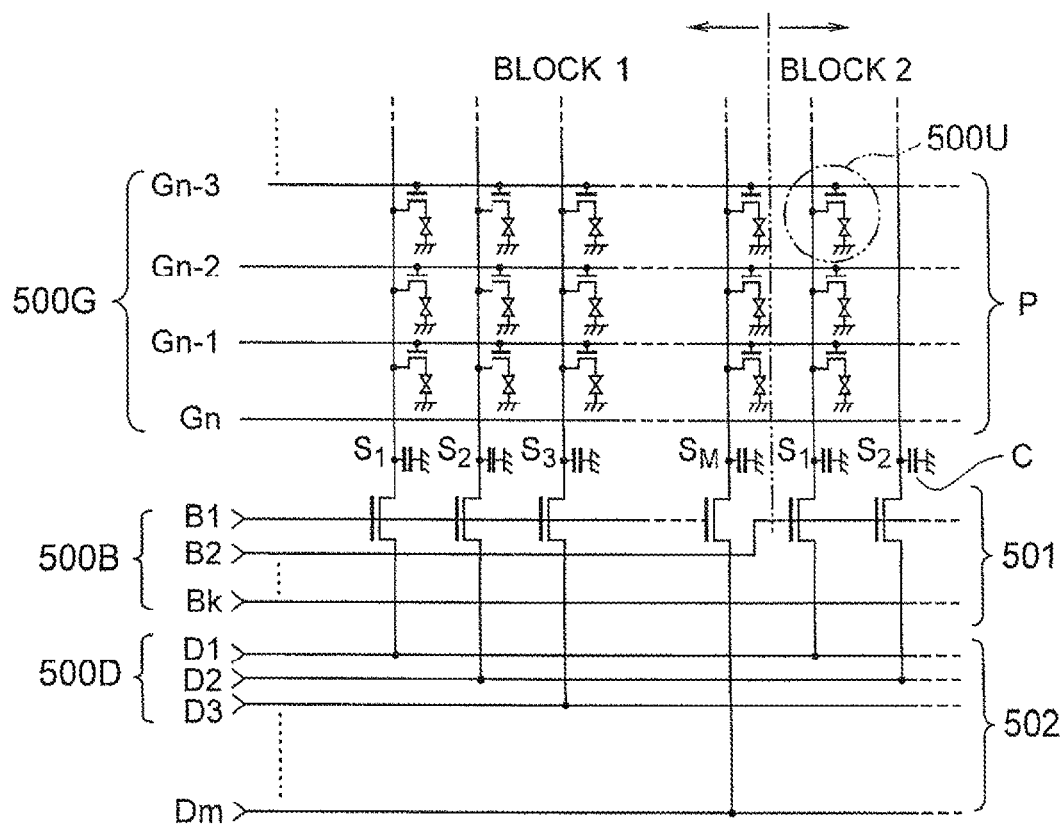
FIG. 41 is a circuit diagram showing a block division driving method according to a related technique.

Next, a twenty-first exemplary embodiment of the invention will be described. FIGS. 40A and 40B are top plan views showing a phase deployment order of left-eye pixels, respectively, and right-eye pixels of a display device according to the twenty-first exemplary embodiment of the invention. FIG. 40A shows a phase deployment operation at the time of display of an even-numbered frame, for example, while FIG. 40B shows a phase deployment operation at the time of display of an odd-numbered frame. Compared to the first comparative example described above, this exemplary embodiment is distinctive in respect that it is structured to have no deviation in the phase deployment operations by changing the phase deployment operation to different states in terms of time, even though this exemplary embodiment has a structure of 2-phase deployment and 2-viewpoint on the left and right sides as in the case of the first comparative example.

As shown in FIG. 40A, in a display device 110 of the twenty-first exemplary embodiment, the pixels connected to the data lines D11, D21 are allotted for the right-eye pixels 4R at the time of display of an even-numbered frame due to the positional relation with respect to the cylindrical lenses 3a. Further, the pixels connected to the data lines D12, D22 are allotted for the left-eye pixels 4L. Therefore, the right eye of the observer comes to visually recognize the pixel group that is deployed in the first phase, while the left eye of the observer comes to visually recognize the pixel group that is deployed in the second phase. Then, as shown in FIG. 40B, the pixels connected to the data lines D11, D21 are allotted for the left-eye pixels 4L at the time of display of an odd-numbered frame. Further, the pixels connected to the data lines D12, D22 are allotted for the right-eye pixels 4R. Therefore, the left eye of the observer comes to visually recognize the pixel group that is deployed in the first phase, while the right eye of the observer comes to visually recognize the pixel group that is deployed in the second phase.

This exemplary embodiment is capable of reducing influences caused due to a difference in the writing operations of each phase through equalizing the deviation in the phase deployment orders in terms of time. Therefore, it is possible to improve the image quality. Further, while this exemplary embodiment has been described by referring to the two-lens type having two viewpoints on the left and right sides, the present invention is not limited only to such case. The exemplary embodiment of the invention can also be applied to a field sequential type, i.e., a type which displays different videos by dividing the images towards different directions of the space in terms of time. Other structures, functions, and effects are the same as those of each of the exemplary embodiments described above.

The first to twenty-first exemplary embodiments have been described by referring to the case where the display device is loaded on the portable telephone to display stereoscopic images by supplying images with parallax to the left and right eyes of a single observer and to the case where the display device supply a plurality of kinds of images simultaneously to a single observer. However, the display device according to the present invention is not limited to such cases. The exemplary embodiment may be applied to a device that has a large-scale display panel and supply a plurality of different images to a plurality of observers. Further, each of the above-described exemplary embodiments may be employed individually or employed in combinations as appropriate. Note here that the structures of each feature elements under the same name and same reference numerals in each exemplary embodiment may have different structures as illustrated in each drawing for the respective exemplary embodiment.

While the present invention has been described above by referring to each of the exemplary embodiments, the present invention is not limited to those exemplary embodiments. Various changes and modifications that occur to those skilled in the art may be applied to the structures and details of the present invention. Further, it is to be understood that the present invention includes combinations of a part of or the whole part of the structures described in each of the exemplary embodiments.

A display device according to another exemplary embodiment of the invention may be structured to include: a plurality of display unit each having at least a pixel for displaying a first-viewpoint image and a pixel for displaying a second-viewpoint image; wirings for supplying display data to each of the pixels; switching devices arranged for each of M-number (M is an integer of 1 or larger) of the wirings for supplying display data to the M-number of wirings by changing those successively; and an optical element for distributing light emitted from each of the pixels configuring the display unit towards different directions from each other, wherein there is no deviation in the switching order of the display data supplied by the switching device.

It is desirable that "M" is 2 or larger, and that the display data is supplied to each of the pixel groups by the switching operations in a plurality of orders executed by the switching device. It is desirable for the proportions of the switching orders to be uniform in each of the pixel groups. Further, "M" may also be 1.

Further, the display device may be structured to include: data lines for supplying the display data to each of the pixels; pixel switches for transmitting the display data from the data lines to each of the pixels; and gate lines for controlling the pixel switches, wherein each of the pixels is disposed in the vicinity of the proximal points between the gate lines and the data lines by being translated from each other, and the data lines are extended along the light distributing direction of the optical element.

Furthermore, the display device may be structured to include: the data lines for supplying the display data to each of the pixels; the pixel switches for transmitting the display data from the data lines to each of the pixels; and gate lines for controlling the pixel switches, wherein each of the pixels is disposed in the vicinity of the proximal points between the gate lines and the data lines by being translated from each other, the gate lines are extended along the light distributing direction of the optical element, and a relation of "M>1 and NmodM≠0" applies, provided that the viewpoint number of the display unit is N and the number of switching orders of the switching device is M.

Furthermore, the display device may be structured to include: the data lines for supplying the display data to each of the pixels; the pixel switches for transmitting the display data from the data lines to each of the pixels; and gate lines for controlling the pixel switches, wherein each of the pixels is disposed in the vicinity of the proximal points between the gate lines and the data lines by being translated from each other, the gate lines are extended along the light distributing direction of the optical element, and a relation of "M=1" applies, provided that the viewpoint number of the display unit is N and the number of switching orders of the switching device is M.

Further, the display device may be structured to include: the data lines for supplying the display data to each of the pixels; the pixel switches for transmitting the display data from the data lines to each of the pixels; and gate lines for controlling the pixel switches, wherein the pixels disposed in the arranging direction of the gate lines are connected to different neighboring data lines.

Furthermore, the display device may be structured to include: the data lines for supplying the display data to each of the pixels; the pixel switches for transmitting the display data from the data lines to each of the pixels; and gate lines for controlling the pixel switches, wherein a pair of neighboring pixels disposed by sandwiching a gate line are controlled by the gate line disposed between the pixels, and also connected to different neighboring data lines.

Further, the neighboring pixel pairs neighboring to each other along the extending direction of the gate lines may be connected to different neighboring gate lines. Furthermore, the gate lines may extend along the light distributing direction of the optical element. Moreover, it may be structured such that a condition of "M≥3 and NmodM≠0" applies, provided that the viewpoint number of the display unit is N and the number of switching orders of the switching device is M.

Further, the display device may be structured to include: the data lines for supplying the display data to each of the pixels; the pixel switches for transmitting the display data from the data lines to each of the pixels; and gate lines for controlling the pixel switches, wherein the extending direction of the gate lines or the extending direction of the data lines is different from the light distributing direction of the optical element.

Furthermore, the present invention may be built as a portable terminal having the display device described above. Moreover, the present invention may be applied to a portable telephone, a personal information terminal, a personal television set, a game machine, a digital camera, a video camera, a video player, a notebook-type personal computer, a cash dispenser, or a vending machine.

Further, another exemplary embodiment of the invention may be built as a display panel which includes: the data lines for supplying the display data to each of the pixels; the pixel switches for transmitting the display data from the data lines to each of the pixels; gate lines for controlling the pixel switches; and a switching device for controlling the display data supplied to the data lines, wherein a pair of neighboring pixels disposed by sandwiching a gate line are controlled by the gate line disposed between the pixels.

Further, the pixels configuring the neighboring pixel pair may be connected to different neighboring data lines. Furthermore, the neighboring pixel pairs neighboring to each other along the extending direction of the gate lines may be connected to the neighboring different gate lines.

Furthermore, a display device driving method according to another exemplary embodiment of the invention may be structured to drive a display device which includes: a plurality of display unit each having at least a pixel for displaying a first-viewpoint image and a pixel for displaying a second-viewpoint image; wirings for supplying display data to each of the pixels; switching devices for controlling display data supplied to the wirings; and an optical element for distributing light emitted from each of the pixels configuring the pixel units towards different directions from each other. The method may be structured to drive each pixel group that is configured with the pixels for displaying the same-viewpoint image with no deviation in the switching order of the switching device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A display device which displays images towards two or more different directions by supplying image signals to two or more pixels connected respectively to two or more scanning lines and two or more data lines, the device comprising:
   two or more pixel units, each including neighboring pixels for displaying images respectively to two or more different directions;
   an optical element which distributes light emitted from each of the pixels that configure the display unit to the two or more different directions;
   one or more video signal lines that output image signals, with which images are displayed towards the two or more different directions, to the two or more data lines connected respectively to the two or more pixels that configure the display unit; and
   a wiring switching element having two or more control lines that control connections between the two or more data lines and the video signal lines, and wiring switches that distribute the image signals to the pixels based on a control signal inputted to the control lines;
   wherein:
   the wiring switches successively switch and connect M-number of the data lines for each of the video signal lines, where M is an integer ≥2; and
   the optical element alternates, for each of one or more scanning lines, a direction in which the light emitted from each of the pixels is distributed, with respect to each of pixel columns disposed in an extending direction of the data lines so as to equalize a number of pixels for each direction in which the light emitted from each of the pixels is distributed.

2. A terminal device, comprising the display device of claim 1.

3. The terminal device as claimed in claim 2, which is a portable telephone, a personal information terminal, a personal television set, a game machine, a digital camera, a video camera, a video player, a notebook-type personal computer, a cash dispenser, or a vending machine.

4. A display device which supplies display data to a display unit including N-number of neighboring pixels for respectively displaying images for N-number of viewpoints by successively switching and connecting M-number of data lines to each of a plurality of video signal lines by using a wiring switching element, where N≥2, and where M is an integer ≥2;
   distributes light emitted from each of the pixels configuring the display unit towards different directions for each of the N-number of viewpoints; and
   switches the M-number of data lines in a given order and, thereafter, switches the M-number of data lines in an order that is different from the given order so as to equalize average values of switching orders with which the data lines are switched within a predetermined time.

5. A terminal device, comprising the display device of claim 4.

6. The terminal device as claimed in claim 5, which is a portable telephone, a personal information terminal, a personal television set, a game machine, a digital camera, a video camera, a video player, a notebook-type personal computer, a cash dispenser, or a vending machine.

7. A display device driving method, comprising:
   supplying display data to a display unit including N-number of neighboring pixels for respectively displaying images for N-number of viewpoints by successively switching and connecting M-number of data lines to each of a plurality of video signal lines by using a wiring switching element, where N≥2, and where M is an integer ≥2;

distributing light emitted from each of the pixels configuring the display unit towards different directions for each of the N-number of viewpoints; and switching the M-number of data lines in a given order and, thereafter, switching the M-number of data lines in an order that is different from the given order so as to equalize average values of switching orders with which the data lines are switched within a predetermined time.

* * * * *